(12) United States Patent
Ross et al.

(10) Patent No.: US 12,513,532 B2
(45) Date of Patent: Dec. 30, 2025

(54) MESH RELAY MODULE

(71) Applicant: L3VEL, LLC, Wilmington, DE (US)

(72) Inventors: Kevin Ross, Lehi, UT (US);
Muhammad Ahsan Naim, Irving, TX (US)

(73) Assignee: L3VEL, LLC, Wilmington, DE (US)

( * ) Notice: Subject to any disclaimer, the term of this patent is extended or adjusted under 35 U.S.C. 154(b) by 698 days.

(21) Appl. No.: 17/526,823

(22) Filed: Nov. 15, 2021

(65) Prior Publication Data

US 2022/0159478 A1    May 19, 2022

Related U.S. Application Data

(60) Provisional application No. 63/113,807, filed on Nov. 13, 2020.

(51) Int. Cl.
*H04W 16/28*    (2009.01)
*H04W 84/18*    (2009.01)

(52) U.S. Cl.
CPC ............ *H04W 16/28* (2013.01); *H04W 84/18* (2013.01)

(58) Field of Classification Search
CPC .................................................... H04W 16/28
See application file for complete search history.

(56) References Cited

U.S. PATENT DOCUMENTS

| 8,385,921 | B1 | 2/2013 | Shousterman et al. |
| 8,406,126 | B1 | 3/2013 | Leiba et al. |
| 9,425,985 | B1 | 8/2016 | Shousterman et al. |
| 9,538,331 | B2 | 1/2017 | Ross |

(Continued)

FOREIGN PATENT DOCUMENTS

WO    2018083548 A1    5/2018

OTHER PUBLICATIONS

International Bureau, International Preliminary Report on Patentability and Written Opinion, mailed on May 25, 2023, issued in connection with International Application No. PCT/US2021/059397, filed on Nov. 15, 2021, 8 pages.

(Continued)

*Primary Examiner* — Ricky Q Ngo
*Assistant Examiner* — Stephen N Steiner
(74) *Attorney, Agent, or Firm* — LEE SULLIVAN SHEA & SMITH LLP

(57) ABSTRACT

Disclosed herein is mesh relay module for relaying signals between nodes in a wireless mesh network. In one implementation, this mesh relay node may include a receiver front end comprising a receiver-side phased antenna array for receiving signals in one respective beam direction, a transmitter front end comprising a transmitter-side phased antenna array for transmitting signals in another respective beam direction, a communication interface, and circuitry that is configured to control the respective beam directions of the receiver and transmitter front ends and transfer signals between the receiver and transmitter front ends. Further, this mesh relay node may function to provide an indirect communication path between nodes within the wireless mesh network by (i) receiving signals from a first direction associated with a first node via the receiver front end and (ii) transmitting received signals in a second direction associated with a second node via the transmitter front end.

10 Claims, 39 Drawing Sheets

(56) References Cited

U.S. PATENT DOCUMENTS

| | | | |
|---|---|---|---|
| 9,621,465 B2 | 4/2017 | Ross | |
| 9,860,179 B2 | 1/2018 | Ross | |
| 9,942,776 B2 | 4/2018 | Ross et al. | |
| 9,973,939 B2 | 5/2018 | Ross | |
| 10,027,508 B2 | 7/2018 | Leiba et al. | |
| D856,962 S | 8/2019 | Hart et al. | |
| 10,530,851 B1 | 1/2020 | Hart | |
| 10,530,882 B2 | 1/2020 | Ross | |
| 2014/0057570 A1 | 2/2014 | Leiba | |
| 2014/0321357 A1 | 10/2014 | Kwon et al. | |
| 2015/0358082 A1 | 12/2015 | Ross | |
| 2018/0331935 A1* | 11/2018 | Ross | H04W 28/0883 |
| 2018/0343685 A1 | 11/2018 | Hart et al. | |
| 2019/0110281 A1 | 4/2019 | Zhou et al. | |
| 2019/0141710 A1* | 5/2019 | Henry | H04B 3/38 |
| 2019/0312625 A1 | 10/2019 | Liang et al. | |
| 2020/0091992 A1 | 3/2020 | Gharavi et al. | |
| 2020/0162992 A1 | 5/2020 | Kwon et al. | |
| 2020/0187022 A1 | 6/2020 | Ross et al. | |
| 2020/0336168 A1 | 10/2020 | Hormis et al. | |
| 2020/0344813 A1* | 10/2020 | Li | H04B 7/0695 |

OTHER PUBLICATIONS

International Searching Authority, International Search Report and Written Opinion, PCT/US2021/059397, mailed Mar. 8, 2022, 12 pages.

European Patent Office, European Extended Search Report mailed on Aug. 12, 2024, issued in connection with European Application No. 21892984.2, 9 pages.

* cited by examiner

MESH RELAY MODULE

CROSS-REFERENCE TO RELATED APPLICATIONS

This application claims priority to U.S. Provisional Application No. 63/113,807, filed Nov. 13, 2020 and entitled "NEXT GENERATION MULTILAYER WIRELESS MESH NETWORK," which is incorporated herein by reference in its entirety.

BACKGROUND

Wired and wireless networking and communications systems are widely deployed to provide various types of communication and functional features, including but not limited to those for high speed home internet, security and automation, and/or others. These systems may be capable of supporting communication with a user through a communication connection or a system management action.

Certain types of wireless communication systems (sometimes also referred to as wireless network systems, wireless communication networks, or wireless networks) may comprise multiple wireless communication nodes that facilitate wireless communication within the system. One example of such a wireless communication system may take the form of a wireless mesh network that comprises wireless communication nodes that are capable of receiving and transmitting high bandwidth signals operating at very high frequencies (e.g., millimeter-wave signals), which may be used to provide next-generation wireless communication (e.g., 5G or beyond) for delivering various types of services, among various other possibilities.

OVERVIEW

In certain wireless mesh networks such as those disclosed herein, the wireless links that are established between the nodes of the wireless mesh network may be highly directional and may work only under perfect line-of-sight (LOS) or near LOS conditions. For example, the wireless links in such a wireless mesh network could take the form of millimeter-wave point-to-point (ptp) links, which may have a narrow beam width that requires sufficient LOS to operate. As such, designing and deploying a wireless mesh network generally involves efforts to ensure that certain pairs of nodes within the wireless mesh network have a sufficient LOS path. However, once a wireless mesh network is built, certain events such as vegetation growth or loss of an intermediary node can impact the LOS paths between certain pairs of nodes, and this can result in one or more link failures in the wireless mesh network.

In some scenarios, a link failure between two nodes in a wireless mesh network can be remedied by re-routing traffic through an alternative communication path that traverses other nodes and wireless links within the wireless mesh network. However, in other scenarios, it may be undesirable or impossible to remedy link failure by re-rerouting traffic through other nodes and wireless links within the wireless mesh network. For instance, in some cases, a given node may only be connected to the wireless mesh network via a single wireless link with a single other node, and if that single wireless link fails, there will be no alternative way to route traffic to or from the given node utilizing other nodes or wireless links within the wireless mesh network. Thus, there remains a need for technology that enables alternative communication paths to be established between nodes in a wireless mesh network when certain scenarios arise (e.g., when a direct wireless link between two nodes fails).

To address these and other problems, disclosed herein is a new type of wireless communication module that may function to relay signals between nodes within a wireless mesh network. This new type of wireless communication module, which may be referred to herein as a "mesh relay module," may include one or more receiver front ends that each comprise a phased antenna array capable of receiver-side beam forming, one or more transmitter front ends that each comprise a phased antenna array capable of transmitter-side beam forming, a communication interface, and circuitry that is configured to control and interconnect the receiver and transmitter front ends, among other possible components.

In operation, a mesh relay module may serve to provide an indirect communication path between nodes within the wireless mesh network, which may be useful in a scenario where a direct communication path between the two nodes has experienced an interruption or failure. For instance, after a failure of a wireless link between two nodes within a wireless mesh network is detected, the disclosed mesh relay module may be configured to (i) receive signals from a first direction associated with a first one of the nodes via a first receiver front end comprising a first receiver-side phased antenna array for receiving signals in one respective beam direction and (ii) transmit (or "relay") signals received by the first receiver front end in a second direction associated with a second one of the nodes via a first transmitter front end comprising a first transmitter-side phased antenna array for transmitting signals received by the first receiver front end in another respective beam direction. Further, in practice, the disclosed mesh relay module may enter this configuration by (i) receiving an instruction via its communication interface that indicates a need for relay functionality and provides information that enables the mesh relay module to determine the appropriate receive-side and transmit-side beams to utilize for the relay and then (ii) providing the receiver and transmitter front ends with information that enables the front ends to adjust their respective beams.

In some implementations, the disclosed mesh relay module may also be configured to (i) receive signals from the second direction associated with the first one of the nodes via a second receiver front end comprising a second receiver-side phased antenna array for receiving signals in one respective beam direction and (ii) transmit (or "relay") signals received by the second receiver front end in the first direction associated with the first one of the nodes via a second transmitter front end comprising a second transmitter-side phased antenna array for transmitting signals received by the second receiver front end in another respective beam direction.

As described in further detail below, the disclosed mesh relay module may take any of various forms. For instance, in some implementations, the disclosed mesh relay module may be designed to act as a "passive" relay (or sometimes called a "passive reflector") that transfers signals between the receive front end and the transmitter front end using a waveguide (or the like) as opposed to using baseband processing techniques, which may provide certain advantages over "active" relays—including but not limited to requiring a lower level of power to operate. However, in other implementations, the disclosed mesh relay module may be designed to act as an "active" relay that transfers signals between the receive front end and the transmitter front end using baseband processing techniques.

The disclosed mesh relay module may be designed to have various other forms, include various other components, and perform various other functions as well.

Accordingly, in one aspect, disclosed herein is a mesh relay module for relaying signals between nodes in a wireless mesh network, where the mesh relay module includes (a) receiver front end comprising a receiver-side phased antenna array for receiving signals in one respective beam direction, (b) a transmitter front end comprising a transmitter-side phased antenna array for transmitting signals in another respective beam direction, (c) a communication interface for facilitating communication with other wireless communication equipment, and (d) circuitry that is configured to (i) control the respective beam directions of the receiver front end and the transmitter front end and (ii) transfer signals between the receiver front end and the transmitter front end.

The control and transfer circuitry of the mesh relay node may take various forms. In some implementations, such circuitry may be configured to passively transfer signals between the receiver front end and the transmitter front end without using baseband processing. However, in other implementations, such circuitry may be configured to actively transfer signals between the receiver front end and the transmitter front end by using baseband processing.

Further, in some implementations, the circuitry may comprise a first circuitry component for controlling the respective beam directions of the receiver front end and the transmitter front end and a second circuitry component for controlling transferring signals between receiver front end and transmitter front end. In such implementations, the first circuitry component may take various forms, one example of which may be a microcontroller. Likewise, the second circuitry component may take various forms, examples of which may include a waveguide (e.g., for a "passive" repeater) or baseband processor unit (e.g., for an "active" repeater).

Further yet, in some implementations, the circuitry may be configured to control the respective beam directions of the receiver front end and the transmitter front end by (i) providing the receiver front end with first information that enables the receiver front end to adjust its respective beam direction for receiving signals and (ii) providing the transmitter front end with second information that enables the transmitter front end to adjust its respective beam direction for transmitting signals. In such implementations, the first information may comprise gain and phase information for the receiver-side phased antenna array and the second information may comprise gain and phase information for the transmitter-side phased antenna array, and in at least some examples, the first information and the second information may be determined by the circuitry based on information indicating respective directions of two nodes in the wireless mesh network that is received via the communication interface.

Still further, in some implementations, the receiver front end and the transmitter front end may comprise a first pair of front ends for relaying signals from a first node of the wireless mesh network to a second node of the wireless mesh network, and the mesh relay module may also comprise a second pair of front ends for relaying signals from the second node of the wireless mesh network to the first node of the wireless mesh network, where that second pair of front ends includes a second receiver front end comprising a second receiver-side phased antenna array for receiving signals in one respective beam direction and a second transmitter front end comprising a second transmitter-side phased antenna array for transmitting signals in another respective beam direction, and where the circuitry is further configured to (i) control the respective beam directions of the second receiver front end and the second transmitter front end and (ii) transfer signals between second receiver front end and second transmitter front end.

In another aspect, disclosed herein is a communication system comprising first and second nodes that are operating as part of a wireless mesh network, where the first and second nodes are configured to exchange signals within the wireless mesh network via a wireless point-to-point link, along with a third node that is installed with a mesh relay module for relaying signals between nodes in the wireless mesh network, where, after a failure of the wireless point-to-point link between the first and second nodes is detected, the mesh relay module installed at the third node is configured to (i) receive signals from a first direction associated with the first node via a first receiver front end comprising a first receiver-side phased antenna array for receiving signals in one respective beam direction and (ii) transmit received signals in a second direction associated with the second node via a first transmitter front end comprising a first transmitter-side phased antenna array for transmitting signals received by the receiver front end in another respective beam direction.

In at least some implementations of this communication system, the mesh relay module may include (a) a first pair of front ends that includes the first receiver front end and the first transmitter front end, (b) a communication interface for facilitating communication with other wireless communication equipment; and (c) circuitry that is configured to (i) control the respective beam directions of the first receiver front end and the first transmitter front end and (ii) transfer signals between the first receiver front end and the first transmitter front end.

Further, in at least some implementations, the mesh relay module may become configured to (a) receive signals from the first direction associated with the first node via the first receiver front end by providing the first receiver front end with first information that enables the first receiver front end to adjust its respective beam direction for receiving signals and (b) transmit received signals in the second direction associated with the second node via the first transmitter front end by providing the first transmitter front end with second information that enables the first transmitter front end to adjust its respective beam direction for transmitting signals. In such implementations, the first information may comprise gain and phase information for the first receiver-side phased antenna array that corresponds to the first location and the second information may comprise gain and phase information for the first transmitter-side phased antenna array that corresponds to the second location, and in at least some examples, the first information and the second information may be determined by the mesh relay module based on information received via the communication interface that indicates the first direction associated with the first node the second direction associated with the second node.

Further yet, in at least some implementations, the mesh relay module may further comprise a second pair of front ends that includes (i) a second receiver front end comprising a second receiver-side phased antenna array for receiving signals in one respective beam direction and (ii) a second transmitter front end comprising a second transmitter-side phased antenna array for transmitting signals received by the second receiver front end in another respective beam direction, where, after the failure of the wireless point-to-point link between the first and second nodes is detected, the mesh relay module installed at the third node is further configured to (i) receive signals from the second direction associated with the second node via the second receiver front end and (ii) transmit received signals in the first direction associated with the first node via the second transmitter front end. In such implementations, the mesh relay module may become configured to (a) receive signals from the second direction associated with the second node via the second receiver front end by providing the second receiver front end with third information that enables the second receiver front end to adjust its respective beam direction for receiving signals; and (b) transmit received signals in the first direction associated with the first node via the second transmitter front end by providing the second transmitter front end with fourth information that enables the second transmitter front end to adjust its respective beam direction for transmitting signals. Further, in such implementations, the third information may comprise gain and phase information for the second receiver-side phased antenna array that corresponds to the second location and the third information may comprise gain and phase information for the transmitter-side phased antenna array that corresponds to the first location.

Still further, in at least some implementations, the mesh relay module is configured to passively transfer signals between the first receiver front end and the first transmitter front end without using baseband processing.

In yet another aspect, disclosed herein is communication system comprising first and second nodes that are operating as part of a wireless mesh network, where the first and second nodes are configured to exchange signals via a wireless point-to-point link, along with third and fourth nodes that are each installed with a respective mesh relay module for relaying signals between nodes in the wireless mesh network, where, when a failure of the wireless point-to-point link between the first and second nodes is detected, (a) the respective mesh relay module installed at the third node is configured to (i) receive signals from a first direction associated with the first node and (ii) transmit received signals in a fourth direction associated with the fourth node, and (b) the respective mesh relay module installed at the fourth node is configured to (i) receive signals from a third direction associated with the third node and (ii) transmit received signals in a second direction associated with the second node.

The foregoing has outlined rather broadly the features and technical advantages of examples according to this disclosure so that the following detailed description may be better understood. Additional features and advantages will be described below. It should be understood that the specific examples disclosed herein may be readily utilized as a basis for modifying or designing other structures for carrying out the same operations disclosed herein. Characteristics of the concepts disclosed herein including their organization and method of operation together with associated advantages will be better understood from the following description when considered in connection with the accompanying figures. It should be understood that the figures are provided for the purpose of illustration and description only.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

DETAILED DESCRIPTION

Disclosed herein are technologies for wireless mesh networks that serve as the basis for communication systems configured to provide various types of services to end users, including but not limited to telecommunication services such as high-speed internet.

Figure 1:
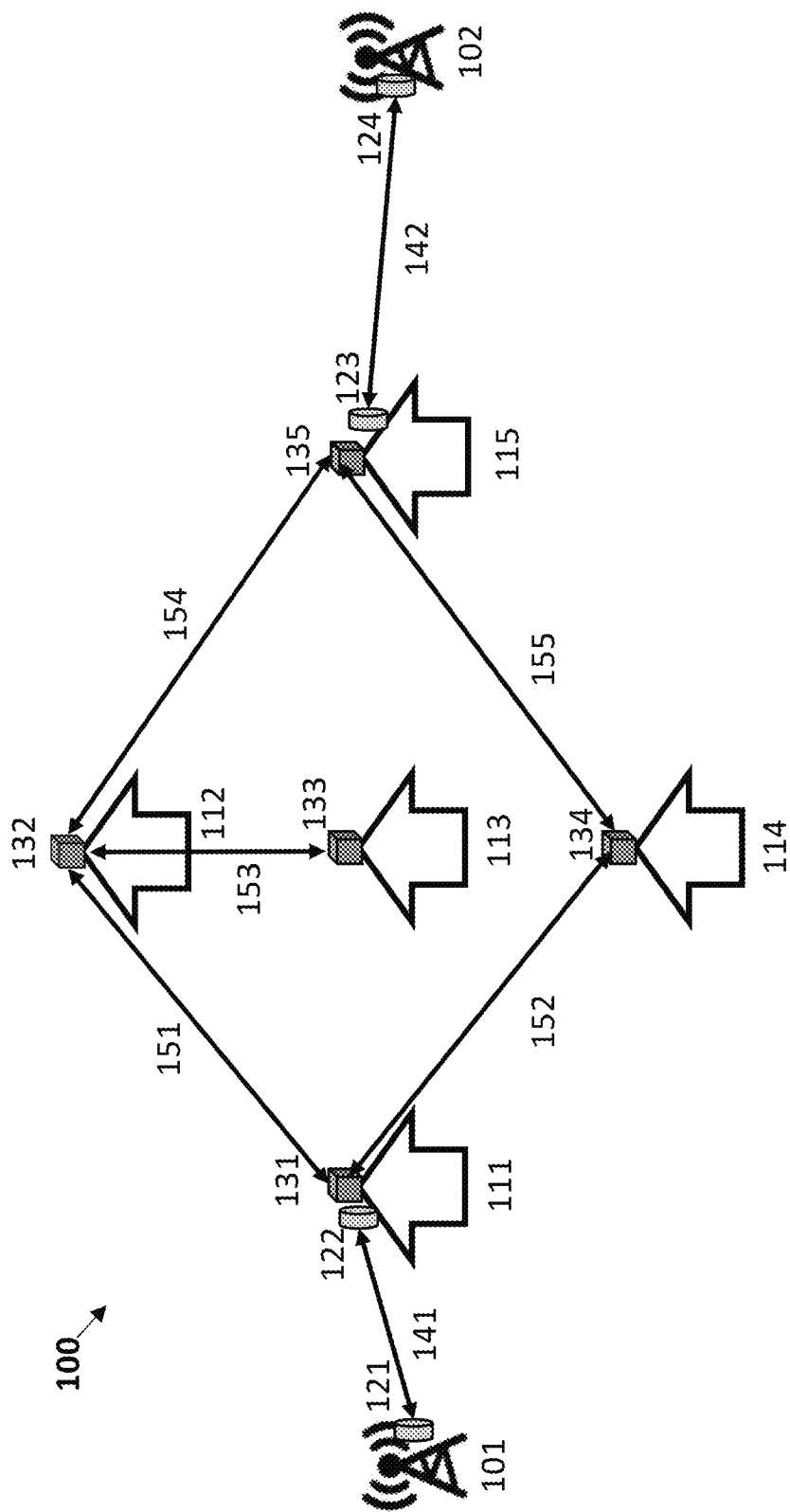
FIG. 1 depicts an example of a communication system that is based on a wireless mesh network, in accordance with the present disclosure.

For instance, the wireless mesh network technologies disclosed herein may form the basis for a data communication system capable of providing multigigabit internet speeds through a mesh network of infrastructure nodes interconnected via wireless point-to-point (ptp) and/or point-to-multipoint (ptmp) links, such as the example communication system 100 illustrated in FIG. 1. As shown, communication system 100 in FIG. 1 includes Tower/fiber access points 101 and 102, which may each also be referred to as a fiber Point of Presence ("PoP"). Tower/fiber access points 101 and 102 can be co-located or can be located at different physical locations. Tower/fiber access points 101 and 102 have access to a high-bandwidth dark (or lit) fiber capable of providing up to several hundred gigabits/second of data throughput. Tower/fiber access points 101 and 102 provide backhaul connectivity to a core network/data center (not shown in the FIG. 1 for the sake of simplicity).

In accordance with the present disclosure, Tower/Fiber access points 101 and 102 may host respective wireless communication equipment that enables Tower/Fiber access points 101 and 102 to operate as wireless communication nodes of a wireless mesh network. In this respect, the Tower/Fiber access points 101 and 102 that are installed with the wireless communication equipment for operating as wireless mesh network nodes may each be referred to herein as a "fiber PoP node" of the wireless mesh network shown in FIG. 1.

For instance, as shown, Tower/Fiber access points 101 and 102 may host respective sets of wireless communication equipment 122 and 123 for establishing ptp links with a next tier of wireless communication nodes in the wireless mesh network (which, as noted below, may be referred to as the "seed nodes" of the wireless communication network). The respective sets of wireless communication equipment 121 and 124 are capable of reception and transmission of high bandwidth (multiple gigahertz) signals operating at very high frequencies (e.g., 6 Ghz~100 Ghz such as 28 Ghz, V band, E band, etc.). The respective sets of wireless communication equipment 121 and 124 may each comprise a baseband/digital unit equipped with components including but not limited to a processor, memory, etc. The respective sets of wireless communication equipment 121 and 124 also each comprise an RF unit and an antenna unit for establishing at least one ptp link with another wireless communication node of the wireless mesh network. In at least some embodiments, the antenna subsystem of each respective set of wireless communication equipment 121 and 124 is capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees.

As further shown in FIG. 1, communication system 100 includes seed homes 111 and 115. Examples of seed homes include detached single-family homes, non-detached residential buildings such as multi-dwelling units (MDUs), commercial buildings such as small/medium businesses (SMB), or some other private property or infrastructure, where communication equipment can be deployed on rooftops of such seed homes among other possibilities. (In this respect, it will be appreciated that a "seed home" need not necessarily be a residential home.) In accordance with the present disclosure, seed homes 111 and 115 may host respective wireless communication equipment that enables seed homes 111 and 115 to operate as wireless communication nodes of a wireless mesh network. In this respect, the seed homes 111 and 115 that are installed with the respective wireless communication equipment for operating as wireless mesh network nodes may each be referred to herein as a "seed node" of the wireless mesh network shown in FIG. 1.

For instance, as shown in FIG. 1, seed homes 111 and 115 may host respective sets of wireless communication equipment 122 and 123 for establishing ptp links with the fiber PoP nodes of the wireless mesh network, which may be considered a different tier of the wireless mesh network. The respective sets of wireless communication equipment 122 and 123 are each capable of reception and transmission of high bandwidth (multiple gigahertz) signals operating at very high frequencies (e.g., 6 Ghz~100 Ghz such as 28 Ghz, V band, E band, etc.), which are commonly referred to as millimeter-wave frequencies. The respective sets of wireless communication equipment 122 and 123 may each comprise a baseband/digital unit equipped with components including but not limited to a processor, memory, etc. The respective sets of wireless communication equipment 122 and 123 may also comprise an RF unit and antenna unit for establishing at least one ptp link with another wireless communication node in the wireless mesh network. In at least some embodiments, the antenna subsystem of each respective set of wireless communication equipment 122 and 123 may be capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees.

For example, wireless communication equipment 121 residing at Tower/fiber access point 101 and wireless communication equipment 122 residing at seed home 111 may work together to form a bi-directional high-bandwidth communication ptp data link 141 that provides connectivity between Tower/fiber access point 101 and seed home 111. Similarly, wireless communication equipment 124 residing at Tower/fiber access point 102 and wireless communication equipment 123 residing at seed home 115 may work together to form a bi-directional high-bandwidth communication ptp data link 142 that provides connectivity between Tower/fiber access point 102 and seed home 115.

As further shown in FIG. 1, seed homes 111 and 115, in addition to wireless communication equipment 122 and 123, may also host respective, second sets of wireless communication equipment 131 and 135 for establishing ptp and/or ptmp links with a next tier of wireless communication nodes in the wireless mesh network (which, as noted below, may be referred to as "anchor nodes" of the wireless mesh network). In the example of FIG. 1, the respective, second sets of wireless communication equipment 131 and 135 may each comprise multiple independent transmission/reception submodules for establishing multiple ptp and/or ptmp links, which may also be referred to as "radio modules." However, it should be understood that the respective, second sets of wireless communication equipment 131 and 135 could also each comprise a single radio module for establishing a single ptp or ptmp link, as opposed to multiple radio modules.

Each module of the respective, second sets of wireless communication equipment 131 and 135 is capable of reception and transmission of high bandwidth (multiple gigahertz) signals operating at very high frequencies (e.g., 6 Ghz~100 Ghz such as 28 Ghz, V band, E band, etc.), which as noted above are commonly referred to as millimeter-wave frequencies. Each module of the respective, second sets of wireless communication equipment 131 and 135 comprises an independent baseband/digital unit equipped with components including but not limited to a processor, memory, etc. Each module in the respective, second sets of wireless communication equipment 131 and 135 also comprises an independent RF unit and independent antenna unit for establishing at least one ptp link or ptmp link with another wireless communication node (or perhaps multiple other wireless communication nodes) in the wireless mesh network. In at least some embodiments, the antenna subsystem of one or more modules of the second set of wireless communication equipment 131 may be a ptp antenna unit that is capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees. However, in other embodiments, the antenna subsystem of one or more modules of the second set of wireless communication equipment 131 may be a ptmp antenna unit that is capable of beamforming and creating multiple beams simultaneously in different directions. As described in further detail below, the second set of wireless communication equipment 131 may take various other forms as well.

Communication system 100 also includes multiple anchor homes 112, 113 and 114. As with seed homes 111 and 115, anchor homes 112, 113 and 114 may include detached single-family homes, non-detached residential buildings such as MDUs, commercial buildings such as SMBs, or some other private property or infrastructure, where wireless communication equipment can be deployed on rooftops of such anchor homes among other possibilities. (In this respect, it will be appreciated that an "anchor home" need not necessarily be a residential home.) Further, as with seed homes 111 and 115, anchor homes 112, 113 and 114 may host respective wireless communication equipment that enables anchor homes 112, 113 and 114 to operate as wireless communication nodes of a wireless mesh network. However, unlike seed homes 111 and 115, anchor homes are generally not installed with wireless communication equipment that provides a direct wireless connectivity to any Tower/Fiber access point. Instead, anchor homes 112, 113 and 114 are typically only installed with wireless communication equipment for establishing ptp and/or ptmp links with seed nodes and/or with other wireless communication nodes in the same tier of the wireless mesh network, where such wireless communication equipment may be similar to the respective, second sets of wireless communication equipment 131 and 135 for establishing ptp and/or ptmp links that is installed at each of the seed homes 111 and 115. The anchor homes 112, 113 and 114 that are installed with the respective wireless communication equipment for operating as wireless mesh network nodes may each be referred to herein as an "anchor node" of the wireless mesh network shown in FIG. 1.

For example, anchor home 112 hosts wireless communication equipment 132. A first module of wireless communication equipment 132 residing at anchor home 112 and another module of wireless communication equipment 131 residing at seed home 111 may work together to form a bi-directional high bandwidth communication ptp data link 151 that provides wireless connectivity between seed home 111 and anchor home 112. Similarly, as another example, a second module of wireless communication equipment 132 residing at anchor home 112 and a module of wireless communication equipment 133 residing at anchor home 113 may work together to form a bi-directional high bandwidth communication ptp data link 153 that provides wireless connectivity between anchor home 112 and anchor home 113. As yet another example, a third module of wireless communication equipment 132 residing at anchor home 112 and a module of wireless communication equipment 135 residing at seed home 115 may work together to form a bi-directional high bandwidth communication ptp data link 154 that provides wireless connectivity between anchor home 112 and seed home 115. As a further example, another module of wireless communication equipment 131 residing at seed home 111 and a module of wireless communication equipment 134 residing at anchor home 114 work together to form a bi-directional high bandwidth communication ptp data link 152 that provides wireless connectivity between anchor home 114 and seed home 111. As still another example, another module of wireless communication equipment 134 residing at anchor home 114 and a module of wireless communication equipment 135 residing at seed home 115 may work together to form a bi-directional high bandwidth communication ptp data link 155 that provides wireless connectivity between anchor home 114 and seed home 115. Other examples are possible as well.

Bi-directional communication links 141, 142, 151, 152, 153, 154 & 155 shown in FIG. 1 can use various different multiple access schemes for transmission and reception including but not limited to frequency division multiple access (FDMA), time division multiple access (TDMA), single carrier FDMA (SC-FDMA), single carrier TDMA (SC-TDMA), code division multiple access (CDMA), orthogonal frequency division multiple access (OFDMA), and/or non-orthogonal multiple access (NOMA) as described in various generations of communication technologies including 1G, 2G, 3G, 4G, 5G, 6G, etc. Further, in at least some embodiments, bi-directional communication links 141, 142, 151, 152, 153, 154 & 155 may each comprise a millimeter-wave link. Further yet, bi-directional communication links 141, 142, 151, 152, 153, 154 & 155 formed by a set of communication nodes comprising two or more of 121, 122, 123, 124, 131, 132, 133, 134, and/or 135 are capable of data information transfer via a variety of digital transmission schemes, including but not limited to amplitude modulation (AM), phase modulation (PM), pulse amplitude modulation/quadrature amplitude modulation (PAM/QAM), and/or ultra-wide band (UWB) pulse modulation (pico-second pulses), etc.

In FIG. 1, two Tower/fiber access points 101 & 102, two seed homes 111 & 115 and three anchor homes 112, 113 & 114 and seven bi-directional ptp data links 141, 142, 151, 152, 153, 154 & 155 are shown to illustrate an example of a communication system that is based on the wireless mesh network technologies disclosed herein. However, in general, it should be understood that communication system 100 can include a different number of Tower/fiber PoP nodes, seed nodes, anchor nodes, and/or communication links, which may depend on the specific layout of a particular instantiation of the communication system deployed in the field. Similarly, although, FIG. 1 shows a particular arrangement of communication equipment 121, 122, 123 & 124 that provides connectivity between a Tower/fiber access point (e.g., Tower/fiber access points 101, 102) and a seed home, as well as a particular arrangement of communication equipment 131, 132, 133, 134 & 135 that provides connectivity between two anchor homes or between an anchor and a seed home, the wireless communication equipment that is installed at the nodes of a wireless mesh network can vary from one communication system to another communication system, which may depend on the specific size and layout of a particular instantiation of the communication system. It should also be understood that communication system 100 may also contain other nodes (e.g., network switches/routers, etc.) that are omitted here for the sake of simplicity.

In line with the discussion above, communication system 100 of FIG. 1 may be utilized to provide any of various types of services to end users, including but not limited to telecommunication services such as high-speed internet. In this respect, it should be understood that one pool of end users of the service(s) provided by communication system 100 may be individuals that reside (or work) at the seed homes and anchor homes of FIG. 1. Additionally, although not shown in FIG. 1, it should be understood that communication system of FIG. 1 may also include client nodes that connect to certain nodes of the communication system (e.g., anchor nodes) via wireless ptp or ptmp links so as to enable other end users to receive the service(s) provided by communication system 100. These client nodes may take various forms, examples of which may include fixed-location customer premise equipment (CPE) and mobile computing devices, among other possibilities.

Figure 2:
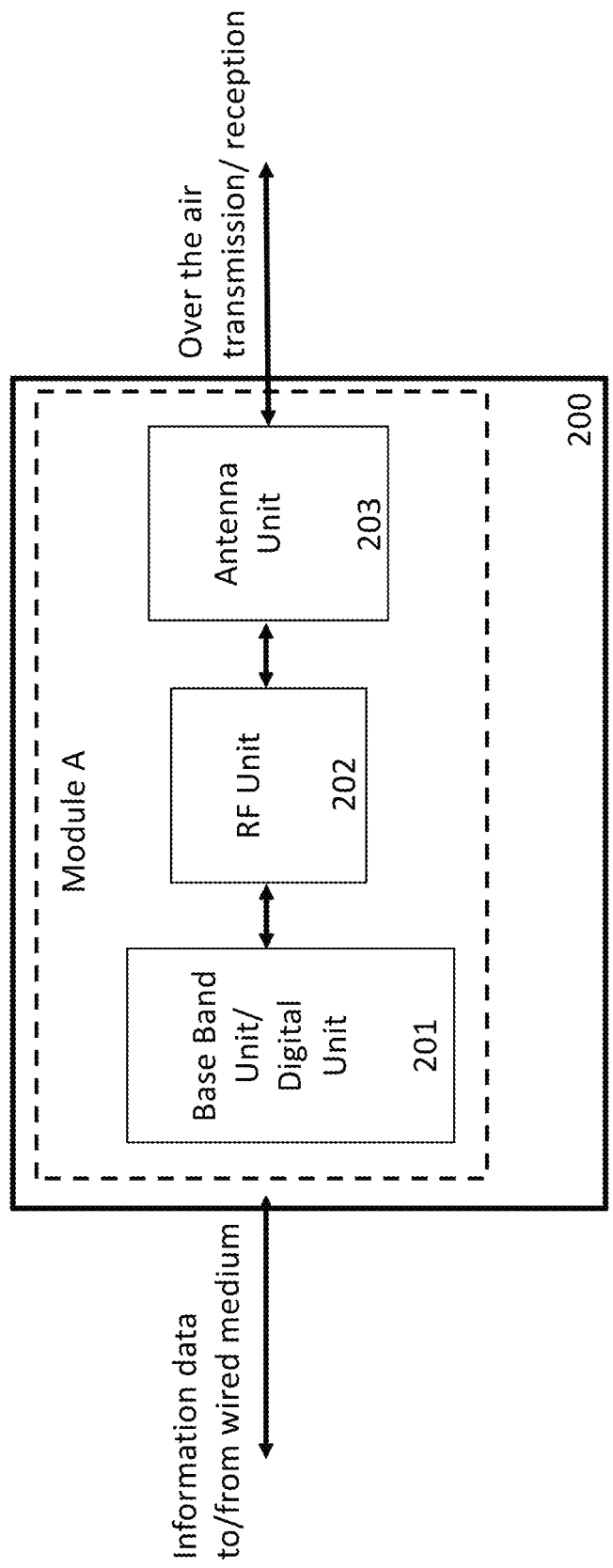
FIG. 2 depicts one possible example of a wireless communication node comprising a Module A type of radio module, in accordance with the present disclosure.

Referring to FIG. 2, one possible example of a wireless communication node of FIG. 1 is shown as a wireless communication node 200 installed with wireless communication equipment that comprises a module labelled as "Module A," which is one type of ptp radio module. As shown, Module A comprises a base band unit or digital unit 201 which runs the physical layer level protocol including digital modulation/demodulation (modem) and other higher layer protocols such as a MAC layer, etc. Base band unit 201 interacts with other nodes of a communication system that are external to the node at which the wireless communication equipment 200 is installed via a wired medium.

Module A also includes RF unit 202 which, among other things, performs processing of intermediate frequency (IF) signals and defines the frequency range of the radio signals that can be transmitted or received via Module A. RF unit 202 is capable of operating over a wide range of frequencies (e.g., V band frequencies ranging from 57 Ghz to 71 Ghz).

Further, as shown, Module A also comprises antenna unit 203 which performs the transmission and reception of over the air radio signals. Antenna unit 203 is capable of transmitting and receiving extremely narrow beam of signals. Antenna unit 203 may be constructed with metamaterials that have excellent properties of controlling the directionality of radio signals that cannot be exhibited by ordinary antennas. Module A with the help of antenna unit 203 is capable of establishing ptp links with a different module residing at a different node of the communication system.

Figure 3:
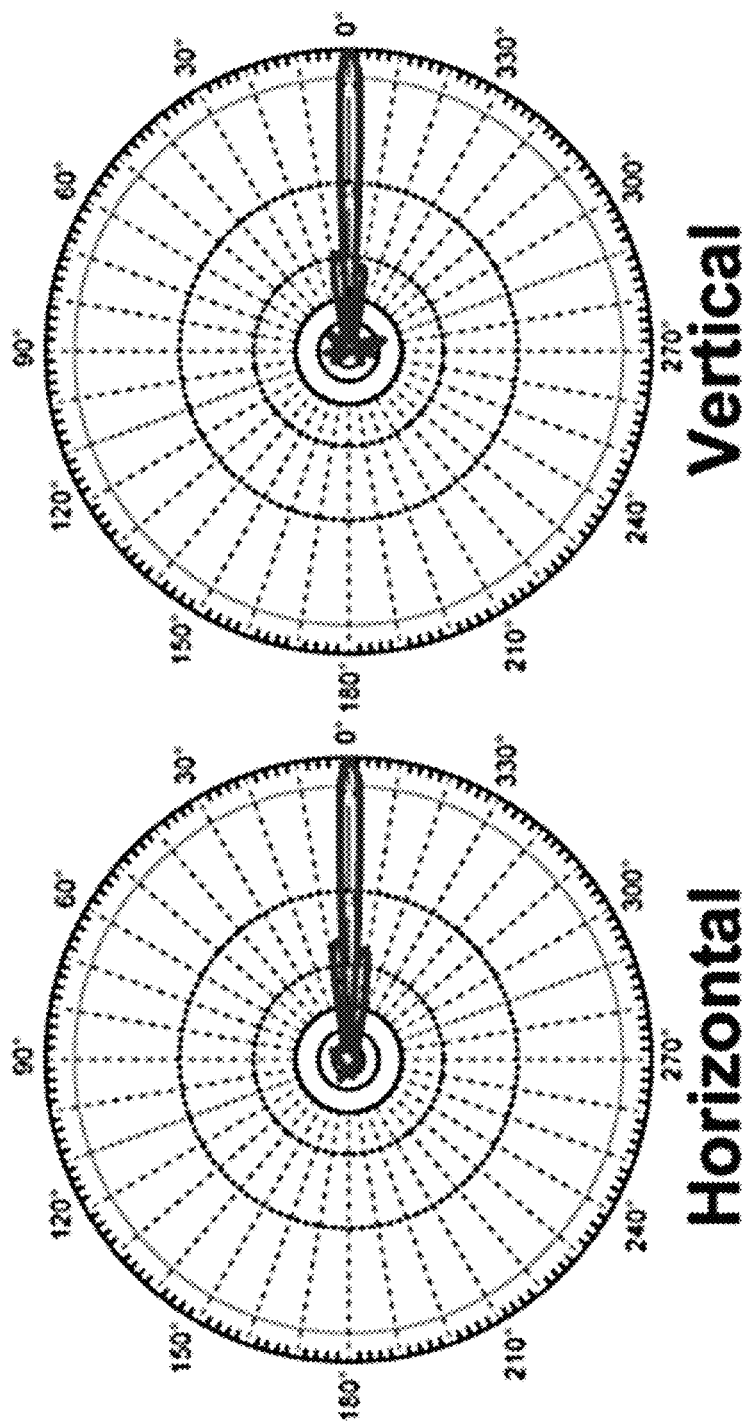
FIG. 3 depicts an example antenna pattern of a Module A type of radio module, in accordance with the present disclosure.

Referring to FIG. 3, an example of an antenna pattern of Module A created by antenna unit 203 is shown. It can be seen from the antenna pattern in FIG. 3 that the beam width of antenna unit 203 of Module A is extremely narrow (less than a degree) and the side lobe power levels start to drop at a rapid rate. For instance, as shown, approximately 5-6 degrees from the main lobe, power levels may drop by more than 30 dB.

It should be understood that the antenna pattern of antenna unit 203 shown in FIG. 3 is just one example showing the extremely narrow beam antenna pattern generation capability of Module A. In other instances, due to a change in antenna elements, size, frequency, etc., different patterns may be generated. Further, while Module A can be constructed using metamaterials described above, it should be understood that Module A can be constructed using a parabolic antenna or other types of antennas. However, it should be understood that the main characteristic of generation of extremely narrow antenna beam pattern is common to all the instances of Module A.

Figure 4:
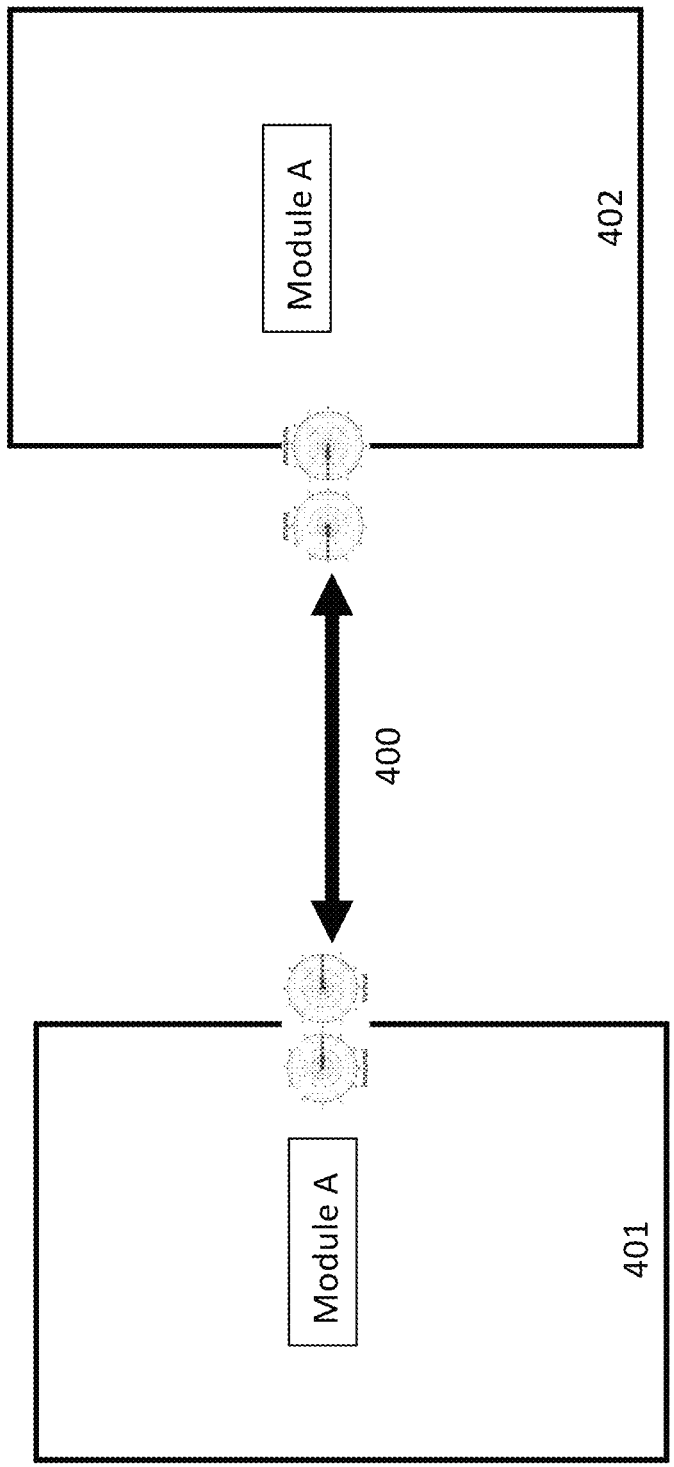
FIG. 4 depicts an example of a point-to-point communication link established between two wireless communication nodes, in accordance with the present disclosure.

Referring to FIG. 4, a ptp wireless communication link 400 established between two wireless communication nodes 401 and 402 is shown. Wireless communication nodes 401 and 402 each host a single communication module (i.e., "Module A") that may take the form similar to Module A depicted in FIG. 2 and described above. As shown in FIG. 4, due to the antenna unit characteristics of each respective Module A in the wireless communication nodes 401 and 402, the bi-directional ptp link 400 may have an extremely narrow beam. This transmission and reception capability of radio signals over an extremely narrow beam via ptp link 400 provides interference immunity in scenarios where there are a large number of wireless communication links established by multiple wireless communication nodes concentrated in a small area and operating in the same frequency.

In some implementations, Module A can additionally provide beam steerability characteristics in addition to the capability of transmitting and receiving data over extremely narrow beams as explained above and illustrated in the context of FIGS. 2-4.

Figure 5:
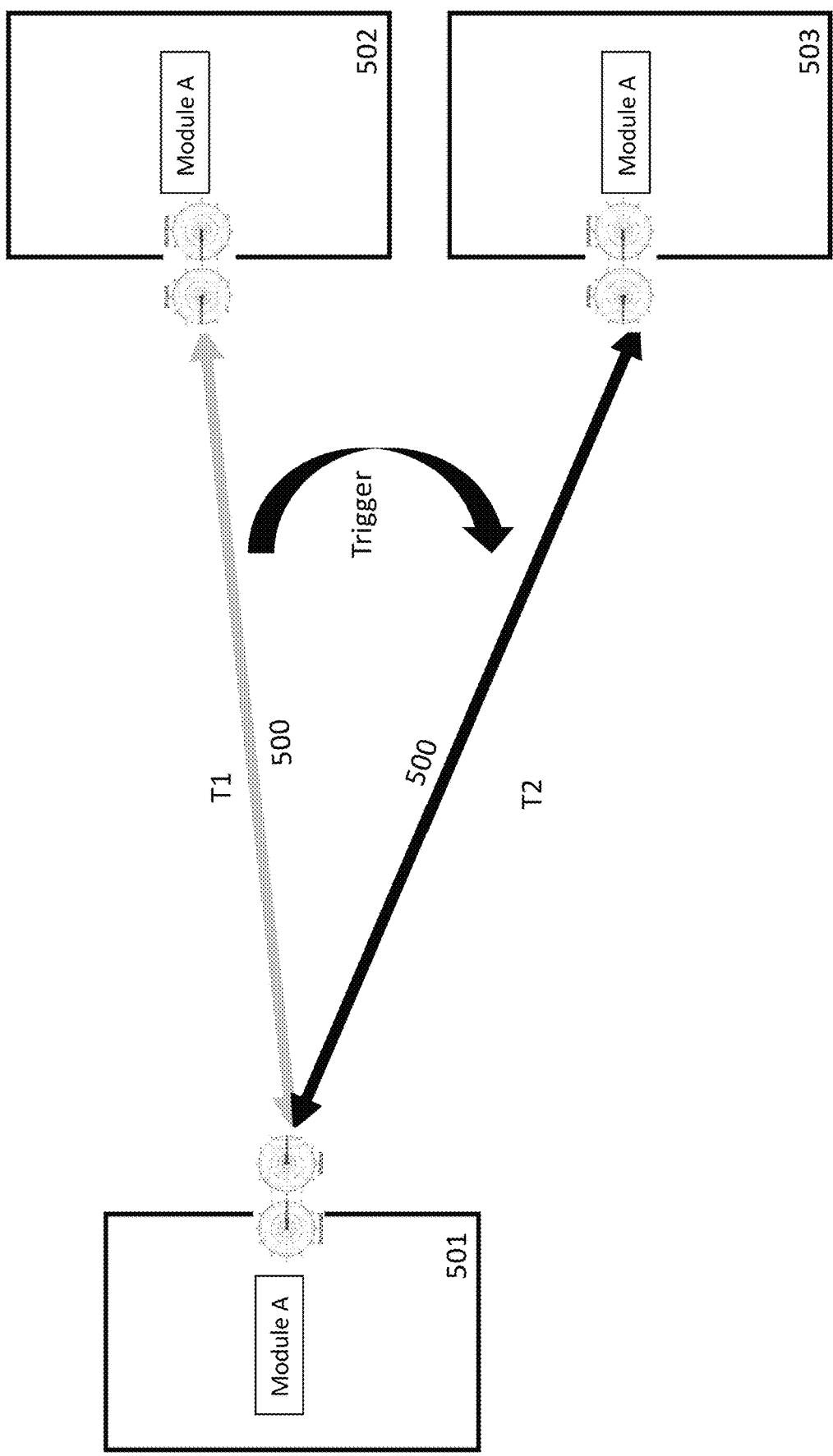
FIG. 5 depicts an example of a wireless communication node invoking beam steering, in accordance with the present disclosure.

For example, referring to FIG. 5, a wireless communication node 501 comprising Module A, a second wireless communication node 502 comprising Module A, and a third wireless communication node 503 comprising Module A is shown. During time T1, Module A of wireless communication node 501 and Module A of wireless communication node 502 work together to establish an extremely narrow beam based bi-directional link 500 for the exchange of information data between wireless communication nodes 501 and 502. Due to some trigger, Module A of wireless communication node 501 may invoke the beam steering capability of the module and change the direction of the antenna transmission and reception beam towards wireless communication node 503 and work together with Module A of wireless communication node 503 to dynamically establish a bi-directional extremely narrow beam-based link 500 between wireless communication node 501 and wireless communication node 503 during time T2. The trigger for this beam steering can be due to changes in the link condition between wireless communication node 501 and wireless communication node 502, which may involve various factors, including but not limited to, a change from a LOS path to a non-LOS path due to a change in environment, increased interference, a change in a position of wireless communication node 502 with respect to wireless communication node 501, and/or instructions from higher layers, etc.

In one embodiment, wireless communication node 503 can be different than wireless communication node 502. In another embodiment, wireless communication node 503 can be the same as wireless communication node 502 but in a different physical location.

In some embodiments, wireless communication nodes defined above and discussed in the context of FIGS. 2-5 can host more than one module. This allows a wireless communication node to communicate simultaneously with multiple other wireless communication nodes of the communication system by establishing multiple extremely narrow beam bi-directional links with the help of multiple modules (e.g., multiple Module As) belonging to different wireless communication nodes working together.

Figure 6:
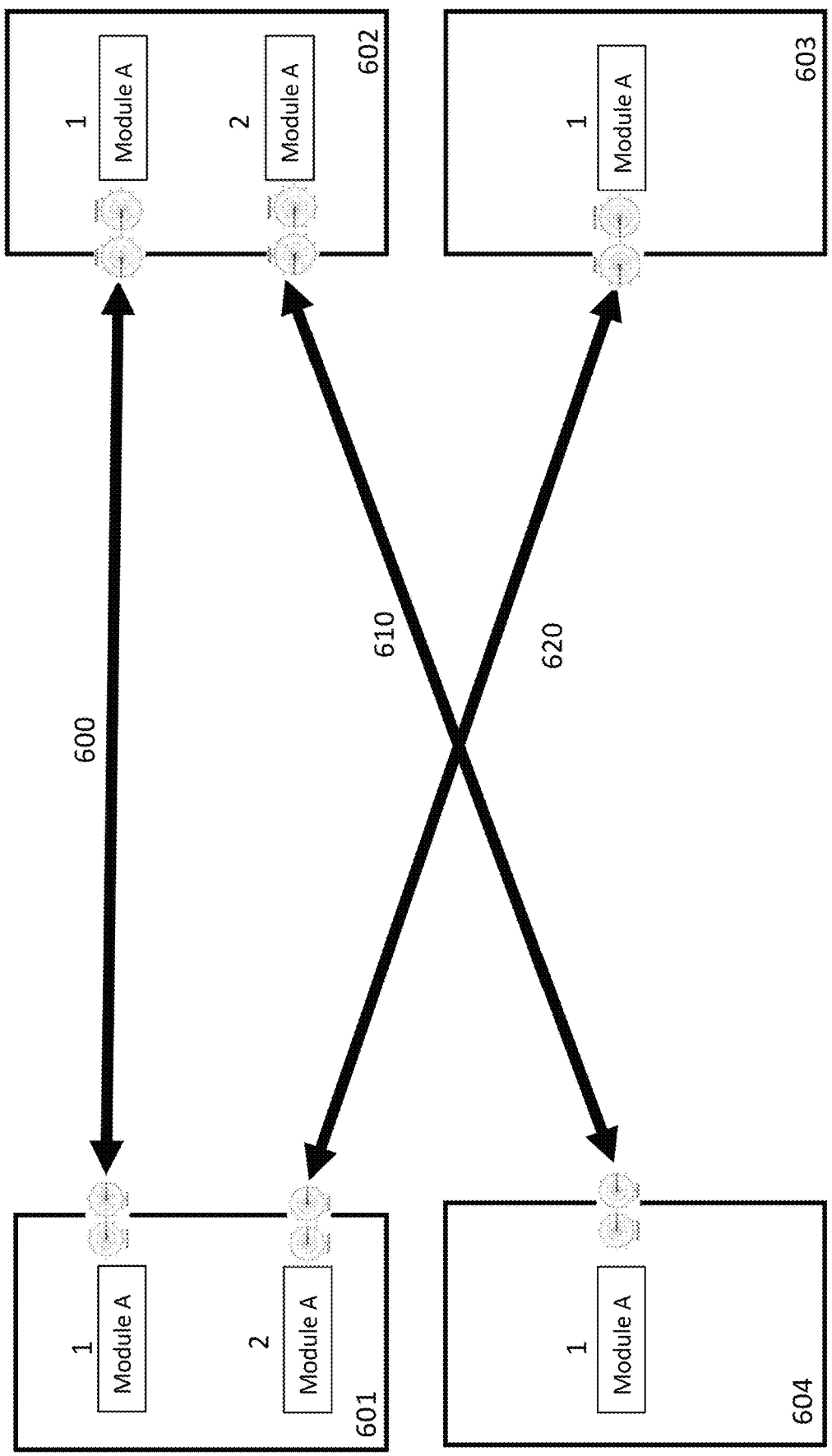
FIG. 6 depicts an example of an arrangement in which certain wireless communication nodes are communicating with multiple other wireless communication nodes, in accordance with the present disclosure.

As one example to illustrate, referring to FIG. 6, wireless communication nodes 601 and 602 each host two Module As labeled "1" and "2," while wireless communication nodes 603 and 604 each host a single Module A. As shown, a $1^{st}$ Module A of wireless communication node 601 and a $1^{st}$ Module A of wireless communication node 602 work together to establish extremely narrow bi-directional beam-based link 600 to provide a wireless connection between wireless communication node 601 and 602. Similarly, a $2^{nd}$ Module A of wireless communication node 601 and 602 and a $1^{st}$ (and only) Module A of wireless communication nodes 603 and 604 respectively work together to establish extremely narrow bi-directional beam-based links 610 and 620 to provide wireless connections between wireless communication nodes 601-603 and 602-604, respectively.

In one embodiment, the $1^{st}$ and $2^{nd}$ Module A of wireless communication nodes 601 and 602 can be inside the same physical enclosure and in other embodiments, the $1^{st}$ Module A of wireless communication nodes 601 and 603 can be inside one physical enclosure and the $2^{nd}$ Module A of wireless communication nodes 601 and 603 can be inside a different physical enclosure. In embodiments where different Module As belonging to the same wireless communication node are contained in separate physical enclosures, these Module As can be connected via a wired link as they are co-located in the same seed home or anchor home.

In FIG. 6, a maximum of two Module As are shown to be contained in a wireless communication node that enables the wireless communication node to establish two independent bi-directional links with different wireless communication nodes simultaneously. However, it should be understood that a wireless communication node can host more than two Module As and the maximum number of Module As that a wireless communication node can host may depend on the maximum total power available to the wireless communication node.

Further, it should be understood that in one embodiment, all Module As belonging to the same wireless communication node may operate on the same carrier frequencies of a frequency band, and in other embodiments, different Module As belonging to same wireless communication node may operate on different carrier frequencies of a frequency band.

Figure 7:
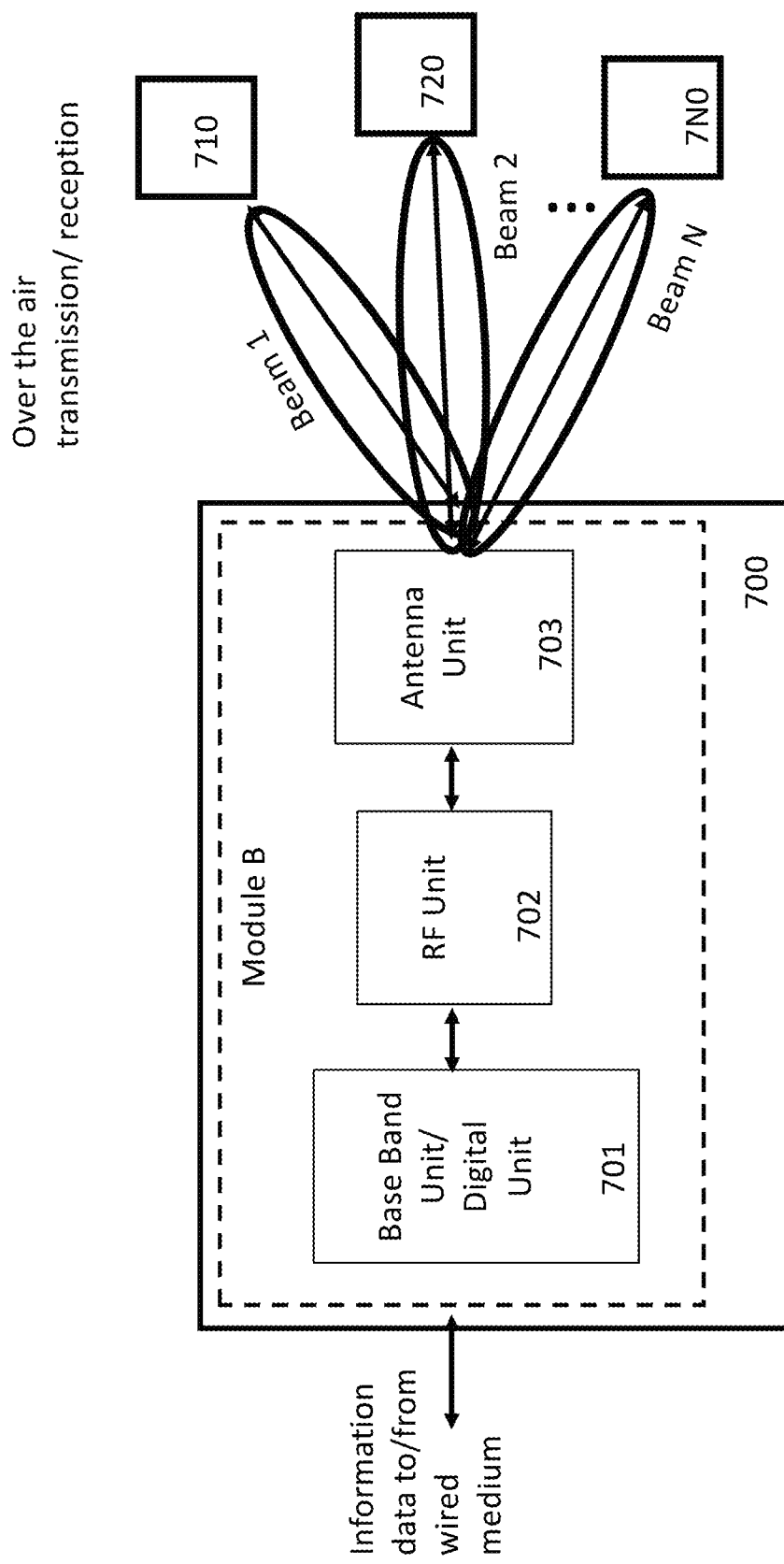
FIG. 7 depicts another possible example of a wireless communication node comprising a Module B type of radio module, in accordance with the present disclosure.

Referring to FIG. 7, another possible example of a wireless communication node of FIG. 1 is shown as a wireless communication node 700 installed with wireless communication equipment that comprises a single module labeled as "Module B," which is one type of ptmp radio module. For purposes of illustration only, wireless communication node 700 of FIG. 7 is shown to be engaging in over-the-air transmission and/or reception with multiple other wireless communication nodes 710 to 7N0.

Module B comprises base band unit or digital unit 701 which runs the physical layer level protocol including digital modulation/demodulation (modem) and other higher layer protocols such as a MAC layer, etc. Base band unit 701 interacts with other nodes of a communication system that are external to the node at which the wireless communication node 700 is installed via wired medium.

Module B also includes RF unit 702, which among other things processes IF signals and defines the frequency range of the radio signals that can be transmitted or received with Module B. RF unit 702 is capable of operating over a wide range of frequencies (e.g., V band frequencies ranging from 57 Ghz to 71 Ghz).

Further, Module B comprises antenna unit 703, which performs the transmission and reception of over the air radio signals. Antenna unit 703 may be an active antenna system (AAS) that comprises a phased array of transmitters and receivers that are capable of beamforming and creating multiple beams simultaneously in different directions. By virtue of the simultaneous creation of multiple beams in different directions, AAS of antenna unit 703 enables the wireless communication node 700 to establish ptmp wireless communication links with multiple wireless communication nodes. Hence Module B with the help of antenna unit 703 is capable of establishing ptmp links with a different module residing in a different wireless communication node.

As further shown in FIG. 7, Module B residing in wireless communication node 700 is shown to create 1 to N multiple beams with the help of AAS of antenna unit 703. Value N depends on the number of transmit and receive antennas in AAS of antenna unit 703. Specifically, it can be seen that wireless communication unit 700 is connected to wireless communication unit 710, wireless communication unit 720, and wireless communication unit 7N0 via bi-directional beam 1, beam 2 and beam N respectively. It can also be seen from the antenna pattern in FIG. 7 that the beam width of the ptmp beams of antenna unit 703 of Module B are not extremely narrow (e.g., 3 dB beam width of 7~10 degree) and side lobes power levels do not start to drop at a rapid rate, which is in contrast to the antenna pattern of the antenna unit belonging to Module A described above and discussed in the context of FIGS. 2-6.

Further, Module B of wireless communication node 700 also differs from Module A (discussed above in the context of FIGS. 2-6) in that the multiple bi-directional links operate in a single frequency range at a given time. For example, signal beams 1 to N that connect wireless communication node 700 to wireless communication nodes 710 to 7N0 respectively may only operate within the same frequency range at a given instant of time. It is to be noted that at a different instant, all beams 1 to N can switch to operate at a frequency range different from the frequency range used in the previous time instant, however, frequency range of an individual beam remains the same as the frequency range of all the other N–1 beams at a given instant of time. Hence, with respect to Module B, although due to phased antenna arrays can create multiple beams to create point-to-multi point links to connect one wireless communication node with multiple wireless communication nodes as shown in FIG. 7, an interference profile at the receiver side with such a ptmp arrangement is inferior to an interference profile of an arrangement where a wireless communication node hosts multiple Module As and creates multiple ptp links as shown in FIG. 6, where wireless communication node 601 uses two Module As to connect to wireless communication node 602 and wireless communication node 603 simultaneously. The main reasons of high interference with Module B may be due to (1) individual phased antenna array-based beams that are not as narrow as extremely narrow beams generated by metamaterial-based antenna of Module A and/or (2) all beams of Module B belonging to one wireless communication unit that cannot operate at different frequency ranges unlike multiple ptp narrow beams of wireless communication node that host multiple Module As.

Figure 8:
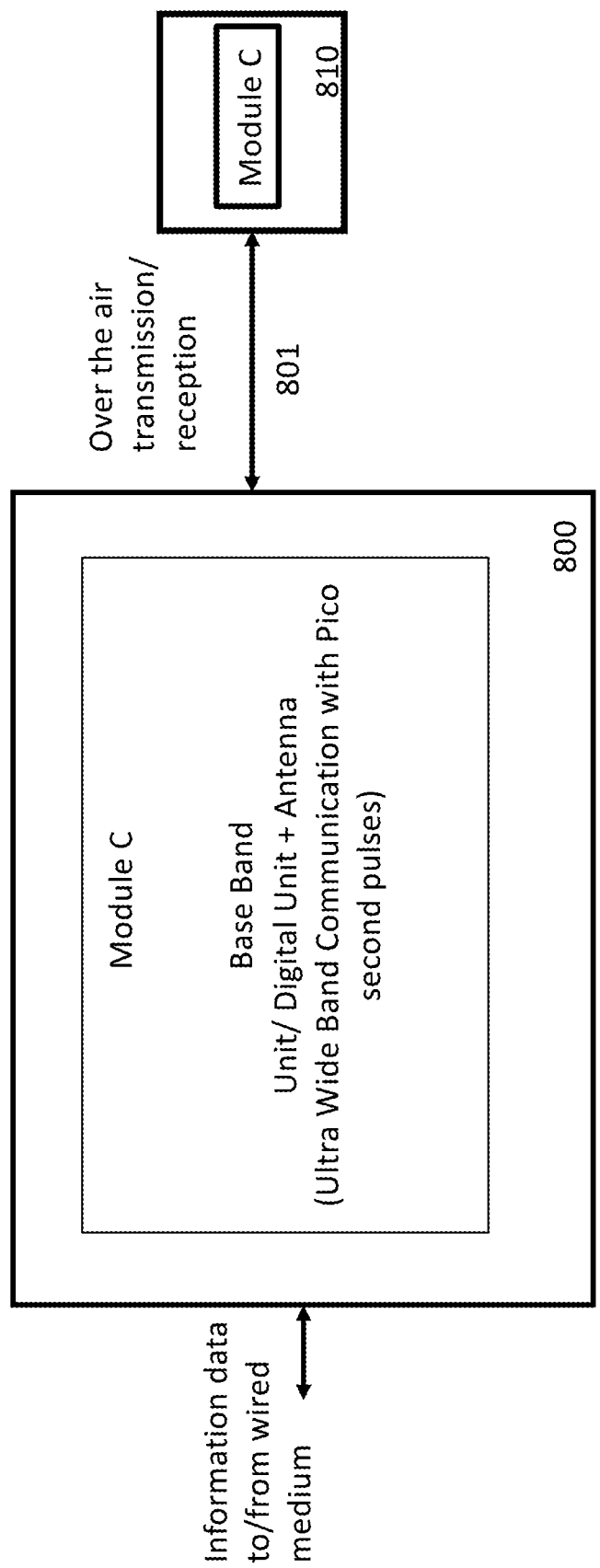
FIG. 8. depicts yet another possible example of a wireless communication node comprising a Module C type of radio module, in accordance with the present disclosure.

Referring to FIG. 8, still another possible example of a wireless communication node of FIG. 1 is shown as a wireless communication node 800 installed with wireless communication equipment that comprises a module labeled as "Module C," which is another type of ptp radio module. For purposes of illustration only, wireless communication node 800 of FIG. 8 is shown to be engaging in over-the-air transmission and/or reception with another wireless communication node 810 that is also hosting a Module C type of ptp radio module.

Module C comprises a base band unit or digital unit which runs the physical layer level protocol including digital modulation/demodulation (modem) and other higher layer protocols such as MAC layer etc. Module C's baseband unit interacts with other nodes of a communication system that are external to the wireless communication node 800 via wired medium.

Module C also includes an ultra-wide band antenna embedded with the baseband unit. Module C is capable of generation, transmission, and reception of extremely short duration pulses (a few picoseconds long) and uses pulse modulation (and its variations such as pulse amplitude modulation, etc.) to transmit data at extremely high rates (e.g., greater than 100 Gbps) by transmitting signals over a very wide range of frequencies. In one embodiment, pulses used for communication by Module C can use frequencies ranging from few hundred megahertz to few hundred gigahertz. One of ordinary skill in the art will appreciate that the range of frequencies used by pulses generated by Module C of wireless communication unit 800 can take a different range as well. Moreover, multiple module Cs can be placed together to create a 1-, 2-, or 3-dimensional array. Elements of this array (e.g., module C) are capable of performing a time synchronized transmission for beam forming. This allows the RF signal energy of the Pico second/UWB pulses to focus in a desired (receiver) direction and can also enable the creation of null or low RF signal energy of the Pico second/UWB pulse in other directions to avoid interference.

One fundamental difference between the characteristic of signals generated by Module C and signals generated by Module A and/or Module B is that these signals generated by Module C are ultra wide band (UWB) signals and their power spectral density over the entire range of frequencies is very low. In this respect, these UWB signals do not create interference with other signals operating on a narrow band of frequencies as these UWB signals are treated as noise by receivers of normal wireless communication nodes.

As further shown in FIG. 8, Module C of wireless communication node 800 and Module C of wireless communication unit 810 establish a link 801 by working together. As explained above, such a communication link 801 operates over an ultra-wide range of frequencies. However, even in the presence of other wireless communication nodes (not shown in FIG. 8) such as wireless communication nodes with Module A or Module B that operate on a narrow band of frequencies compared to Module C of wireless communication node 800, network performance is not impacted as power spectral density over the frequency range of communication link 801 that overlaps with frequency ranges on which a nearby wireless communication node using narrow band signals using for example Module A and/or Module B operates is very low and is treated as noise by the receivers of Module A and/or Module B.

In another embodiment, and in line with the discussion above, a wireless communication node of FIG. 1 can host multiple types of modules. This allows a wireless communication node to communicate simultaneously with multiple wireless communication nodes and with two different interference profiles.

Figure 9:
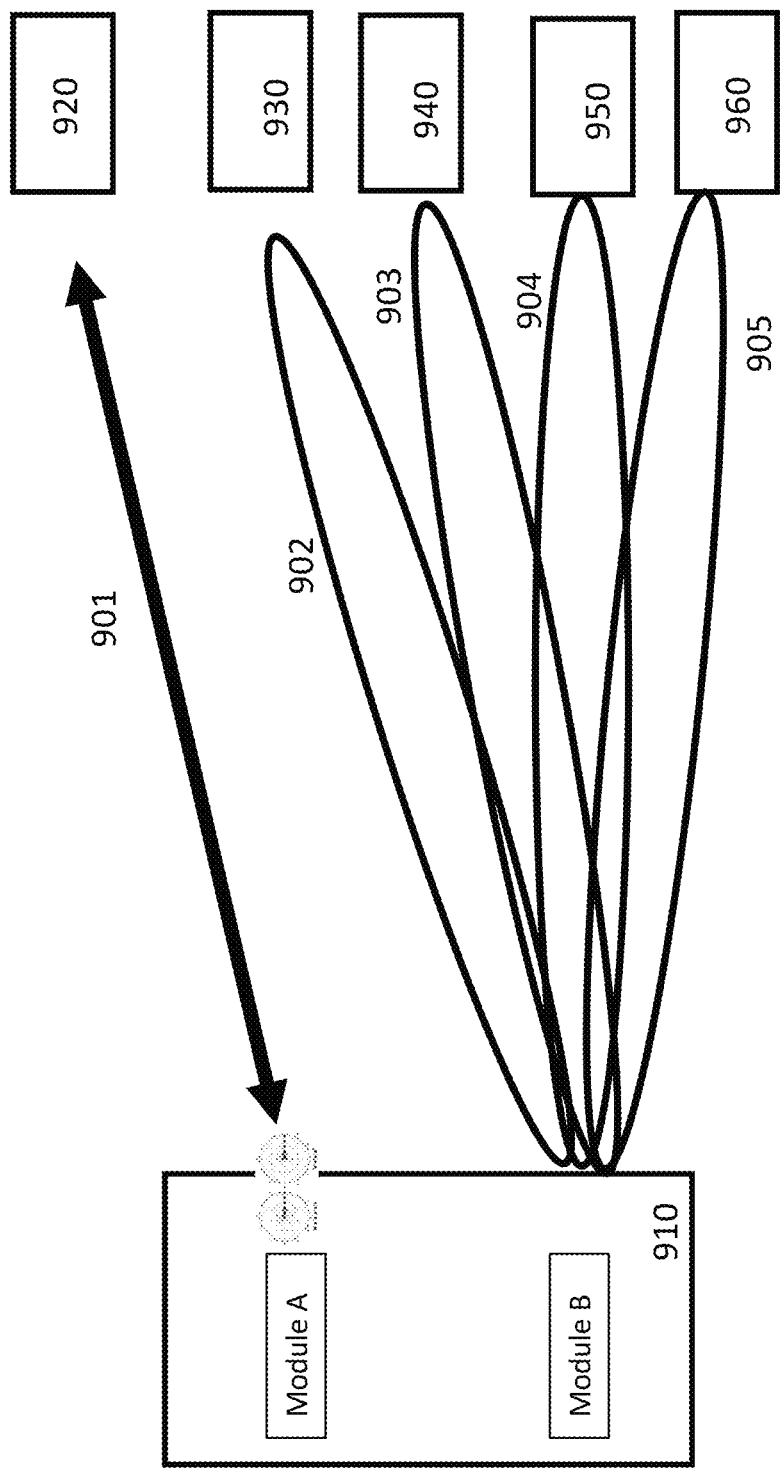
FIG. 9 depicts an example of a wireless communication node comprising Module A and Module C types of radio modules, in accordance with the present disclosure.

As one example to illustrate, referring to FIG. 9, an example wireless communication node 910 is shown that hosts one Module A and one Module B. As shown in FIG. 9, Module A of wireless communication node 910 and a communication module of an example wireless communication node 920 may work together to establish an extremely narrow bi-directional beam-based link 901 to provide wireless connection between wireless communication nodes 910 and 920. Additionally, Module B of wireless communication node 910, which is based on AAS and generates multiple beams simultaneously, may create a ptmp link that connects wireless communication node 910 with example wireless communication nodes 930, 940, 950 and 960. Specifically, Module B of wireless communication node 910 coordinates with (1) a module of wireless communication node 930 to establish bi-directional beam 902, (2) a module of wireless communication node 940 to establish bi-directional beam 903, (3) a module of wireless communication node 950 to establish bi-directional beam 904, and (4) a module of wireless communication node 960 to establish bi-directional beam 905. In one embodiment, extremely narrow beam 901 and group of beams including 902, 903, 904 and 905 may all operate within the same range of carrier frequencies at a given time. In another embodiment, extremely narrow beam 901 may operate within a different range of frequencies compared to the range of frequencies used by the group of beams including 902, 903, 904 and 905 at a given time.

In one embodiment, Module A and Module B of wireless communication node 910 can be inside the same physical enclosure. In other embodiments, Module A and Module B of wireless communication node 910 can be inside two separate physical enclosures. In such embodiments where Module A and Module B belong to the same wireless communication node contained in separate physical enclosures, Module A and Module B can be connected via a wired link as they are co-located in the same seed home or anchor home.

In FIG. 9, a total of two modules (i.e., a single Module A and a single Module B) are shown to be part of a wireless communication node 910 that enables the wireless communication node to establish two independent and different types of bi-directional links with different wireless communication nodes simultaneously. However, it should be understood that wireless communication node 910 can host more than two modules (e.g., a combination of one or more Module As and one or more Module Bs) and the maximum number of total modules that a wireless communication node can host may depend on various factors, including but not limited to the maximum total power available to the wireless communication node. Further, it should be understood that in one embodiment, all modules belonging to same wireless communication node may operate on the same carrier frequencies of a frequency band but in other embodiments, different modules belonging to the same wireless communication node may operate on different carrier frequencies of a frequency band.

As noted above, a wireless communication node of FIG. 1 can host more than one type of module. This allows a wireless communication node to communicate simultaneously with multiple wireless communication nodes and with different interference profiles.

Figure 10:
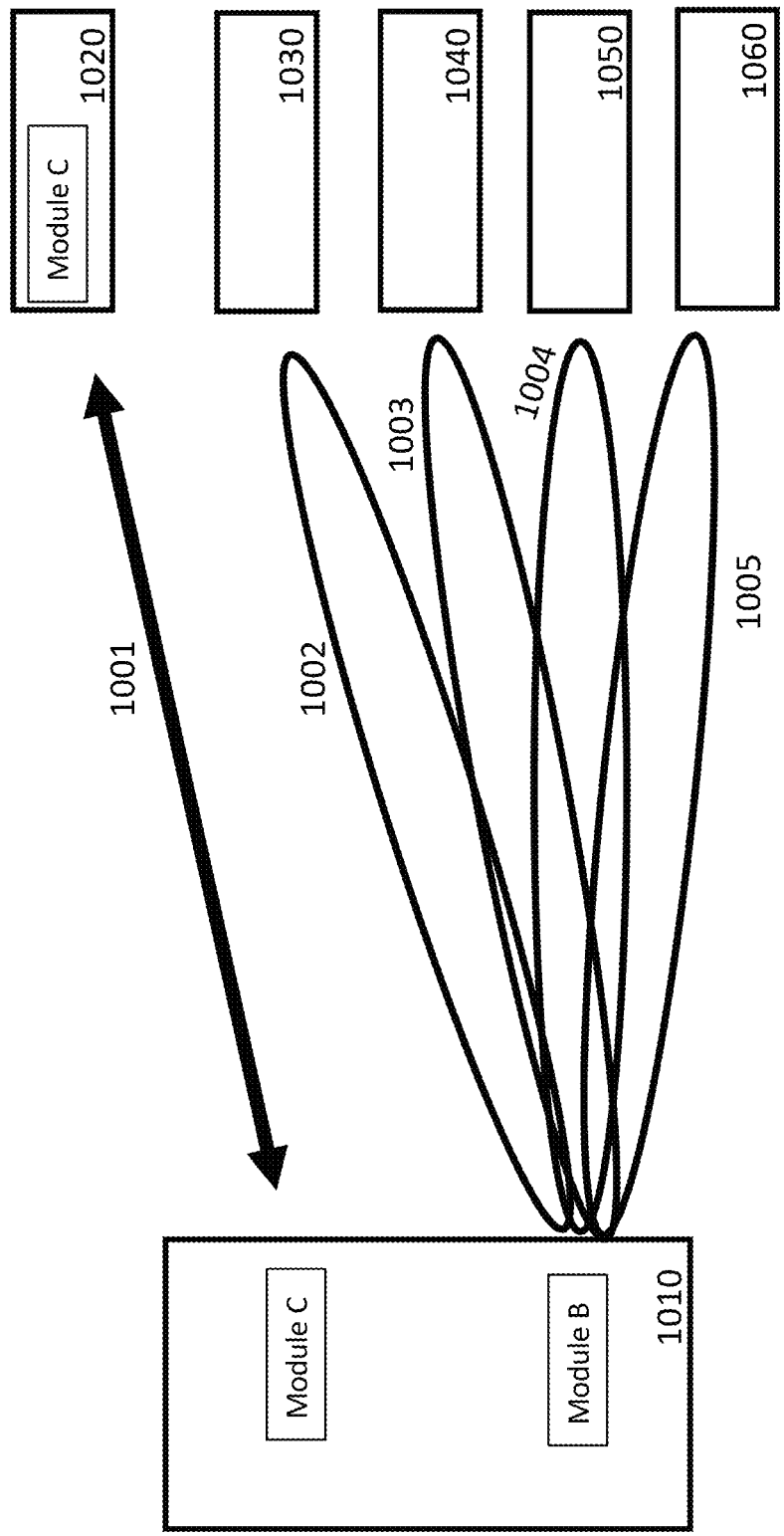
FIG. 10 depicts an example of a wireless communication node comprising Module B and Module C types of radio modules, in accordance with the present disclosure.

As another example to illustrate, referring to FIG. 10, an example wireless communication node 1010 is shown that hosts one Module C and one Module B. As shown in FIG. 10, Module C of wireless communication node 1010 and Module C of an example wireless communication node 1020 may work together to establish extremely high data rate ultra-wide frequency and low power spectral density beam-based link 1001 to provide wireless connection between wireless communication nodes 1010 and 1020. Additionally, Module B of wireless communication node 1010, which is based on AAS and generates multiple beams simultaneously, may create a ptmp link that connects wireless communication node 1010 with example wireless communication nodes 1030, 1040, 1050 and 1060. Specifically, Module B of wireless communication node 1010 coordinates with (1) a module of wireless communication node 1030 to establish bi-directional beam 1002, (2) a module of wireless communication node 1040 to establish bi-directional beam 1003, (3) a module of wireless communication node 1050 to establish bi-directional beam 1004, and (4) a module of wireless communication node 1060 to establish bi-directional beam 1005.

In one embodiment, Module C and Module B of wireless communication node 1010 can be inside same physical enclosure. In other embodiments, Module C and Module B of wireless communication node 1010 can be inside two separate physical enclosures. In such an embodiment where Module C and Module B belong to the same wireless communication node contained in separate physical enclosures, Module C and Module B can be connected via a wired link as they are co-located in same seed home or anchor home.

In FIG. 10, a total of two modules (i.e., a single Module C and a single Module B) are shown to be part of a wireless communication node 1010 that enables the wireless communication node to establish two independent and different types of bi-directional links with different wireless communication nodes simultaneously. However, it should be understood that wireless communication node 1010 can host more than two types of module (e.g., a combination of Module A, Module B and/or Module C) and the maximum number of total modules that a wireless communication node can host may depend on various factors, including the maximum total power available to the wireless communication node. It should be also understood that in one embodiment, all modules belonging to same wireless communication node may operate on same carrier frequencies of a frequency band, while in other embodiments, different modules belonging to same wireless communication node may operate on different carrier frequencies of a frequency band.

In another embodiment, a wireless communication node of FIG. 1 can host more than one type of module and dynamically change the type of link between wireless communication nodes. This allows a wireless communication node to communicate simultaneously with multiple wireless communication nodes and with different interference profiles and to adapt with changes in the network environment.

Figure 11A:
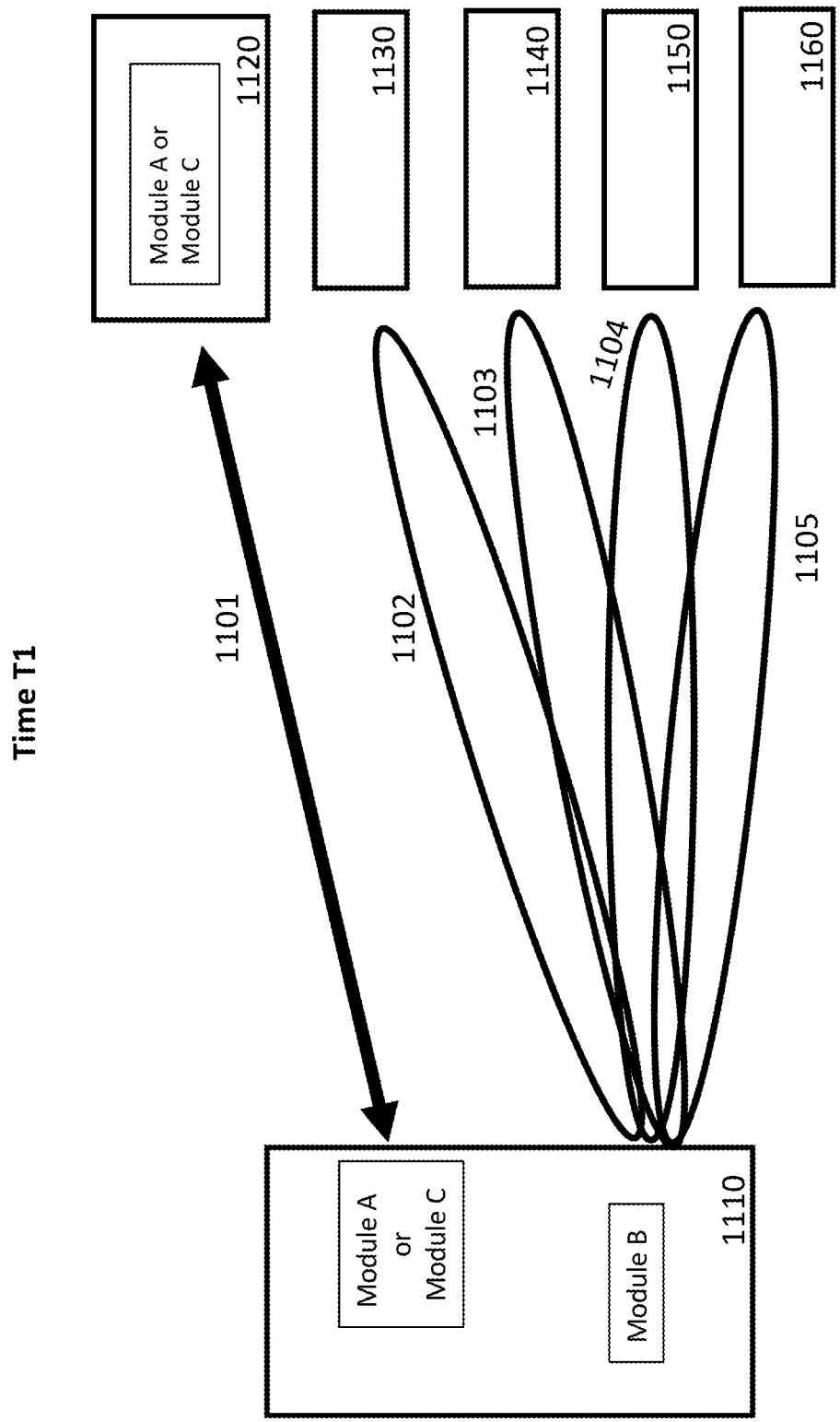
FIG. 11A depicts an example of a wireless communication node communicating with multiple other wireless communication nodes at a first time, in accordance with the present disclosure.

As one example to illustrate, referring to FIG. 11A, an example wireless communication node 1110 is shown that hosts a Module C or Module A along with a Module B. During time T1, Module A/Module C of wireless communication node 1110 and a communication module of an example wireless communication node 1120 may work together to establish either an extremely high date rate ultra-wide frequency low power spectral density beam or an extremely narrow beam-based link 1101 to provide a wireless connection between wireless communication nodes 1110 and 1120. At substantially the same time duration T1, Module B of wireless communication node 1110, which is based on AAS and generates multiple beams simultaneously, may create a ptmp link that connects wireless communication node 1110 with example wireless communication nodes 1130, 1140, 1150 and 1160. Specifically, Module B of wireless communication node 1110 coordinates with (1) a module of wireless communication node 1130 to establish bi-directional beam 1102, (2) a module of wireless communication node 1140 to establish bi-directional beam 1103, (3)

a module of wireless communication node 1150 to establish bi-directional beam 1104, and (4) a module of wireless communication node 1160 to establish bi-directional beam 1105.

Figure 11B:
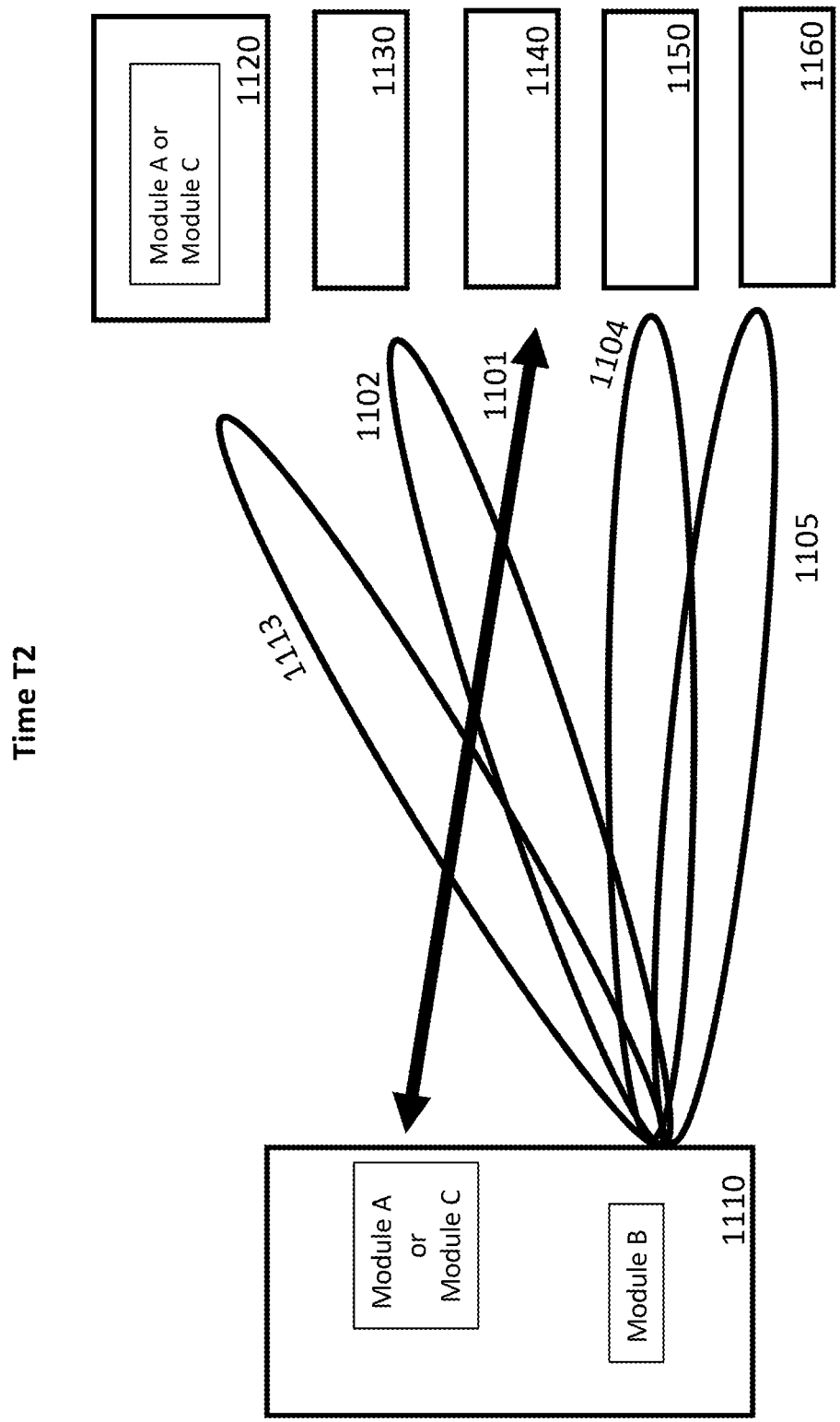
FIG. 11B depicts an example of a wireless communication node communicating with multiple other wireless communication nodes at a second time after the wireless communication node has engaged in beam steering to dynamically change its wireless connections, in accordance with the present disclosure.

Referring to FIG. 11B, at a different time T2, due to some trigger, Module A/Module C of wireless communication node 1110 may dynamically switch its wireless link from wireless communication node 1120 to wireless communication node 1140 by steering the beam towards wireless communication node 1140. At the same time or after receiving instructions from a higher layer, Module B of wireless communication node 1110 disconnects its link with wireless communication node 1140 via beam 1103 and generates a new beam 1113 in the direction of wireless communication node 1120 and establishes connection with wireless communication node 1120. Trigger for this beam steering can be due to changes in the link condition between wireless communication node 1110 and wireless communication node 1120 or 1140, which may involve various factors, including but not limited to change from a LOS path to a non-LOS path due to a change in environment, increased interference, a change in position of wireless communication node 1120 or 1140 with respect to wireless communication node 1110, instructions from higher layers, etc.

As shown in FIGS. 11A-B, dynamic link switching may occur between wireless communication nodes 1110, 1120 and 1140. However, it should be understood that dynamic switching can also occur between different communication nodes.

In some instances, one or more wireless communication nodes of FIG. 1 may leave the wireless mesh network. In such case, links between nodes may be dropped and the communication network may dynamically re-align itself by adjusting/switching link types between the remaining number of wireless communication nodes in the wireless mesh network to best suit the needs to the wireless communication nodes and the wireless mesh network.

In some embodiments, wireless communication nodes 1120, 1130, 1140, 1150 and 1160 can host multiple modules of the same or different types. For example, one or more of wireless communication nodes 1120, 1130, 1140, 1150 and 1160 can host one Module A and one Module B. Hence, when wireless communication node 1110 makes a ptp link using its Module A or Module C with a first communication module (e.g., Module A or C) of wireless communication nodes 1120, 1130, 1140, 1150 and 1160, then a second communication module (e.g., Module B) of wireless communication nodes 1120, 1130, 1140, 1150 and 1160 can simultaneously create ptmp wireless communication links with other modules of wireless communication nodes in the communication system that are not shown here. Similarly, when wireless communication node 1110 makes a ptmp link using its Module B with the first communication module (e.g., Module A or C) of wireless communication nodes 1120, 1130, 1140, 1150 and 1160, then the second communication module (e.g., Module B) of wireless communication nodes 1120, 1130, 1140, 1150 and 1160 can simultaneously create ptmp wireless communication links with other modules of wireless communication nodes in the communication system that are not shown here.

As another example, one or more of wireless communication nodes 1120, 1130, 1140, 1150 and 1160 can host two Module As or Module Cs. Hence, when wireless communication node 1110 makes a ptp link using its Module A or Module C with the first Module A or C of wireless communication nodes 1120, 1130, 1140, 1150 and 1160, then the second Module A or Module C of wireless communication nodes 1120, 1130, 1140, 1150 and 1160 can simultaneously create ptp wireless communication links with other modules of wireless communication nodes in the communication system that are not shown here. Similarly, when wireless communication node 1110 makes a ptmp links using its Module B with the first communication modules (Module A or C) of wireless communication nodes 1120, 1130, 1140, 1150 and 1160, then the second Module A or C of wireless communication nodes 1120, 1130, 1140, 1150 and 1160 can simultaneously create ptp wireless communication links with other modules of wireless communication nodes in the communication system that are not shown here.

As yet another example, wireless communication nodes 1120, 1130, 1140, 1150 and 1160 can host multiple Module As or Module Cs and a Module B. For instance, one or more of wireless communication nodes 1120, 1130, 1140, 1150 and 1160 can host two Module As or Module Cs and one Module B. Hence, when wireless communication node 1110 makes a ptp link using its Module A or Module C with a first Module A or C of wireless communication nodes 1120, 1130, 1140, 1150 and 1160, then a second Module A or Module C of wireless communication nodes 1120, 1130, 1140, 1150 and 1160 can simultaneously create ptp wireless communication links with a third communication module (e.g., Module B) of wireless communication nodes 1120, 1130, 1140, 1150 and 1160 can simultaneously create ptmp wireless communication links with other modules of wireless communication nodes in the wireless mesh network that are not shown here. Similarly, when wireless communication node 1110 makes a ptmp link using its Module B with the first communication module (e.g., Module A or C) of wireless communication nodes 1120, 1130, 1140, 1150 and 1160, then the second communication module (e.g., Module A or C) of wireless communication nodes 1120, 1130, 1140, 1150 and 1160 can simultaneously create ptp wireless communication links with other modules of wireless communication nodes in the mesh network that are not shown here and a third communication module (e.g., Module B) of wireless communication nodes 1120, 1130, 1140, 1150 and 1160 can simultaneously create ptmp wireless communication links with other modules of wireless communication nodes in the mesh network that are not shown here.

It is to be noted that wireless communication links established by Module A or Module C have high reliability due to interference immunity either due to extremely narrow beams or due to transmission of data over ultra-high bandwidth. These features make these links more suitable to carry control information and data for multiple users of a communication system that is based on the wireless mesh network technologies disclosed herein. Hence links established by Module A or Module C can act as a wireless backhaul for a communication system while links established with Module B can provide access to individual users of the communication system.

In one embodiment, an entire wireless mesh network can be composed of ptp links where both links providing backhaul and access have interference immunity. Although such links are more expensive due to the requirement of separate modules to establish individual links, such links are suitable when certain high service quality or reliability is required to be ensured for all end users of the service(s) delivered via the wireless mesh network.

Figure 12:
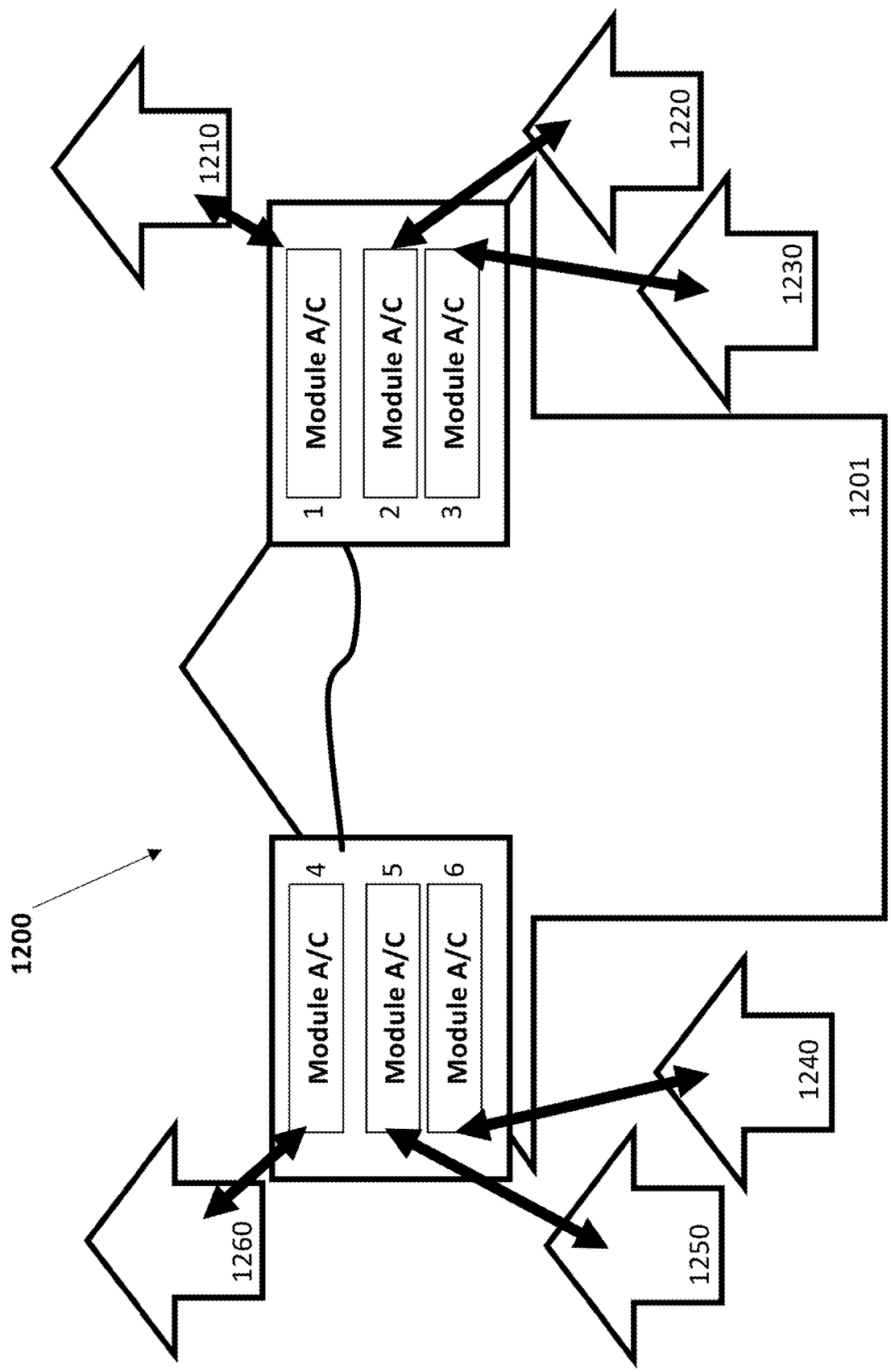
FIG. 12 depicts an example of a site at which at which a seed or an anchor node of a wireless mesh network has been deployed, in accordance with the present disclosure.

For example, FIG. 12 shows a site 1200 at which a seed or an anchor node of a wireless mesh network has been deployed. Site 1200 hosts wireless communication node 1201 that includes a total of 6 communication modules that each take the form of a Module A or Module C type of ptp module. Hence wireless communication node 1201 is capable of establishing six ptp links. As shown, wireless communication node 1201 uses a $1^{st}$ and 4th Module A/Module C to establish connections with site 1210 and site 1260 that serve as backhaul links, while wireless communication node 1201 uses a $2^{nd}$, $3^{rd}$, $5^{th}$ and $6^{th}$ Module A/Module C to establish ptp links with sites 1220, 1230, 1250 and 1240 to provide access links. In this respect, links between sites 1200 and 1220, sites 1200 and 1230, sites 1200 and 1240, and sites 1200 and 1250 only carry data for individual users, whereas links between sites 1200 and 1260 and sites 1200 and 1210 carry signaling and data for all the sites including 1200, 1210, 1220, 1230, 1240, 1250 and 1260.

In another embodiment, a wireless mesh network can be composed of combination of ptp links and ptmp links, where the ptp links generally serve as backhaul links for carrying aggregated mesh access traffic for the wireless mesh access network and the ptmp links generally serve as access links for carrying individual mesh access traffic to individual users. In this respect, the ptp links and ptmp links may be considered to define different "layers" (or "segments") of the wireless mesh access network. Although such a wireless mesh network does not necessarily provide interference immunity to all the end users of the service(s) delivered via the wireless mesh network due to presence of ptmp links, such a wireless mesh network is less expensive due to the non-requirement of separate modules to establish individual links and may also be better suited for adding client nodes that do not have predefined locations.

Figure 13:
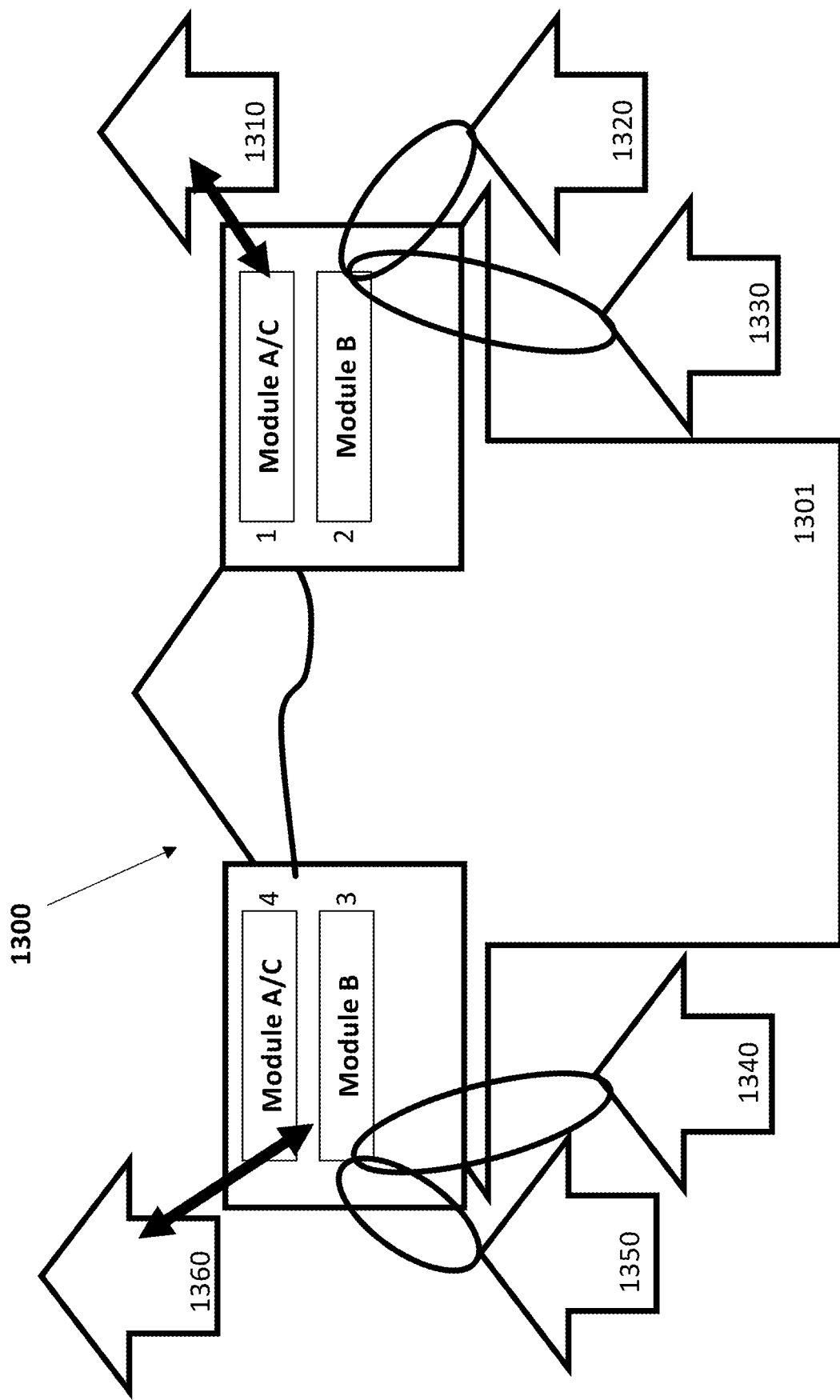
FIG. 13 depicts another example of a site at which at which a seed or an anchor node of a wireless mesh network has been deployed, in accordance with the present disclosure.

For example, FIG. 13 shows a site 1300 at which a seed or an anchor node of a wireless mesh network has been deployed. Site 1300 hosts a wireless communication node 1301 that includes a total of 4 communication modules, two of which take the form of ptp modules (e.g., Module A and/or Module C) and two of which take the form of ptmp modules (e.g., Module B). Hence this wireless communication node is capable of establishing two ptp links and two ptmp links. As shown, wireless communication node 1301 uses a $1^{st}$ and $4^{th}$ Module A/Module C to establish connections with site 1310 and site 1360 that serve as backhaul links, while wireless communication node 1301 uses a $2^{nd}$ Module B to establish ptmp links with sites 1320, 1330 and uses a $3^{rd}$ Module B to establish ptmp links with sites 1350 and 1340 to provide access links. In other words, links between sites 1300 and 1320, sites 1300 and 1330, sites 1300 and 1340 and sites 1300 and 1350 only carry data for individual users, whereas links between sites 1300 and 1360 and sites 1300 and 1310 carry signaling and data for all the sites including 1300, 1310, 1320, 1330, 1340, 1350 and 1360.

Figure 14:
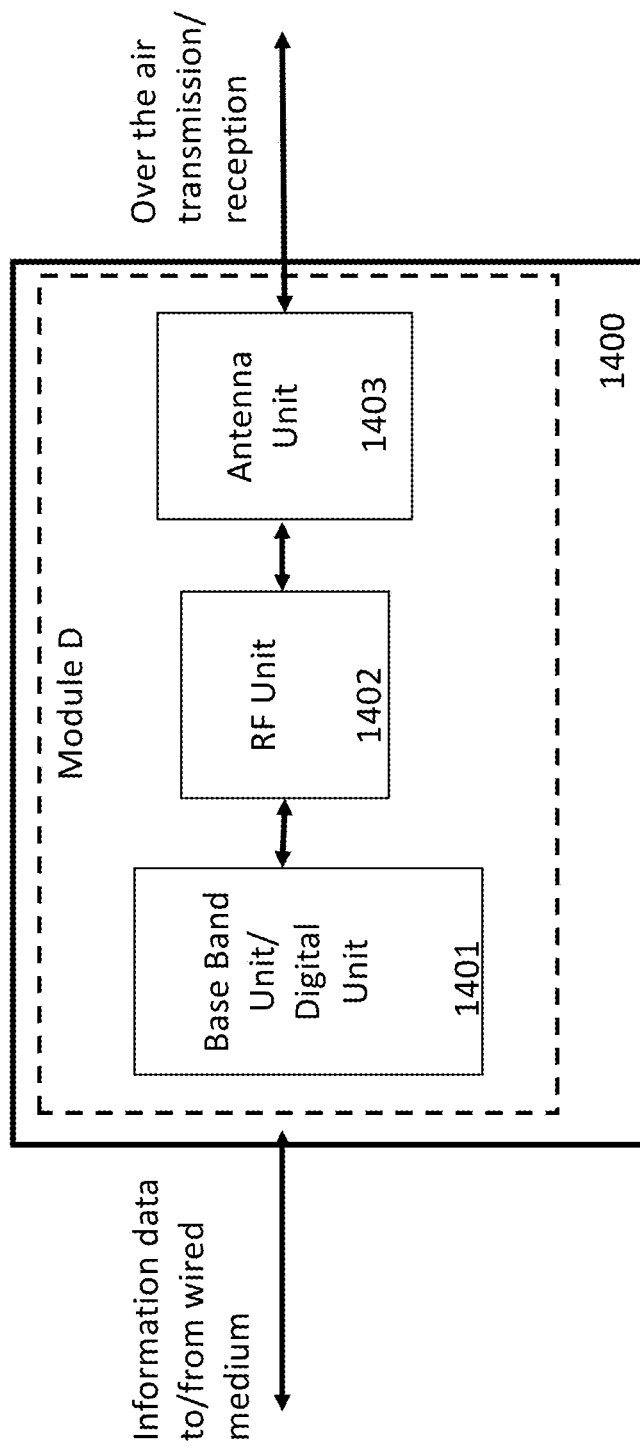
FIG. 14 depicts another example of wireless communication node comprising a Module D type of radio module, in accordance with the present disclosure.

Referring to FIG. 14, another possible example of a wireless communication node of FIG. 1 is shown as a wireless communication node 1400 installed with wireless communication equipment that comprises a single module labeled as "Module D." Module D comprises base band unit or digital unit 1401 which runs the physical layer level protocol including digital modulation/demodulation (modem) and other higher layer protocols such as MAC layer, etc. Base band unit 1401 interacts with other nodes of the communication system that are external to the wireless communication node 1400 via wired medium.

Module D also includes RF unit 1402, which among other things processes IF signals and defines the frequency range of the radio signals that can be transmitted or received with the Module D. RF unit 1402 is capable of operating over a wide range of frequencies (e.g., 5 Ghz band frequencies ranging from 5 Ghz to 6 Ghz).

Further, as shown, Module D also comprises antenna unit 1403 which performs the transmission and reception of over the air radio signals. Antenna unit 1403 is capable of transmitting and receiving extremely narrow beam of signals. Antenna unit 1403 may be constructed with either 1-dimensional or 2-dimensional antenna element arrays that have excellent properties of controlling the directionality of radio signals using beam forming and can propagate even in a non-line of sight environment. Module D with the help of antenna unit 1403 is capable of establishing ptmp links with a tower capable of performing massive MIMO (multiple input multiple output) beams. In one embodiment, Module D can be designed and manufactured at least in part using ASIC (Application specific integrated circuit) and an integrated RF unit called RFIC.

Figure 15:
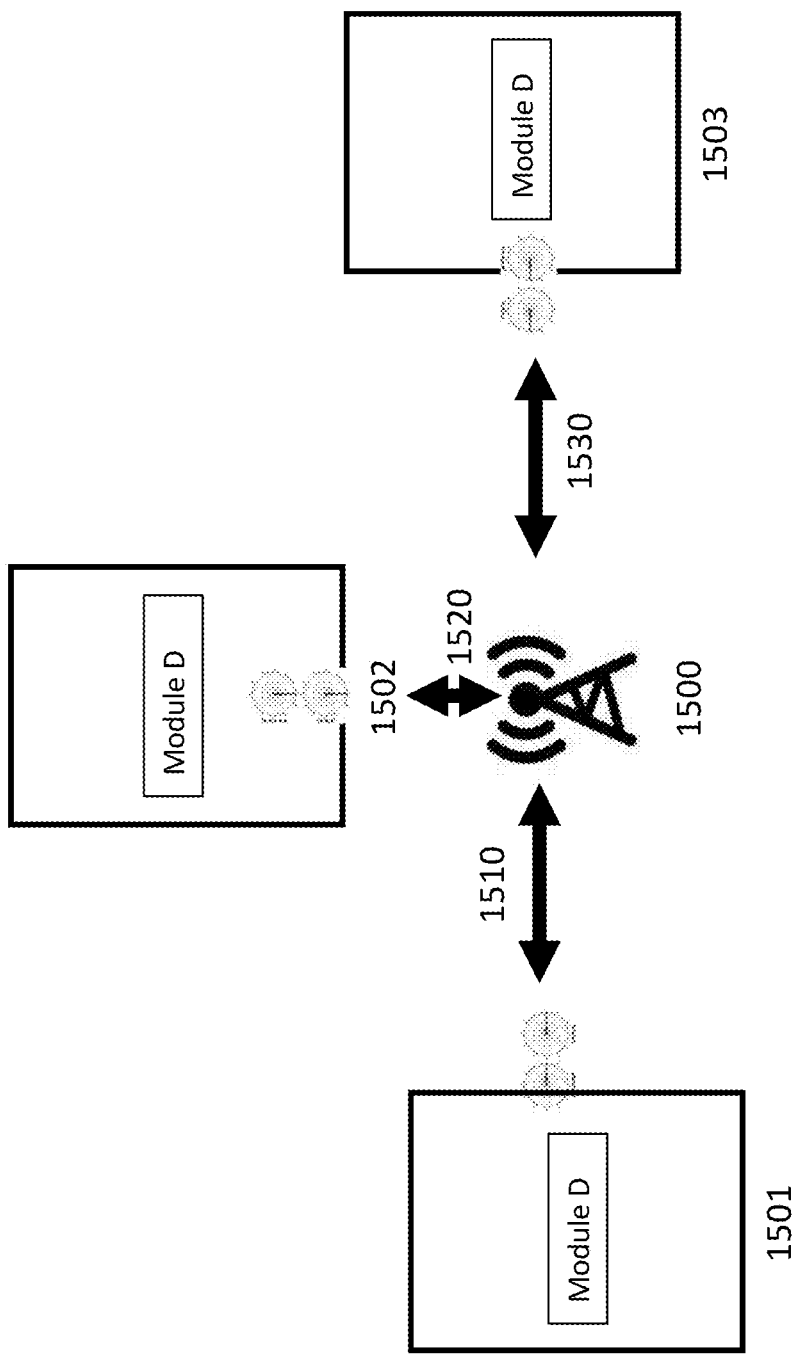
FIG. 15 depicts an example of multiple wireless communication nodes comprising a Module D type of radio modules connected to a tower, in accordance with the present disclosure.

Referring to FIG. 15, an example of multiple Module Ds connected to a tower 1500 is shown. Specifically, wireless communication node 1501 hosting a Module D described above is connected to tower 1500 via massive MIMO beam link 1510 that can be both line-of-sight and non-line-of-sight, wireless communication node 1502 hosting a Module D described above is connected to tower 1500 via massive MIMO beam link 1520 that can be both line-of-sight and non-line-of-sight, and wireless communication node 1503 hosting a Module D described above is connected to tower 1500 via massive MIMO beam link 1530 that can be both line-of-sight and non-line-of-sight. The tower 1500 is equipped with a Massive MIMO module that can create multiple bi-directional narrow beam links simultaneously in all directions with 360 degrees of coverage area. In one embodiment, tower 1500 can operate in the 5 Ghz band including frequencies ranging from 5000 Mhz to 6000 Mhz. In other embodiments, tower 1500 and associated wireless communication nodes 1501, 1502 and 1503 can operate within a different frequency band.

It should be understood that while FIG. 15 shows only one tower and three wireless communication nodes hosting Module D in the communication system, a given communication system can have multiple towers similar to tower 1500 and these towers can each be connected to a large number of wireless communication nodes hosting various other modules.

In accordance with the present disclosure, the route that a particular packet takes from a source to a destination may be dynamically selected based on factors including but not limited to link quality, loading, latency etc. For example, referring to FIG. 16, communication system 1600 is shown that is similar to communication system 100 and has all the components described in the context of FIG. 1. Additionally, communication system 1600 of FIG. 16 includes a tower 1610 which is similar to tower 1500 described in the context of FIG. 15. In contrast to communication system 100 in FIG. 1, the wireless communication equipment 131, 132, 133, 134 and 135 at the seed and anchor nodes of the communication system may include an additional Module D besides Module A/Module B or Module C that enables these wireless communication nodes to optionally establish bi-directional links having the features described in the context of FIGS. 14-15 with tower 1610 using massive MIMO beamforming capabilities. Such links labeled as 1601, 1602, 1603, 1604 and 1605 can work in both line-of-sight and non-line of sight environment and can provide alternate communication paths to the seed and/or anchor nodes of the communication system in an event where a ptp or ptmp link that connects one such wireless communication node to a peer wireless communication node to form a wireless mesh network fails or experiences performance degradation due to various reasons including but not limited to a change in the line-of-sight profile of a millimeter-wave link between two wireless communication nodes.

Figure 16:
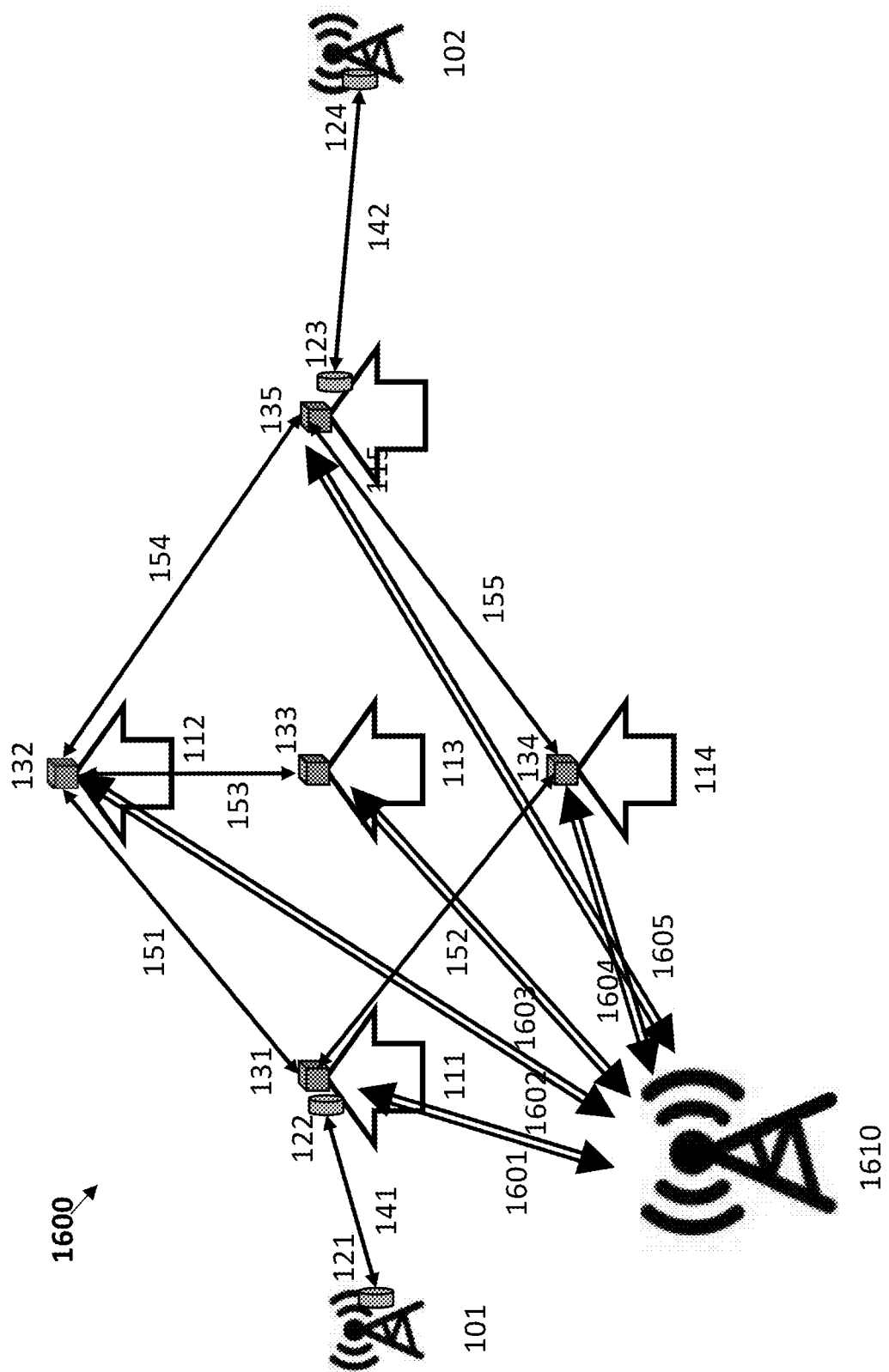
FIG. 16 depicts another example of a communication system that comprises a wireless mesh network, in accordance with the present disclosure.

In FIG. 16, only one tower (i.e., tower 1610) capable of massive MIMO ptmp communication is shown to be connected to the five wireless communication nodes of the communication system. However, it should be understood that a communication system can also have more than one tower, each connected to multiple different wireless communication nodes hosting various other modules.

In areas within tower 1500's (and other towers of same type) coverage area, a given communication system can initially start in a ptmp manner, where tower 1500 (and other towers of same type) provides access to individual customers using sub 6 Ghz massive MIMO ptmp beams. Later, nodes in the given communication system can opportunistically connect with other nodes using regular modules (e.g., Module A/Module B/Module C) in the presence of line-of-sight. This way, the given communication system may evolve to form a wireless mesh network with ptp and ptmp connections between nodes in addition to each communication node having a path directly (non-line-of-sight) to tower 1500 (and other towers of same type) that fall within the coverage area.

One of ordinary skill in the art will appreciate that a route a given packet takes from a source to a destination in this communication system may be optimized by considering various factors including latency, congestion, reliability etc. One of ordinary skill in the art will also appreciate that a given communication system can later add seed nodes (e.g., the seed nodes hosted at seed homes 111 and 115 in FIG. 1) along with tower/fiber access points 101 and 102 to provide alternate backhaul as per need basis.

In another embodiment, instead of providing massive MIMO ptmp networking capability using a terrestrial tower, ptmp massive MIMO capability to wireless communication nodes can also be provided by a satellite, such as a low earth orbit (LEO) satellite. For example, referring to FIG. 17, communication system 1700 is shown that is similar to communication system 100 and has all the components described in the context of FIG. 1. Additionally, system 1700 of FIG. 17 includes a satellite 1710 which is capable of massive MIMO transmission and reception on frequencies including but not limited to 5-6 Ghz, similar to tower 1500 described in the context of FIG. 15. In contrast to communication system 100 in FIG. 1, the wireless communication equipment 131, 132, 133, 134 and 135 at the seed and anchor nodes of the communication system may include an additional Module D (besides Module A/Module B or Module C) that enables these wireless communication nodes to optionally establish bi-directional links having the features described in the context of FIGS. 14-15 with satellite 1710 using massive MIMO beamforming capabilities. Such links labelled as 1701, 1702, 1703, 1704 and 1705 can provide alternate communication paths to the seed and/or anchor nodes of the communication system in an event where a ptp or ptmp link that connects one such wireless communication node to a peer wireless communication node to form a wireless mesh network fails or experiences performance degradation due to various reasons including but not limited to a change in the line-of-sight profile of a millimeter-wave link between two wireless communication nodes.

Figure 17:
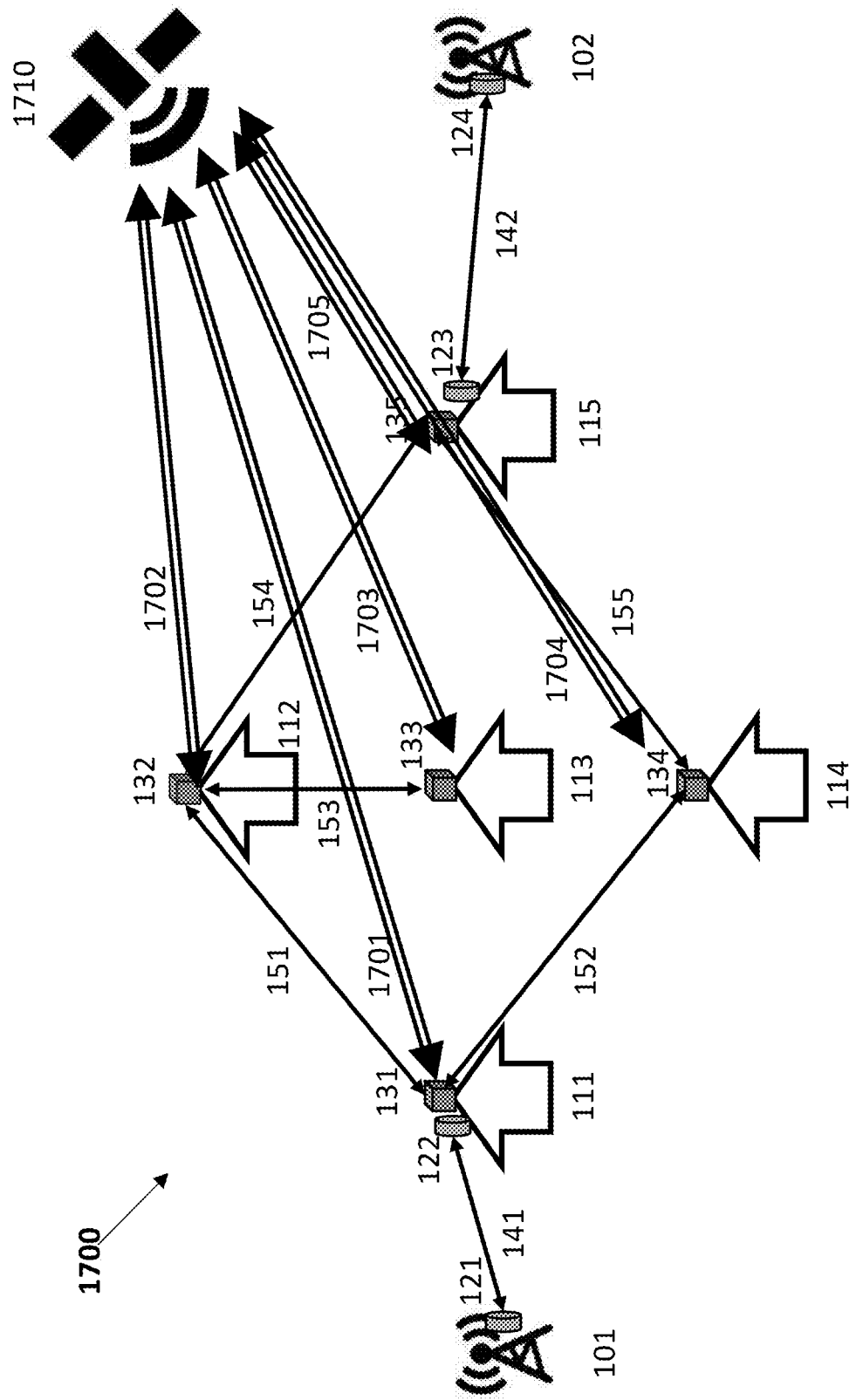
FIG. 17 depicts yet another example of a communication system that comprises a wireless mesh network, in accordance with the present disclosure.

In FIG. 17, only one satellite 1710 capable of massive MIMO ptmp communication is shown to be connected to the five wireless communication nodes of the communication system. However, it should be understood that a communication system can also have more than one satellite, each connected to multiple different wireless communication nodes hosting various other modules.

In another embodiment, some of the wireless communication nodes that provide backhaul functionality can be equipped with multiple communication modules that enable these wireless communication nodes to transport backhaul data between an end user and a core network using multiple different types of communication links. For example, referring to FIG. 18, communication system 1800 is shown that is similar to communication system 100 and has all the components described in the context of FIG. 1. Additionally, system 1800 of FIG. 18 includes a satellite 1810 which is capable of massive MIMO transmission and reception on frequencies including but not limited to 5-6 Ghz, similar to tower 1500 described in the context of FIG. 15. System 1800 also includes a massive MIMO cable tower 1820 which is also similar to tower 1500 described in the context of FIG. 15.

In contrast to communication system 100 in FIG. 1, the wireless communication equipment 131, 132, 133, 134 and 135 at the seed and anchor nodes of the communication system may include an additional Module D (besides Module A/Module B or Module C) that enables these wireless communication nodes to optionally establish bi-directional links having the features described in the context of FIGS. 14-15 with satellite 1810 and tower 1820 using massive MIMO beamforming capabilities. Such links labeled as 1801, 1802, 1803 and 1804 can provide alternate communication paths to the seed and/or anchor nodes of the communication system in an event where a ptp or ptmp link that connects one such wireless communication node to a peer wireless communication node to form a wireless mesh network fails or experiences performance degradation due to various reasons, including but not limited to change in the line-of-sight profile of a millimeter-wave link between two wireless communication nodes.

Figure 18:
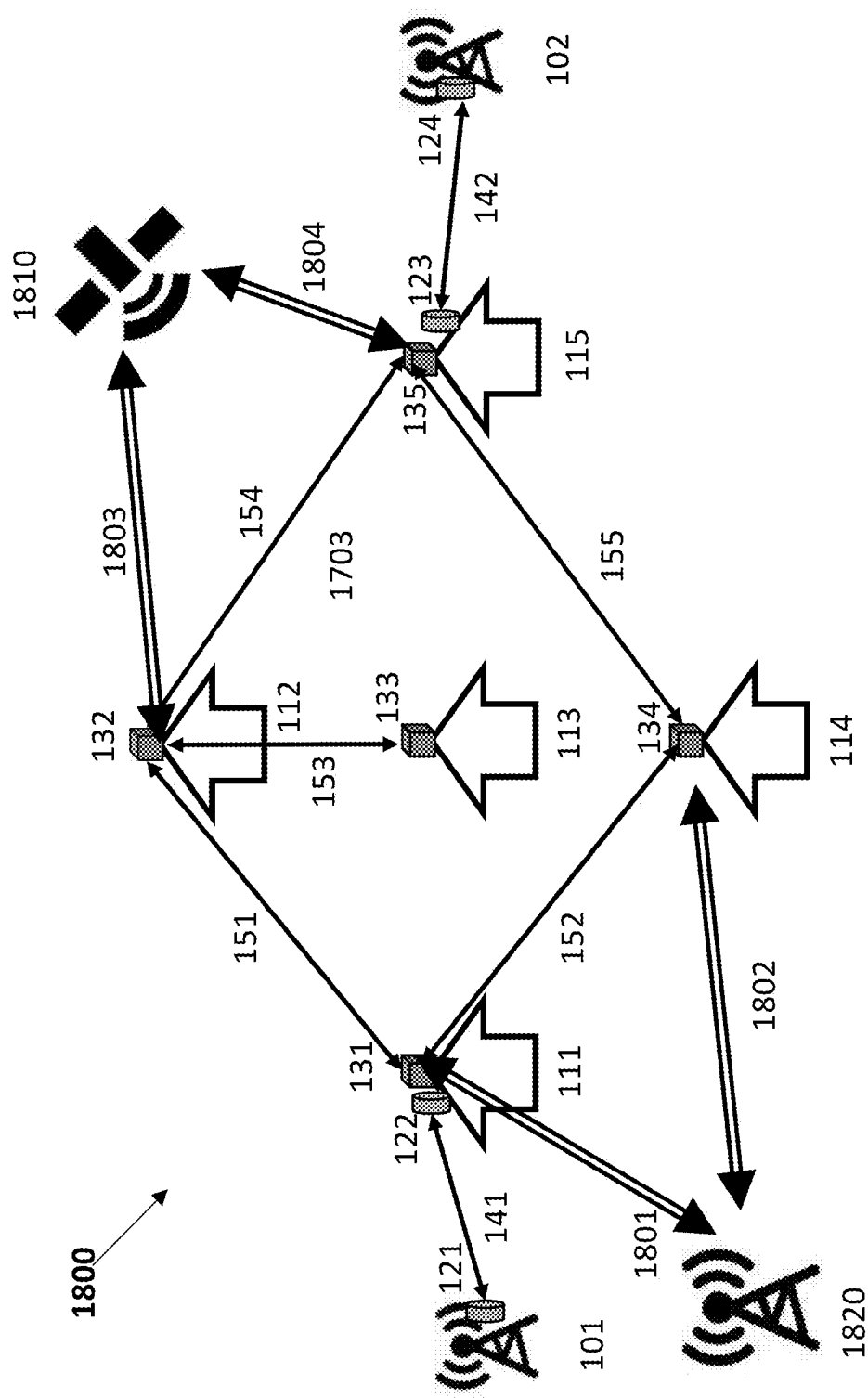
FIG. 18 depicts still another example of a communication system that comprises a wireless mesh network, in accordance with the present disclosure.

Specifically, satellite 1810 in FIG. 18 is connected to the seed node hosted at seed home 115 using wireless communication equipment 135 via link 1804 and to the anchor node hosted at anchor home 112 using wireless communication equipment 132 via link 1803. In this respect, the seed node hosted at seed home 115 has multiple options to route backhaul traffic to the core network.

In one embodiment, the seed node hosted at seed home 115 can pick a satellite link 1804 to transport backhaul data at a given time, and based on some trigger at a different time, can cause its wireless communication equipment 135/123 to switch links for backhaul data transmission from satellite link 1804 to wireless link 142 (which as noted above may be a ptp or ptmp millimeter-wave-based link such as an E-band link) coupled to the fiber PoP node hosted at tower/fiber access point 102. Such trigger may include latency, bandwidth, packet loss requirements, etc. of a particular application.

FIG. 18 also shows an anchor node hosted at an anchor home 113 where the node's wireless communication equipment 133 may exchange data with the anchor node hosted at anchor home 112 using its wireless communication equipment 132. If the anchor node at anchor home 112 receives end-user data from the anchor node at anchor home 113, the anchor node at anchor home 112 may then have multiple options to transport end-user data to the core network via its wireless communication equipment 132, including (1) directly sending the end-user data to the core network via satellite link connection 1803, (2) indirectly sending the end-user data to the core network via the seed node at seed home 115, which may send the end-user data to the core network either via satellite link connection 1804 or via link 142 with the fiber PoP node hosted at access point 102, or (3) indirectly sending the end-user data to the core network via the seed node at seed home 111, which may send the end-user data to the core network either via link connection 1802 or via link 141 with the fiber PoP node hosted at access point 101, among other options.

In one embodiment, wireless communication equipment 132 of the anchor node at anchor home 112 can also dynamically switch its connection link to route data to and from the anchor node at anchor home 113. For example, due to some trigger similar to the triggers described above, wireless communication equipment 132 can dynamically switch from directly communicating data between the anchor node at anchor home 113 and the core network via satellite link 1803 to indirectly communicating data between the anchor node at anchor home 113 via the seed node at seed home 115 and satellite link 1804, as one possible implementation.

It should be understood that links 1803 and 1804 can be part of same massive MIMO beam or links 1803 and 1804 can be part of different massive MIMO beams. It should also be understood that satellite links 1803 and 1804 can use the same frequency range of communications or can operate in different frequency ranges. Further, while FIG. 18 shows only one satellite (i.e., satellite 1810) capable of massive MIMO ptmp communication that is connected to two wireless communication nodes 132 and 135, it should be understood that a communication system can also have more than one satellite, each connected to multiple different wireless communication nodes hosting various other modules.

As further shown in FIG. 18, tower 1820 is connected to the seed node at seed home 111 via link 1801 and to the anchor node at anchor home 112 via link 1802. This provides the anchor node at anchor home 114 with options to route packets to the core network in multiple ways including (a) indirectly through one of the seed nodes at seed homes 111 and 115 through links 152 or 155 (which as noted above may be ptp or ptmp millimeter-wave-based links), and (b) directly to tower 1820 via massive MIMO based link 1802. Similarly, the seed node hosted at seed home 111 has multiple options to route backhaul traffic to the core network. In one embodiment, the seed node hosted at seed home 111 can pick link 1801 to transport backhaul data at a given time, and based on some trigger at a different time, can cause its wireless communication equipment 131/122 to switch links for backhaul data transmission from link 1801 to wireless link 141 which as noted above may be a ptp or ptmp millimeter-wave-based link such as an E-band link) coupled to the fiber PoP node hosted at tower/fiber access point 101. Such trigger may include latency, bandwidth, packet loss requirements, etc. of a particular application.

In FIG. 18, only one tower (i.e., tower 1820) capable of massive MIMO ptmp communication is shown to be connected to two wireless communication nodes. However, it should be understood that a communication system can also have a different number of massive MIMO towers, each connected to multiple different wireless communication nodes hosting various other modules.

In another embodiment, one or more wireless communication nodes described above and discussed with respect to FIGS. 1-18 may additionally be an edge computing node by hosting a processor (separate or shared), memory, digital contents, software, and storage, among other components for computing, and other required operations for edge computing, in addition to the high speed low latency networking capability that has already been described above. This enables a given communication system to provide cloud services in a distributed manner closer to an end user as wireless communication nodes are distributed across the network and provide an interface between the network and an end-user. This memory unit can store a copy of local digital contents and can additionally store portions of digital content that that are not local. The non-local digital contents among other things can include digital content belonging to other nodes. This provides content redundancy in a communication system. Hence, when an end user of a communication system requests for digital content, then this edge computing mechanism allows a request to be fulfilled in a variety of different ways, including a request processed by a local node and/or remote node based on various criteria including but not limited to latency, network congestion, etc. of the application making the request.

In another embodiment, one or more wireless communication nodes described above and discussed with respect to FIGS. 1-18 can additionally be a blockchain node by hosting a computer comprising at least one processor, memory, digital content, software, etc., which is connected to a blockchain network comprising a client that is capable of storing, validating and/or relaying transactions in addition to the high-speed low latency networking capability that has already been described above. This enables the communication system and its nodes described in this disclosure and discussed in the context of FIGS. 1-18 to provide an ideal platform for blockchain databases, enterprise blockchain databases, permissioned/private blockchains, hybrid and other similar types of databases given that (1) file/data/record storage space is inherently distributed as wireless communication nodes are distributed across the geographical coverage area and (2) low latency communication between the nodes and across the network due to high speed wireless links enable improved latency and improves the transaction throughput of the blockchain based databases.

In another embodiment, one or more wireless communication nodes can additionally act as blockchain-based distributed data storage node by adding dedicated or shared storage capacity capability to these nodes. One key advantage of implementing blockchain-based distributed data storage on a given communication system and the wireless communication nodes described in this disclosure is that storage nodes are inherently distributed, and due to the low latency and high bandwidth of the wireless communication links between the wireless communication node described above and the proximity of the storage location nodes to an end-user, accessing the data content can be faster compared to other approaches.

In accordance with the present disclosure, the wireless communication equipment (ptp link modules, ptmp link modules, multiple ptp link modules, combination of multiple ptp and ptmp links, antennas for cellular small cells/CPEs and millimeter-wave equipment, cable, mounts, power supply boxes, etc.) that gets deployed and installed at a seed or anchor home can be consumer financed. For instance, in case of a customer meeting a certain credit score threshold (or any other credit checking criteria), the equipment required to add a millimeter-wave mesh network node at the customer's premises (i.e., to add the customer to the wireless mesh network) and provide high speed internet service may be financed by a bank on the behalf of the customer, and the customer may agree with the financing bank to re-pay the amount financed by the bank over a certain time period by making periodic (e.g. monthly) payments based on the terms and conditions of the agreement. This way, the customer becomes owner of the equipment (a wireless mesh network node) once the full financed amount is made to the financing bank. This customer can in one embodiment lease back the wireless mesh network node equipment installed on its property to the wireless mesh network operator that installed the wireless mesh network equipment on its property and provide high speed internet data service. In another embodiment, this customer can lease back the wireless mesh network node equipment installed on its property to the wireless mesh network operator that installed the wireless mesh network equipment on its property and provide high speed internet data service for a certain term (e.g., 18 months, 24 months, 36 months, etc.).

In some instances, this customer may be required to lease back the equipment to only that operator which originally installed the equipment at the customer location and provided high speed internet data services. In other instances, this customer can lease back the equipment to any wireless internet network operator. In another instance, lease back of the equipment to an operator other than the operator which originally installed the network equipment at the customer location may only occur with the permission of the wireless internet network operator that originally installed that equipment at customer location. In yet another instance, such lease back to a different wireless internet network operator may only occur after expiration of the lease term with the original wireless internet network operator.

For a wireless internet network operator building and operating a wireless mesh network, the type of customer financing-based network deployment described above becomes a crowd sourcing or crowdfunding-based infrastructure roll out mechanism, where instead of one or few large entities, CAPEX is sourced from a pool of individuals who in some instances are the customers of the wireless mesh network operator. Such customers can get high speed internet data service from the wireless mesh network operator (operating using ptp/ptmp modules, other communication nodes and equipment and various variations discussed earlier in this disclosure) at a subsidized/discounted rate. In certain cases, such customers may get two separate bills periodically, one for the high-speed internet data service and other for the equipment financing from bank. In another case, customers can get a single consolidated bill from a wireless mesh operator.

In some instances, all customers of a wireless mesh operator can be based on consumer financing explained above in a neighborhood or market where wireless mesh operator offers its high-speed internet data service. In other instances, wireless mesh network's customers in a market or neighborhood can be financed through a variety of different ways including operator financing where wireless mesh operator pays for the equipment of the wireless mesh network node, financed through bundling with a private utility or service that has a relatively smaller market size (e.g. home security/automation, solar energy, etc.) compared to market size of the high speed internet where a bundled service is offered and wireless mesh operator uses the marketing/sales commission received from the private utility or service provider to fund the wireless mesh network node equipment, financed through the revenue generated from running blockchain platform based services on the wireless mesh network nodes along with the consumer/customer based financing that is explained earlier in the disclosure.

Further, in accordance with the present disclosure, the communications equipment including various types of ptp/ptmp modules, cellular small cell, etc. that were described above can be used to establish multiple ptp and/or point-to-multiple links where both network nodes of a wireless link, one from where a link originates and the second from where a link terminates (in general, nodes can switch roles dynamically between link originator and link terminator based on the direction of data flow), are located at the different customer locations and providing high speed internet service to the dwellers of the property where wireless mesh network node is deployed and installed. In some cases, one of the two nodes of the link can be at a location where the deployed equipment provides high speed internet service to the dwellers of the property at that location. In other instances, both nodes of the link may be at a location where the deployed equipment does not provide high speed internet service to the dwellers of the property at that location.

It should be understood that the length of the communication links of a wireless mesh network disclosed herein may vary. For instance, the length of the communication links of a wireless mesh network established with the help of the various communication modules and equipment described above may be less than 300 meters on average. Alternatively, the length of the communication links of a wireless mesh network can be greater than 300 meters on average as well. Many other lengths of the communication links are possible as well.

In accordance with the present disclosure, further disclosed herein are communication modules that employ direct RF (microwave/millimeter wave)-to-optical and direct Optical-to-RF (microwave/millimeter wave) conversion. In one example implementation, the high-speed photo detectors can be used that directly translate an optical signal into a microwave signal. One of ordinary skill in the art will appreciate that other approaches can be used for direct optical-to-RF conversion. Similarly, a dipole antenna directly coupled to a plasmonic modulator allows direct conversion from the RF to the optical world. One of ordinary skill in the art will appreciate that different approaches can be used for direct conversion of RF signals to optical signals. This direct optical-to-RF and direct RF-to-Optical conversion modules eliminate the need of the use of analog-to-digital (ADC) and digital-to-analog (DAC) modules that are required by traditional modem implementations. These mixed signal components (i.e., ADC/DAC) may consume a high amount of power and also increase the cost as each antenna is required to be connected to a separate ADC/DAC module.

Figure 19:
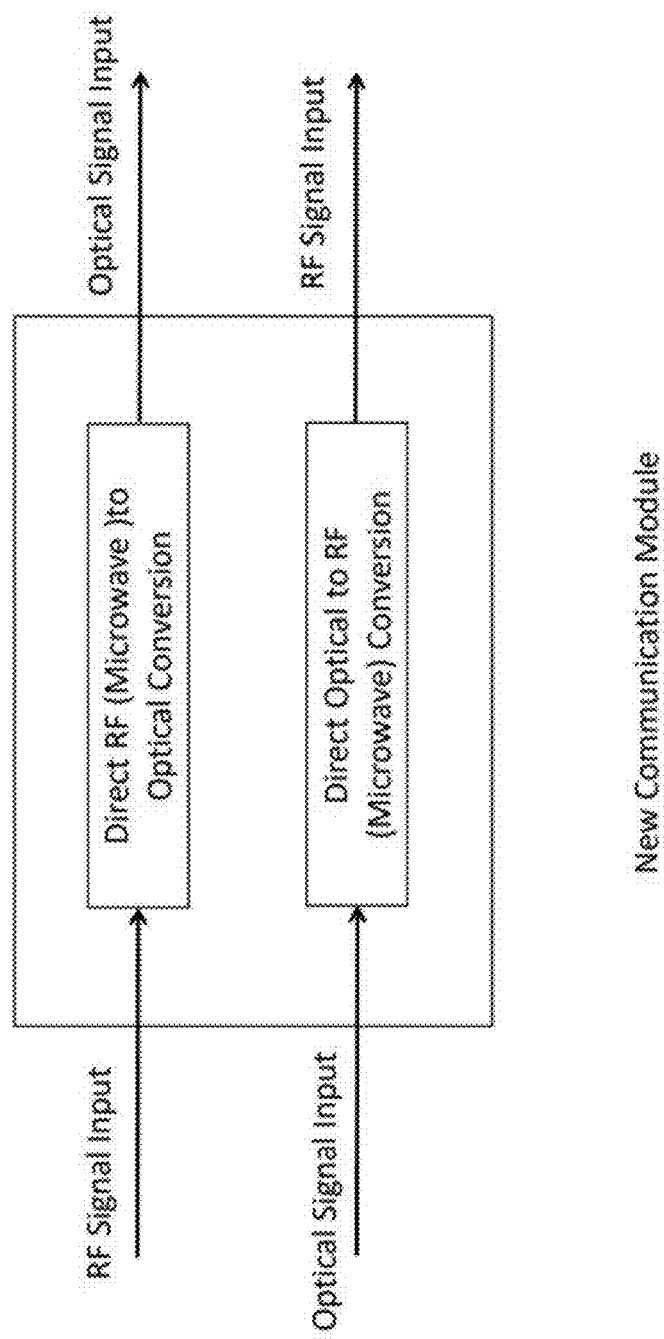
FIG. 19 depicts an example of communication module based on direct RF-to-Optical and direct Optical-to-RF conversion, in accordance with the present disclosure.

FIG. 19 shows a communication module based on direct RF-to-Optical and direct Optical-to-RF conversion. Communication module of FIG. 19 contains a single direct RF-to-Optical sub-module and a single Optical-to-RF sub-module. However, communication module of FIG. 19 can host any integer number of direct RF-to-Optical sub-modules greater than or equal to zero and any integer number of direct Optical-to-RF sub-modules greater than or equal to zero. In one example embodiment, this direct RF-to-Optical and direct Optical-to-RF conversion technology can be implemented is an integrated Circuit (IC) or chip.

Figure 20:
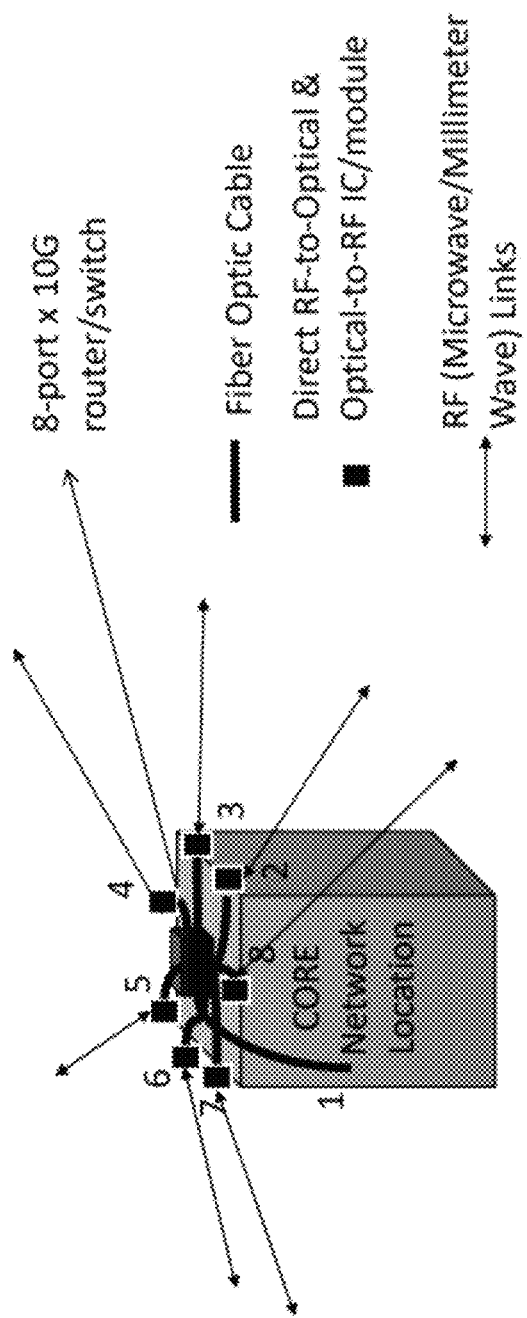
FIG. 20 depicts an example router/switch, in accordance with the present disclosure.

Based on the above explanation with respect to the example communication module of FIG. 19, in an example embodiment, the core of a wireless mesh network can be a wireline optical or wired router/switch where each port is mapped, either through a direct connection or over optical/wired line, to an individual direct conversion Optical-to-RF or RF-to-Optical chip that then focuses, on both receiver and transmitter side, all RF energy into a high gain narrow beam that can be both fixed or steerable. In one example embodiment, a standard 8-port×10G router/switch could be used, with one port being used as a data drop to local building/site and the other 7 ports being connected over a fiber optic cable to various Optical-to-RF or RF-to-Optical end points that are located at multiple distributed locations external (and/or internal) on/in the building/site as shown in FIG. 20. One of ordinary skill in the art will understand that the router/switch can have a different number of ports as well.

These multiple distributed locations can be determined in advance based on the use of connection potentiality optimization algorithms, where the algorithm understands the relationship between end point placement and potentially connection partners. Also, the individual ptp beams can be dynamically steered among potential ptp connection partners to facilitate path optimization algorithms and/or to respond to network congestion and/or network element failures. In one embodiment, these Optical-to-RF or RF-to-Optical end points that establish ptp/ptmp beams can be placed below a roof's eaves and in other embodiments, these end points can be placed above a roof's eaves. In some other embodiments, some of the Optical-to-RF or RF-to-Optical end points can be placed below a roof's eaves and some can be placed above a roofs eaves and actual placement may depend upon the line-of-sight profile of the location/site.

It should be understood that the example communication module discussed in the context of FIGS. 19-20 can be implemented in other communication modules that were discussed in the context of FIGS. 1-18. For instance, the modules discussed in the context of FIGS. 1-18 can have direct RF-to-Optical and direct Optical-to-RF technology embedded such that the narrow beam, extremely narrow beam, and/or ptp/ptmp/multiple ptp links can be established without the need for ADC/DAC mixed signal circuitry that consumes a high amount of power and requires to be connected individually with each antenna.

In accordance with the present disclosure, a modified version of the communication nodes discussed earlier for forming a wireless mesh network will now be discussed. In one embodiment, a communication node can host flexible millimeter-wave radio equipment capable of establishing multiple ptp and/or ptmp links operating over millimeter-wave frequencies and can comprise 3 different sub-modules: (1) digital/network module, (2) ptp radio module, and (3) ptmp radio module. A digital/network module is responsible for interfacing the above millimeter-wave radio box (and thus the communication node) with a core network (which may also at times be referred to as a backhaul or fiber network). Specifically, it provides switching capability to direct traffic between the ptp or ptmp radio modules of the millimeter-wave radio box (communication node) and the core network. The connectivity between a single or multiple ptp and/or ptmp radio modules of the millimeter-wave radio box and the core network can be based over a variety of interfaces including but not limited to PCI/PCI express bus interface and ethernet.

In one embodiment, PCI/PCIe can be used when a ptp or ptmp radio that needs to be connected is enclosed in the same box with a digital/network module and separation between the digital/network module and the ptp module is limited to few inches such as 3-6 inches or less.

In one embodiment, a digital/network module provides connectivity to a single ptp or ptmp module over a single PCI/PCIe bus interface. In a different embodiment, a digital/network module provides connectivity to 3 ptp or 3 ptmp or a combination of 3 ptp/ptmp modules over three separate PCI/PCIe bus interfaces. In another embodiment, a digital/network module provides connectivity to N ptp or N ptmp or a combination of N ptp/ptmp modules over N separate PCI/PCIe bus interfaces, where N is a positive integer number greater than zero.

An ethernet interface such as an RJ45 port with multi-gigabit support, including but not limited to 1 Gb, 2.5 Gb, 5 Gb, 10 Gb, etc., can be used to connect ptp or ptmp radio modules with a digital/network module. In one embodiment, an ethernet interface can be used when the ptp or ptmp radio that needs to be connected is not enclosed in the same box with a digital/network module and separation between digital/network module and the ptp module is greater than 3-6 inches. In some embodiments, the length can be 10 meters or more.

In one embodiment, a digital/network module provides capability of connecting up to 4 ptp/ptmp radios or up to 3 ptp/ptmp radio and a small cell over 4 ethernet interfaces. In a different embodiment, a digital/network module provides capability of connecting up to N ptp/ptmp radios or up to N−1 ptp/ptmp radio and a small cell over N ethernet interfaces, where N is a positive integer number greater than zero. Digital/network module also contains SFP/SFP+ interface or any other interface to connect digital/network module with the core network.

The ptmp radio module of the communication node discussed above is responsible for establishing ptmp millimeter-wave-based bi-directional links to connect to peer millimeter-wave radios in a wireless mesh network. The ptmp radio module comprises a baseband sub-module and RF module. Baseband module handles the baseband processing and among other aspects is responsible for baseband processing related to beamforming. RF module contains phased antenna array that works in conjunction with baseband module to generate ptmp millimeter-wave beams.

The ptp radio module of the communication node described above is responsible for establishing ptp millimeter-wave-based bi-directional links to connect to a peer millimeter-wave radio in a wireless mesh network. The ptp radio module comprises a baseband sub-module, RF module and beam narrowing module. The baseband module handles the baseband processing and, among other aspects, is responsible for baseband processing related to beamforming. RF module contains phased antenna array that works in conjunction with baseband module to generate ptp millimeter-wave beam. A beam narrowing module is responsible for narrowing the beam by focusing most of the radiated signal energy in the desired direction and lowering the antenna side lobes to minimize the interference in a wireless mesh network.

In one embodiment, the beam narrowing module can be a lens antenna integrated with an RF module. In another embodiment, the beam narrowing module can be a parabolic antenna integrated with an RF module. In yet another embodiment, the beam narrowing module could be a module other than a lens or parabolic antenna and rely on a different approach to narrow the beam originating from a phased array based RF module.

Figure 21:
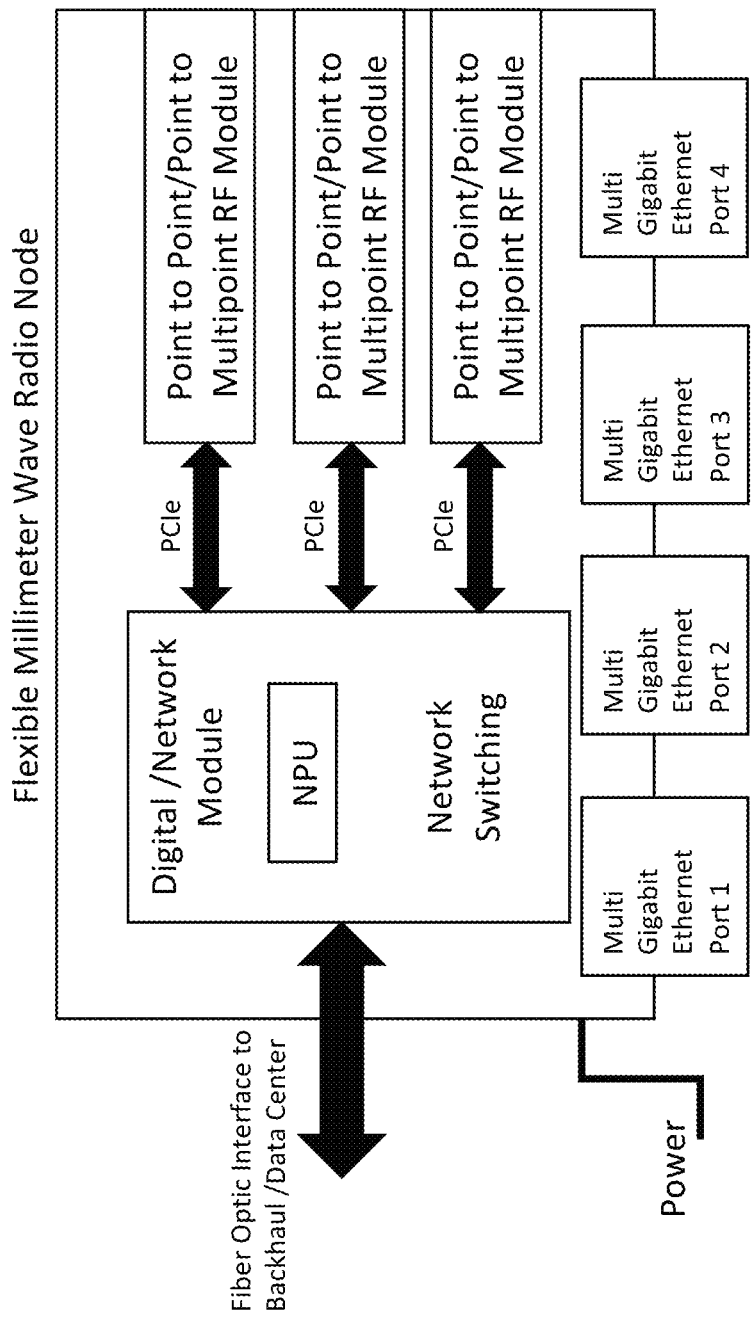
FIG. 21 depicts an example block diagram of flexible millimeter-wave communication equipment, in accordance with the present disclosure.

Referring to FIG. 21, a logical block diagram of the flexible millimeter-wave communication equipment described above is shown. As explained earlier, a flexible millimeter-wave radio node contains within an enclosure (typically outdoor) a digital/network module that has a network processing unit (sometimes referred to as an "NPU" for short) and is configured to provide network switch operations between the fiber optic backhaul interface and the ptp or ptmp radio modules either connected via PCI/PCIe interface or via multi gigabit ethernet ports. A flexible millimeter-wave radio module also contains within the enclosure 3 ptp or ptmp radios. For providing mesh network deployment flexibility, a node can also be connected to external ptp/ptmp radios via ethernet ports. A node can be solar powered or can be powered via electric power outlet of the home where the node is installed. FIG. 21 also shows that this flexible millimeter-wave radio node may only need a single NPU that controls all the ptp or ptmp RF modules either connected via a PCI/PCIe interface or via a multi gigabit ethernet interface. Hence this example flexible millimeter-wave radio node removes the need for using a dedicated NPU for each ptp/ptmp RF module.

Figure 22:
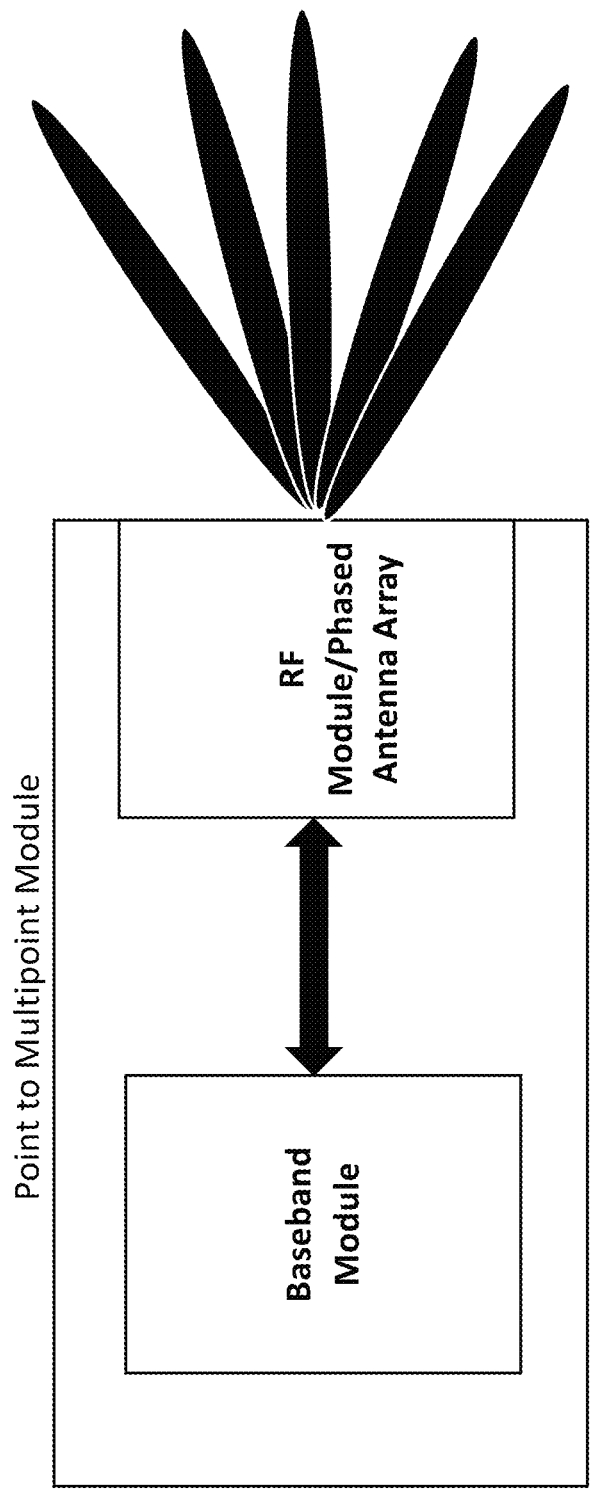
FIG. 22 depicts an example block diagram of a ptmp radio module of a communication node, in accordance with the present disclosure.

FIG. 22 shows a block diagram of a ptmp radio module of the communication node described above. As shown, this radio module contains a baseband module and a RF module that has the phased antenna array for providing beamforming capability.

Figure 23:
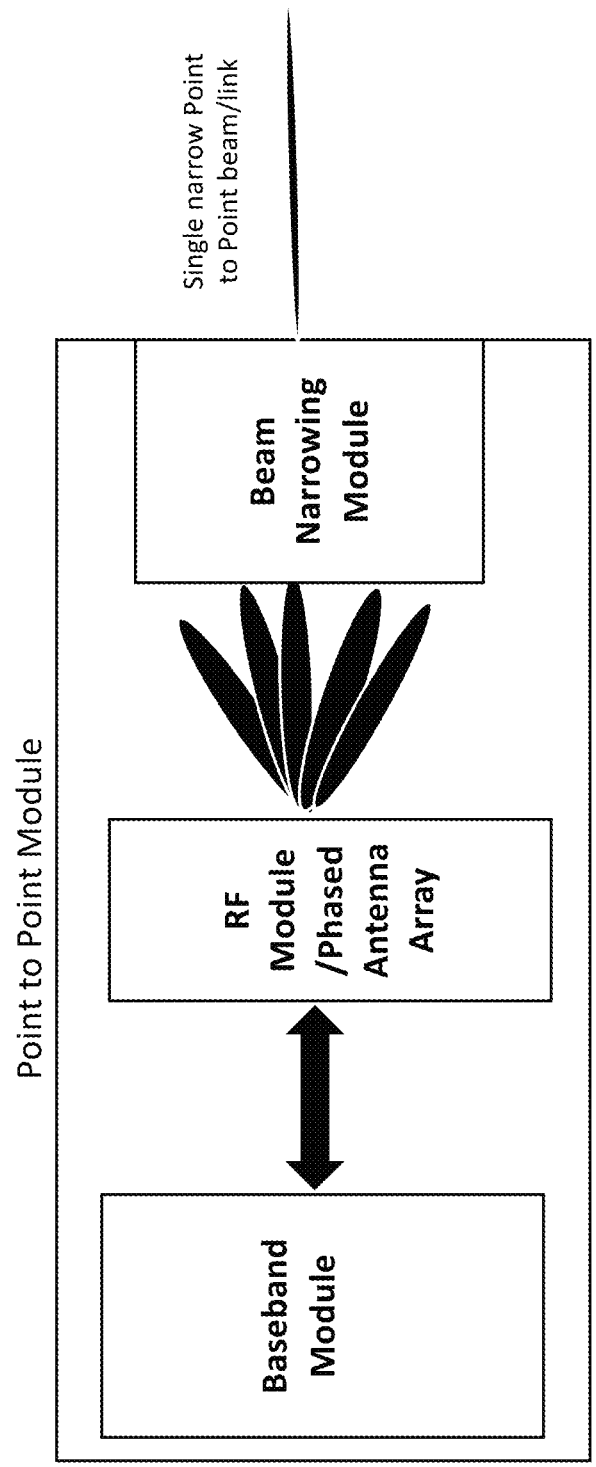
FIG. 23 depicts an example block diagram of a ptp radio module of a communication node, in accordance with the present disclosure.

FIG. 23 shows a block diagram of the ptp radio module of the communication node discussed above. This radio module contains a baseband module, an RF module that has the phased antenna array for providing beamforming capability, along with a beam narrowing module. The beam narrowing module, based on various techniques discussed earlier, narrows the beam generated by the phased antenna array of the RF module.

Figure 24:
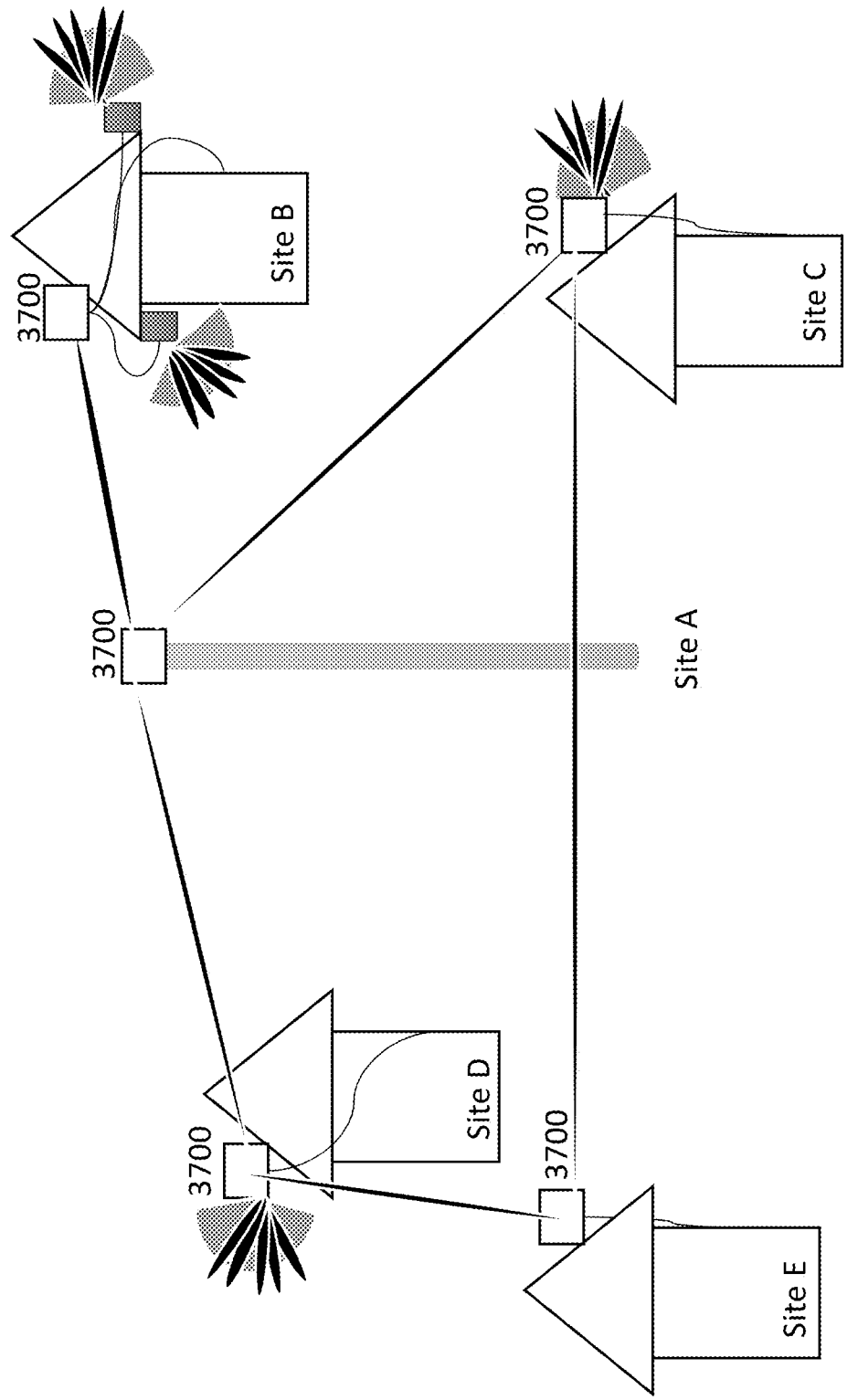
FIG. 24 depicts an example of a wireless mesh network comprising a plurality of communication nodes, in accordance with the present disclosure.

Referring to FIG. 24, various different use cases of the communication nodes described above and explained in the context of FIGS. 21-23 is shown. FIG. 24 shows a wireless mesh network comprising 5 communication nodes 3700. Communication nodes 3700 may each be a flexible millimeter-wave communication node that has been discussed earlier.

At "Site A" of the wireless mesh network, a communication node 3700 may be solar powered and mounted on the pole. This node 3700 at Site A may have 3 ptp links generated by 3 ptp radio modules integrated with the digital/network module. At "Site B," a communication node 3700 may be powered with an electric power outlet of the home and may have one ptp link via a single integrated ptp radio module and 2 ptmp links via two ptmp radio modules that are not integrated with a digital/network module but instead connected via ethernet interface to the communication node. Similarly, at "Site C," a communication node 3700 may be powered with an electric power outlet of the home and may have two ptp links via two integrated ptp radio module and one ptmp radio module integrated with a digital/network module. At "Site E," a communication node 3700 may be powered with an electric power outlet of the home and may have two ptp links via two integrated ptp radio module. Further, at "Site D," a communication node 3700 may be powered with an electric power outlet of the home and may have two ptp links via two integrated ptp radio module and one ptmp radio module integrated with the digital/network module.

Figure 25A:
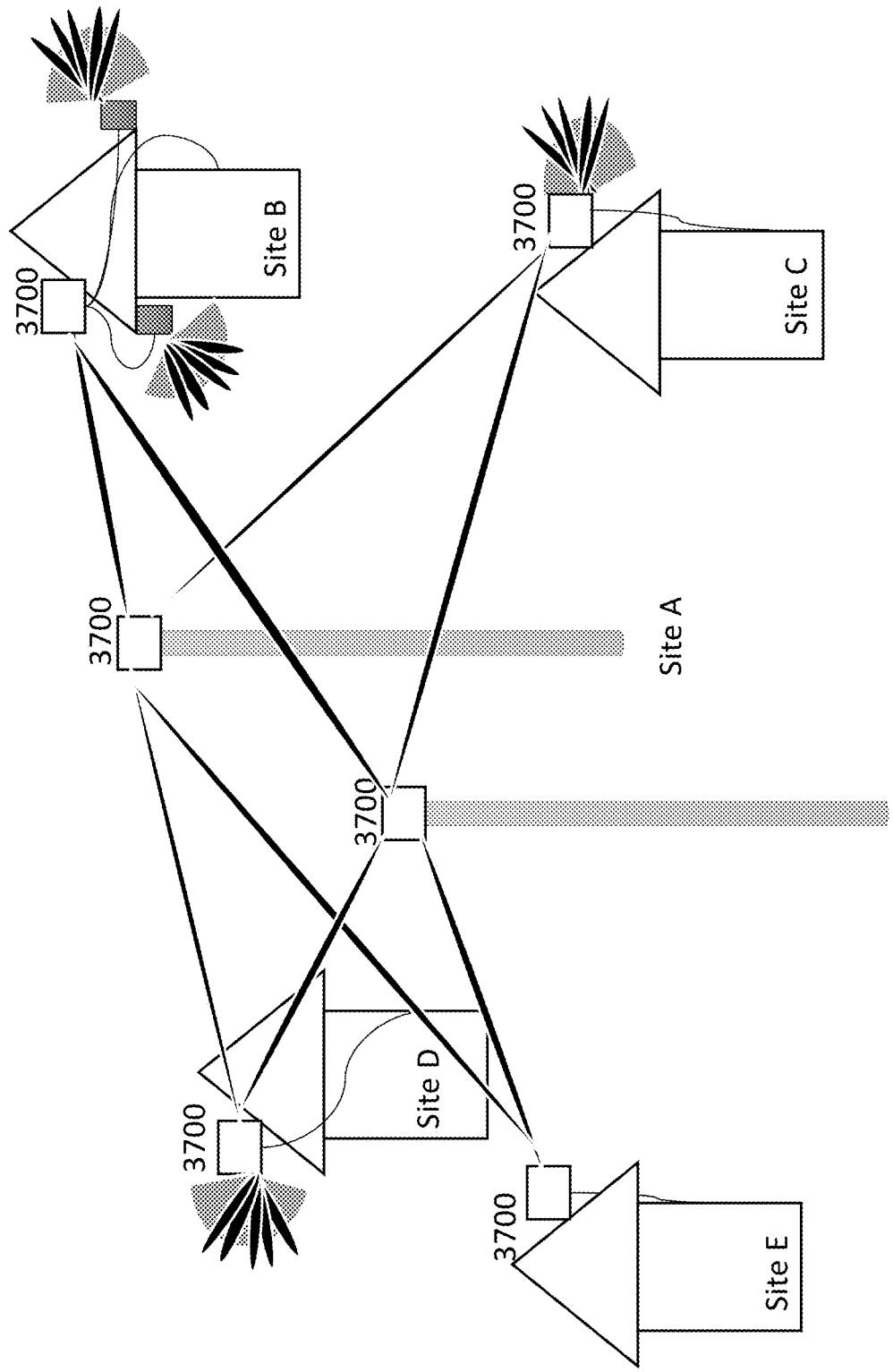
FIG. 25A depicts another example of a wireless mesh network comprising a plurality of communication nodes, in accordance with the present disclosure.

Referring to FIG. 25A, another use case of the communication node described above is shown. In particular, FIG. 25A shows an example wireless mesh network that includes communication nodes 3700 at the 5 sites previously described with respect to FIG. 24, as well as an additional communication node 3700 at "Site A2." Similar to communication node 3700 at "Site A," communication node 3700 at "Site A2" may be mounted on a pole (among other possibilities).

Based on the preceding disclosure (e.g., the disclosure in connection with FIGS. 5-7, 9-11, 13, and 16-18), one of ordinary skill in the art will appreciate that each communication node 3700 at a given site may have the capability to communicate with multiple other communication nodes at multiple other sites. For instance, communication node 3700 at "Site B" may have the capability to communicate with the respective communication nodes 3700 at both "Site A" and communication node 3700 at "Site A2." Similarly, the respective communication node 3700 at each of "Site C," "Site D," and "Site E" may have the capability to communicate with the respective communication nodes 3700 at both of "Site A" and "Site A2."

Furthermore, based on the preceding disclosure (e.g., the disclosure in connection with FIGS. 5, 11, and 18), one of ordinary skill in the art will appreciate that each communicate node 3700 at a given site (e.g., communication node 3700 at "Site B") may have the capability to dynamically switch its active communication link from a first communication node 3700 at a first site (e.g., communication node 3700 at "Site A") to a second communication node 3700 at a second site (e.g., communication node 3700 at "Site A2") based on some trigger that is similar to the triggers described above (e.g., changes in link condition such as a change from a LOS path to a non-LOS path due to a change in environment, increased interference, instructions from higher layers, latency, bandwidth, and/or packet loss requirements of a particular application, etc.).

Figure 25B:
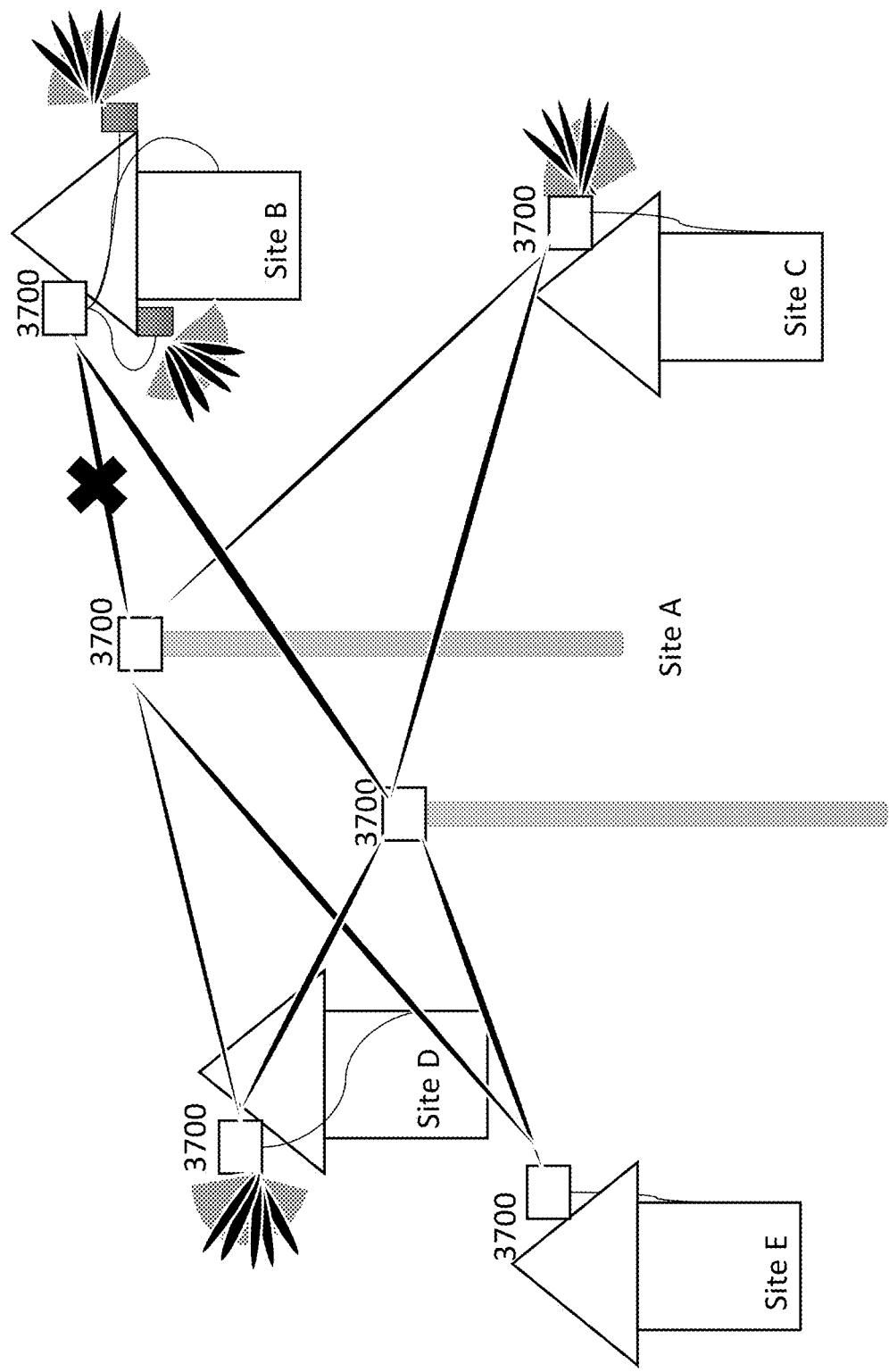
FIG. 25B depicts yet another example of a wireless mesh network comprising a plurality of communication nodes, in accordance with the present disclosure.

For instance, in the scenario shown in FIG. 25A, the respective communication node 3700 at each of "Site B," "Site C," "Site D," and "Site E" may initially be configured to actively communicate with the communication node 3700 at "Site A" (which may function to route backhaul traffic to and/or from such other sites). However, at some later point in time, the communication node 3700 may dynamically switch its active communication link from the communication node 3700 at "Site A" to the communication node 3700 at "Site A2" (which may also function to route backhaul traffic to and/or from such other sites) due to some trigger similar to the triggers described above. Such a scenario is shown in FIG. 25B.

It should be understood that FIGS. 24-25 are described in such a manner for the sake of clarity and explanation and that the example wireless mesh networks described in FIGS. 24-25 may take various other forms as well. For instance, the example wireless mesh networks may include more or less communication nodes, and a given communication node may take various other forms and may be mounted in various other manners and/or mounted on various other objects as well (e.g., mounted on a pedestal). Further, in line with the preceding disclosure, one or more of the communication nodes (e.g., the communication nodes 3700 at "Site A" and "Site A2) may be mounted to an object that is at or near a fiber access point. Further yet, the example mesh networks may have various different configurations of ptp or ptmp modules either integrated or connected via an ethernet interface and powered via various different power options.

Another important aspect of communication node 3700 is that the integrated radio modules can be pluggable. In other words, based on a specific use case, the number and types of radio modules integrated with a digital/network module via PCI/PCIe interface can easily be changed by plugging in the desired number and type of radio modules with full flexibility instead of having one specific configuration.

So far, the modified version of communication nodes discussed above and also described in the context of FIGS. 21-25 assumes that the ptp or ptmp modules connected to a digital/network module with an NPU via a high speed interface (e.g., PCI/PCIe/Thunderbolt) are also located inside a same enclosure. It should be understood that the ptp or ptmp modules connected to a digital/network module via high speed interface can also be located outside the digital/ network module with the NPU and inside an independent box/enclosure connected via an outdoor cable supporting the PCI/PCIe/Thunderbolt high speed communication protocol to the enclosure of the digital/network module.

Figure 26:
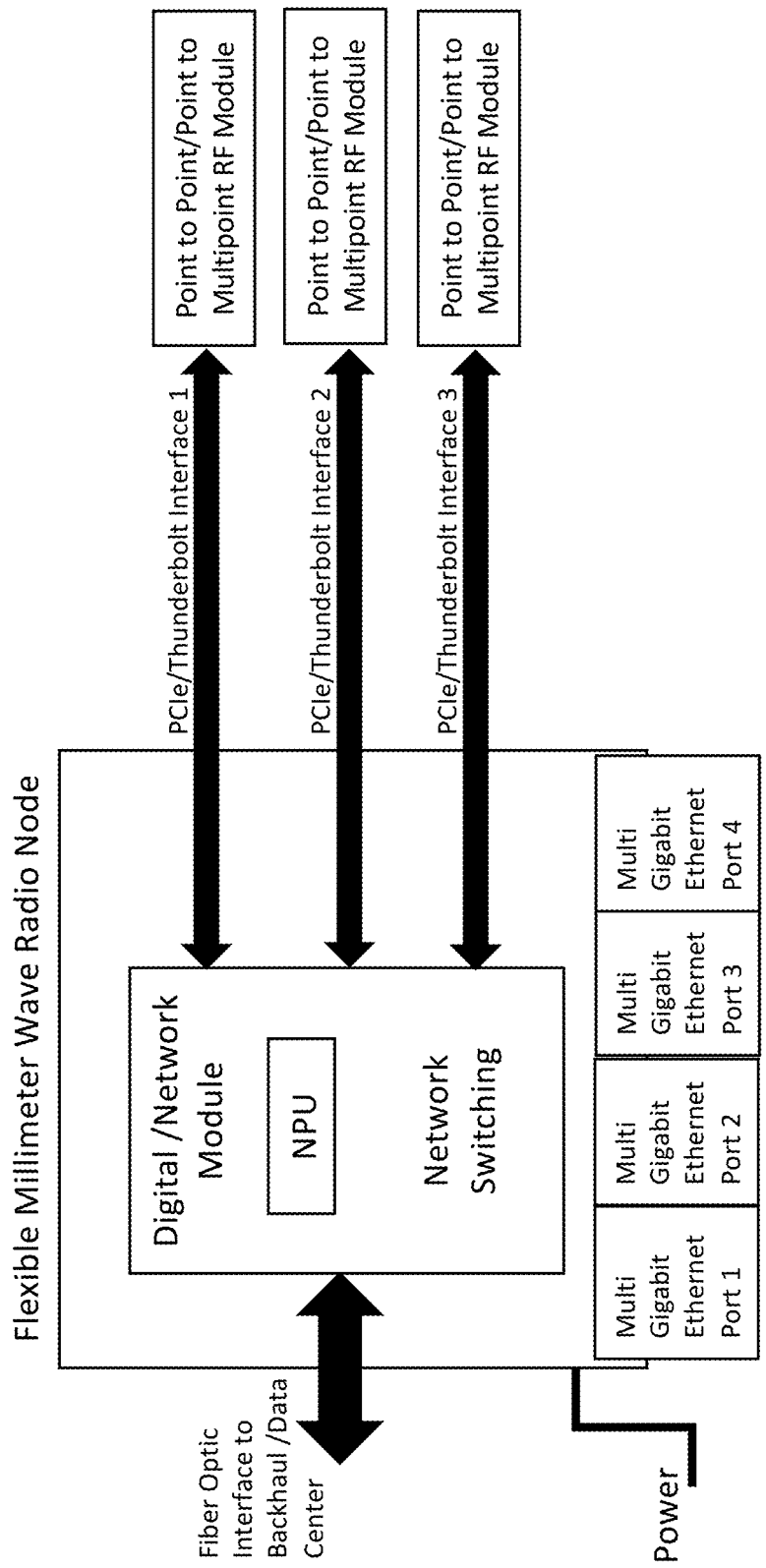
FIG. 26 depicts an example modified version of flexible millimeter-wave communication equipment, in accordance with the present disclosure.

As one example, FIG. 26 depicts a modified version of a flexible millimeter-wave radio box, where the ptp or ptmp RF modules are located outside a digital/network module with NPU enclosure and inside separate independent box/enclosure and connected via an outdoor wired cable capable of supporting high speed communication interface (e.g., PCI/PCIe/Thunderbolt Interface). As shown, 3 ptp or ptmp modules are connected via PCIe/Thunderbolt interfaces to the digital/network module with the NPU using a compatible outdoor cable.

In general, it should be understood that N number of ptp or ptmp modules in separate independent enclosures can be connected via a PCIe/Thunderbolt compatible outdoor cable, where N is an integer greater than zero. It should also be understood that the length of the outdoor cable compatible with high speed communication protocol, such as PCIe/thunderbolt, depends on the maximum limit defined by the technology. In one embodiment, PCIe/thunderbolt cable can be up to 3 meters. In other embodiments, the length of the outdoor PCI/PCIe/thunderbolt compatible cable can be less than or greater than 3 meters.

In yet another embodiment of the present disclosure, a wireless mesh network may include ultra-high-capacity nodes that are capable of establishing ultra-high-capacity links (e.g., ptp or ptmp bi-directional communication links) using a millimeter-wave spectrum, including but not limited to 28 Ghz, 39 Ghz, 37/42 Ghz, 60 Ghz (including V band), or E-band frequencies, as examples. These ultra-high-capacity links may have a larger range as compared to other ptp or ptmp links, including but not limited to ptp or ptmp links of the type discussed above with reference to FIGS. 1-26.

For instance, as one possibility, a ptp or ptmp link of the type discussed above with reference to FIGS. 1-26 may have an average range of up to 100 meters, whereas an ultra-high-capacity link may have a range of more than 100 meters. As another possibility, a ptp or ptmp link of the type discussed above with reference to FIGS. 1-26 may have an average range of up to 500 meters, whereas an ultra-high-capacity link may have a range of more than 500 meters. As yet another possibility, a ptp or ptmp link of the type discussed above with reference to FIGS. 1-26 may have an average range of up to 1000 meters, whereas an ultra-high-capacity link may have a range of more than 1000 meters.

However, in other implementations, it is possible that the length of an ultra-high-capacity link may be similar to the length of a ptp or ptmp links of the type discussed above with reference to FIGS. 1-26, but may nevertheless provide higher capacity such that a fewer number of ultra-high-capacity nodes/links may be used (as compared to the ptp or ptmp nodes/links of the type discussed above with reference to FIGS. 1-26) to build a main high capacity backbone through the mesh (i.e., the ultra-high-capacity nodes/links may be sparser).

The higher capacity and/or extended range of these ultra-high-capacity nodes/links may be achieved via various advanced signal processing techniques, including but not limited to multiple input multiple output (MIMO) such as 2×2 MIMO, 4×4 MIMO, 8×8 MIMO or an even higher order MIMO, use of vertical and horizontal polarization (V & H), higher switch capacity of the digital network module due to higher processing power such as support of 8×25 Gbps port (200 Gbps aggregate traffic flow), higher order modulation including 16QAM, 64QAM, 256QAM, 512 QAM, 1024 QAM, orbital angular momentum (OAM) multiplexing, and/or higher antenna gains, among other possibilities. Further, in some implementations, the higher capacity and/or extended range of these ultra-high-capacity nodes/links can be achieved using a subset of the advanced signal processing techniques mentioned above.

These ultra-high-capacity nodes/links may be used in conjunction with other ptp and/or ptmp links, including but not limited to ptp or ptmp links of the type discussed above with reference to FIGS. 1-26, to add another layer to a wireless mesh network.

Figure 27:
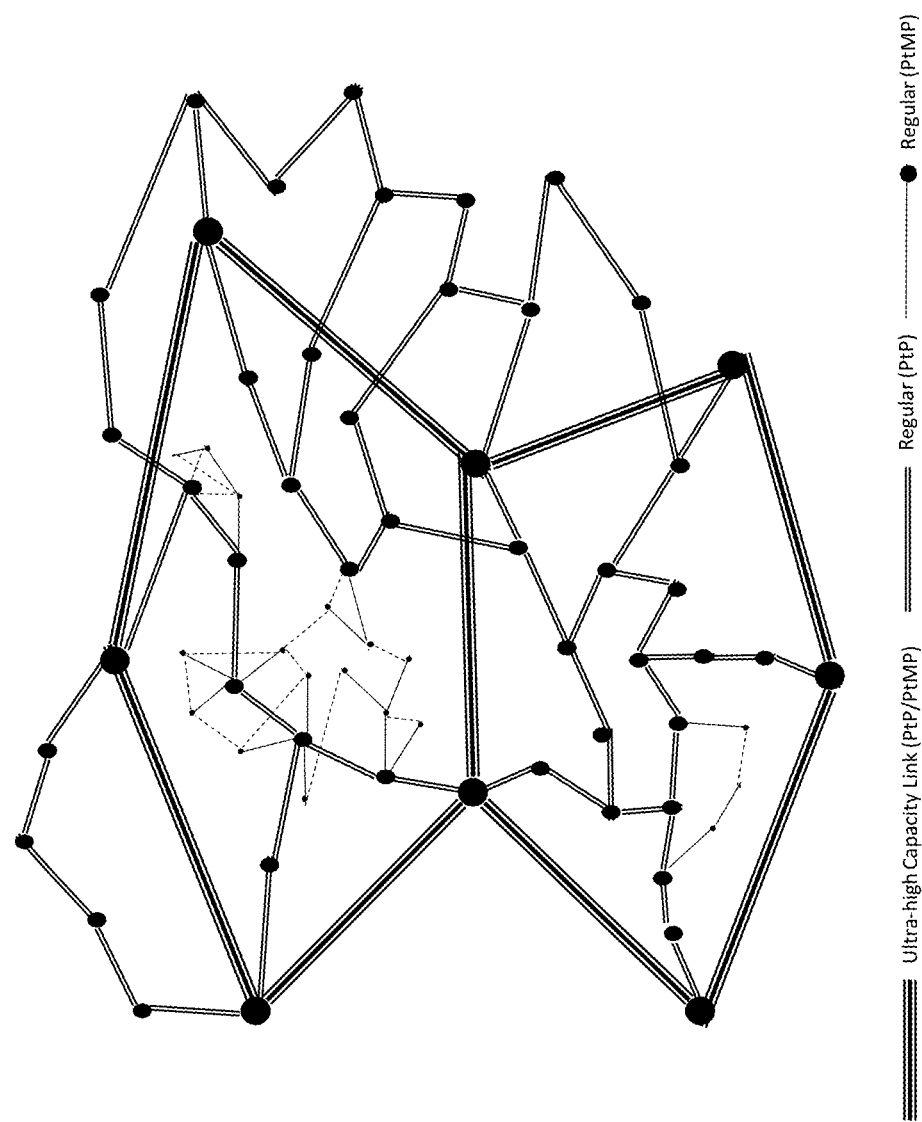
FIG. 27 depicts an example of a multi-layer wireless mesh network, in accordance with the present disclosure.

To illustrate with an example, FIG. 27 shows one example of a multi-layer wireless mesh network in which triple-compound links represent the ultra-high-capacity links described above, double-compound rings represent ptp links of the type discussed above with reference to FIGS. 1-26, and single-line links represent ptmp links of the type discussed above with reference to FIGS. 1-26. In this respect, each of the different types of links may be considered to define a different layer of the multi-layer wireless mesh network (e.g., an ultra-high-capacity layer, a standard ptp layer, and a standard ptmp layer).

As shown in FIG. 27, longer ultra-high-capacity links may be used bring a high level of capacity to the wireless mesh network, which can then be delivered to an end user/customer via a shorter ptp or point to multi point link (which may not be ultra-high-capacity). It should also be understood that while the ptmp links may primarily serve to provide flexibility in building the wireless mesh network due to the capability of beam steering and ability to establish multiple links from a single radio, these ptmp links may also be used to indirectly connect two ptp links via multiple ptmp link hops that can add additional reliability to the network.

Further, it should be understood that a multi-layer wireless mesh network such as the one illustrated in FIG. 27 can be deployed in various manners. For instance, in one implementation, different layers of the multi-layer mesh network can be deployed in parallel. In another implementation, different layers of the multi-layer wireless mesh network can be deployed in different phases. For example, a deployment approach for a multi-layer wireless mesh network may involve first building a core network backbone (e.g., an ultra-high-speed network) using ultra-high-capacity nodes/links and then densifying the network during one or more subsequent phases using other types of ptp or ptmp nodes/links, including but not limited to ptp or ptmp radio links of the type discussed above with reference to FIGS. 1-26. In another example, a deployment approach for a multi-layer wireless mesh network may involve first building a network of ptp nodes/links that are not ultra-high capacity and then later upgrading capacity by adding ultra-high-capacity nodes/links. A multi-layer wireless mesh network can be deployed in other manners as well.

Figure 28:
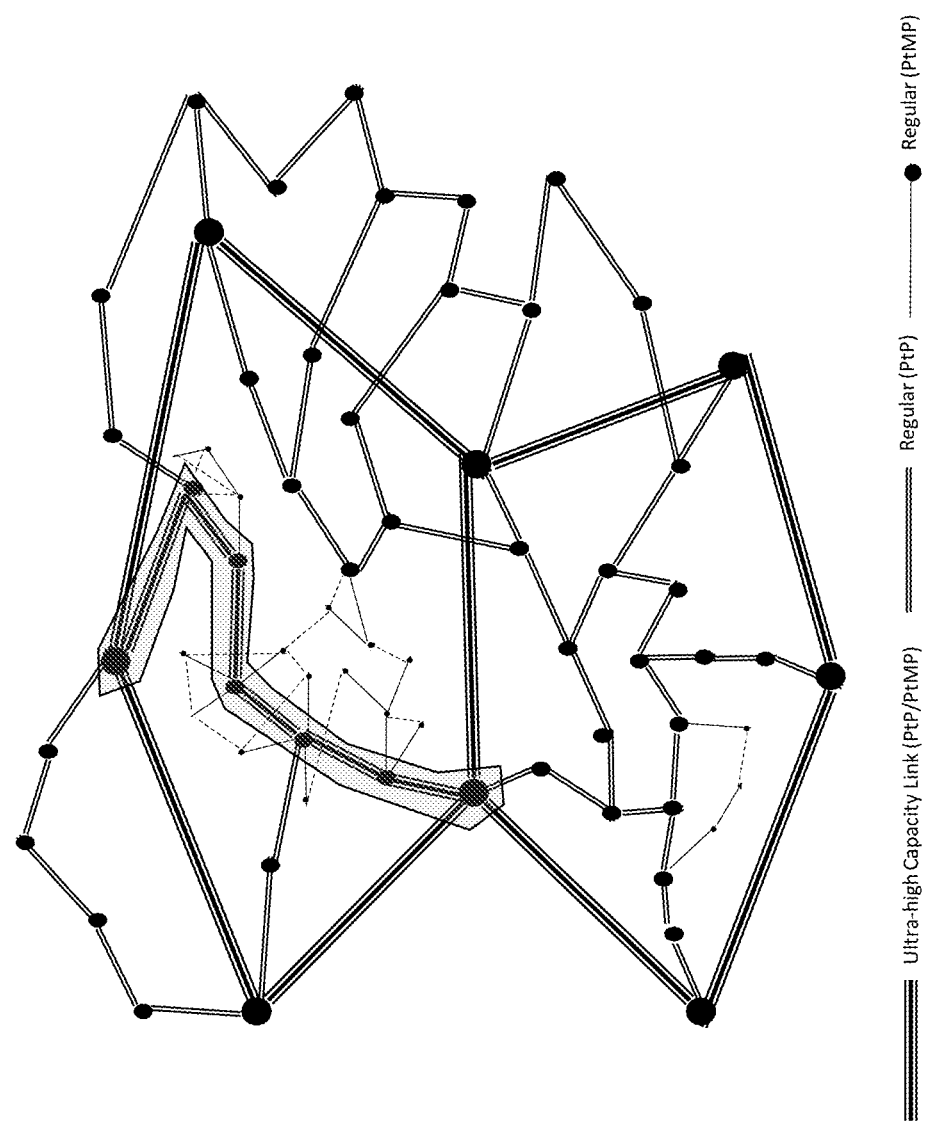
FIG. 28 depicts another example of a multi-layer wireless mesh network, in accordance with the present disclosure.

One variation of the multi-layer mesh architecture described above is that the ultra-high-capacity links can be designed to create specific paths based on a traffic requirement and/or some other criteria defined by the operator. To illustrate with an example, FIG. 28 shows another example of a multi-layer wireless mesh network in which some of the preexisting, non-ultra-high-capacity ptp links included in the example multi-layer wireless mesh network of FIG. 27 are replaced by ultra-high-capacity links (shown as triple-compound links) to provide ultra-high capacity to specific segments of the wireless mesh network. This can be done either by supplementing the hardware of the preexisting, non-ultra-high-capacity nodes at the customer location with new hardware (e.g., a new radio or other associated hardware)

capable of establishing ultra-high-capacity links or by replacing the hardware of the preexisting, non-ultra-high-capacity nodes at the customer location with new hardware (e.g., a new radio or other associated hardware) capable of establishing ultra-high-capacity links.

Another variation of the multi-layer mesh architecture described above is that different layers of the wireless mesh network may be deployed at different heights, which may create physical-link separation by allowing re-use of the available frequency spectrum. For instance, in one implementation, a multi-layer wireless mesh network can have at least 2 layers of ultra-high-capacity links operating in the same frequency range, but at different heights. To illustrate with an example, a first layer of ultra-high-capacity links can be deployed at a lower height, such as by installing the required hardware at a lower height within a structure hosting the wireless mesh hardware (e.g., on a lower floor of a building), and a second layer of the ultra-high-capacity links can be deployed at a higher height, such as by installing the required hardware at a higher height of the structure hosting the wireless mesh hardware (e.g., at higher floor of the building). In this respect, the deployment of these different layers of ultra-high-capacity links at different heights may serve to increase the capacity of the multi-layer wireless mesh network.

While the foregoing example involves the deployment of multiple different layers of ultra-high-capacity links at multiple different heights, it should be understood that this example is merely provided for purposes of illustration, and that multiple layers of wireless mesh links of any type may be deployed at different heights in order to enhance the overall capacity of the multi-layer wireless mesh network, including but not limited to layers of ultra-high-capacity links, non-ultra-high-capacity ptp links, and/or non-ultra-high-capacity ptmp links.

Yet another variation of the multi-layer mesh architecture described above is that the ptmp links that are not ultra-high capacity (which are shown in FIGS. 27 and 28 as single-line links) may be replaced by wired links, such as a coaxial wire loop, fiber loop or some other type of wired link. To illustrate with an example, a multi-layer mesh network may include wired links that comprise the coaxial portion of the HFC (Hybrid Fiber Coax) used by the cable companies, in which case this coaxial portion of the HFC may bring mesh network connectivity to end users while the fiber portion of the HFC may bring the high-speed internet to the neighborhood. In this respect, the wireless mesh links consisting of ultra-high-capacity links (which are shown in FIGS. 27 and 28 as triple-compound links) and/or non-ultra-high-capacity ptp links may play the role of the fiber equivalent portion of the HFC by bring high capacity from a fiber POP to the neighborhood.

According to yet another aspect of the present disclosure, sites that are installed with wireless communication equipment for operating as nodes of a wireless mesh network that is utilized for delivering services to end users such as high-speed internet (which may sometimes be referred to as a "next generation" wireless mesh network) may also be installed with equipment that enables the sites to additionally operate as nodes of an edge computing platform that is configured to support any of various different types of edge computing applications, examples of which may include autonomous vehicle ("AV") applications, industrial automation and/or robotics applications, augmented/virtual reality applications, and video monitoring and/or processing applications, among other possibilities.

For instance, as discussed above, a communication system that is based on the wireless mesh network technologies disclosed herein may include different tiers of sites that are installed with wireless communication equipment for operating as different tiers of nodes within a wireless mesh network—including fiber PoP sites that host fiber PoP nodes, seed homes that host seed nodes, and anchor homes that host anchor nodes—and these different tiers of sites/nodes may be interconnected together via wireless ptp and/or ptmp links in order to form the wireless mesh network. In accordance with this aspect of the present disclosure, some or all of these sites could then additionally be installed with equipment for operating as nodes of an edge computing platform, where the additional equipment installed at each such node may take the form of an edge computing system comprising hardware (e.g., a processor, data storage, a communication interface, etc.) and associated software for performing functions related to any of various types of edge computing applications. This novel architecture enables the mesh-based communication system disclosed herein to additionally perform remote processing and/or data storage for edge computing applications in a distributed manner at sites that are closer to the location where data for the edge computing applications is being generated and/or consumed, which may improve the response time and/or user experience for such edge computing applications.

In one implementation, the edge computing systems that are installed at the different tiers of nodes of the wireless mesh network may also have different levels of processing power. For instance, the edge computing systems installed at fiber PoP nodes of a wireless mesh network may generally have the highest level of processing power within the communication system, the edge computing systems installed at seed nodes of the wireless mesh network may generally have the second highest level of processing power within the communication system, and the edge computing systems installed at anchor nodes of the wireless mesh network may generally have the third highest level of processing power within the communication system. In this respect, the processing power of the edge computer systems may be defined based on various factors, examples of which may include clock speed, memory size, number of processing cores, and/or total number of physical computers/servers, among other possibilities.

When engaging in processing and/or data storage for an edge computing application, such an implementation enables the distributed edge computing platform disclosed herein to intelligently balance between (1) utilizing edge computing systems installed at nodes that are closer to an endpoint of an edge computing application such as anchor nodes, which may have lesser processing power than other nodes that are deeper into the distributed edge computing platform but may enable the communication between the endpoint and the nodes to traverse shorter distances (e.g., a lower number of hops) that should theoretically result in lower latency, and (2) utilizing edge computing systems installed at nodes that are further away from an endpoint of an edge computing application such as seed nodes or fiber PoP nodes, which may have more processing power than other nodes that are closer to the edge of the distributed edge computing platform but may require communication between the end-user equipment and the nodes to traverse longer distances (e.g., a higher number of hops) that may result in increased latency. In this respect, the edge computing systems belonging to the different tiers of the distributed edge computing platform disclosed herein may function to coordinate with one another to arbitrate the utilization of edge computing resources within the platform in a manner that is intended to optimize certain metrics related to the edge computing application, such as response time or bandwidth.

For instance, when an edge computing system installed at a given node receives a request to process data for an edge computing application, the edge computing system may evaluate and balance factors such as (1) the available processing power at the receiving node as compared to other nodes of the distributed edge computing platform, which may be defined in terms of the total available processing power at the nodes and perhaps also the current utilization of the processing power at the nodes (to the extent such information is available), and (2) the expected latency involved in offloading the processing to one or more other nodes in the distributed edge computing platform, which may be defined in terms of number of hops between the receiving node and the one or more other nodes, the maximum available bandwidth (or minimum possible latency) of each wireless link between the receiving node and the one or more other nodes, and perhaps also the current utilization of each wireless link between the receiving node and the one or more other nodes (to the extent such information is available). The edge computing system at the receiving node may evaluate other factors as well. Based on its evaluation, the edge computing system at the receiving node may then determine an appropriate plan for processing the data for the edge computing application (e.g., a plan that is expected to yield the quickest response time), and if that plan involves processing at one or more other nodes within the distributed edge computing platform, the edge computing system at the receiving node may in turn coordinate with the edge computing system at each of the one or more other nodes in order to cause the processing to be carried out.

Figure 29:
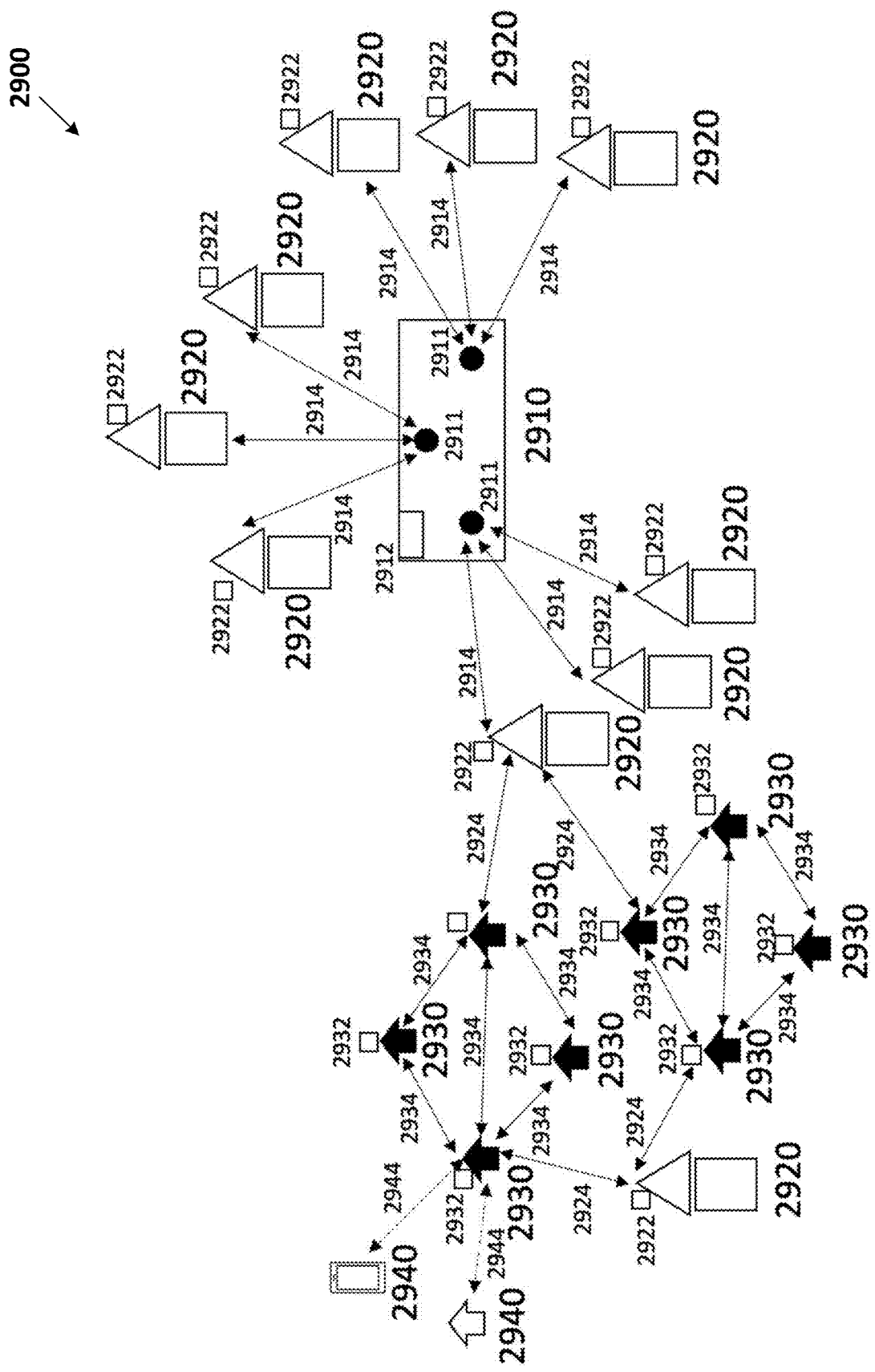
FIG. 29 depicts an example of a communication system in which an edge computing platform has been built on top of a wireless mesh network, in accordance with the present disclosure.

Turning now to FIG. 29, an example communication system 2900 that is built in accordance with this aspect of the present disclosure is illustrated. As shown in FIG. 29, example communication system 2900 may comprise a wireless mesh network of different tiers of wireless communication nodes that are configured to deliver a service such as high-speed internet service to end users—including at least one fiber POP node 2910 hosted at a fiber PoP site, at least one seed node 2920 hosted at a respective seed home, at least one anchor node 2930 hosted at a respective anchor site—where such nodes have also been installed with equipment (e.g., edge computing systems) for enabling such nodes to additionally operate as part of a distributed edge computing platform that is configured to perform processing and/or data storage for one or more edge computing applications. Additionally, as shown in FIG. 29, example communication system 2900 may also include at least one client node 2940 (which may be referred to as a "sub-anchor node") that can connect to other nodes of example communication system 2900 (e.g., anchor nodes) via a wireless link, such that the service(s) delivered by the wireless mesh network can be provided to client node 2940 and an edge computing application edge running on client node 2940 can also utilize the distributed edge computing platform. In this way, a distributed edge computing platform is "overlaid" onto an underlying wireless mesh network that is constructed in the manner disclosed herein, which may leverage the benefits of the disclosed wireless mesh network technologies (e.g., high capacity and low latency) in order to improve upon existing edge computing platforms.

For instance, as shown in FIG. 29, example communication system 2900 may include 1 fiber POP node 2910, 10 seed nodes 2920, 8 anchor nodes 2930 that are interconnected via wireless links to form a wireless mesh network, along with 2 client nodes 2940 that are each connected to a given anchor node 2930 of the wireless mesh network via a wireless link. In this arrangement, fiber POP 2910 is shown to be connected to certain seed nodes 2920 via respective PoP-to-seed wireless links 2914, certain seed nodes 2920 are shown to be connected to certain anchor nodes 2930 via respective seed-to-anchor wireless links 2924, certain anchor nodes 2930 are shown to be connected to other anchor nodes 2930 via respective anchor-to-anchor wireless links 2934, and then each client node 2940 is shown to be connected to a given anchor node 2930 via client-to-anchor wireless link 2944. In one implementation, each of wireless links 2914, 2924, 2934, and 2944 may take the form of a millimeter-wave ptp or ptmp link having very high capacity (e.g., a bandwidth ranging from 20 gigabits per second to 100 gigabits per second bi-directionally), but it should be understood that these wireless links could take other forms well. Further, while FIG. 29 shows one particular arrangement of fiber POP nodes, seed nodes, anchor nodes, and client nodes that have been interconnected via wireless links 2914, 2924, 2934, and 2944 to form a wireless mesh network, it should be understood that the nodes of example communication system 2900 may be arranged and interconnected together in various other manners as well—including but not limited to the possibility that example communication system 2900 could include any number of fiber POP nodes, seed nodes, anchor nodes, and client nodes.

Fiber POP node 2910 of example communication system 2900 may be hosted at any PoP site that has access to dedicated dark or lit fiber that provides fiber POP node 2910 with access to a very large amount of data bandwidth (e.g., several hundred gigabits/second) to carry network traffic to and from a core network/data center (not shown in the FIG. 29 for the sake of simplicity). Such a fiber PoP site may take various forms. As one possibility, the fiber PoP site could be a commercial building, such as a grocery store like Walmart, where equipment for establishing wireless links for the wireless mesh network (e.g., millimeter-wave radios and antennas) can be installed on the building's rooftop in a manner that provides good line-of-sight to surrounding areas. In such an implementation, an owner or operator of computing system 2900 could enter in a direct or indirect partnership or agreement with the owner or operator of the building and/or a fiber service provider to use the building either exclusively or on a shared basis as a site for a fiber POP node 2910. Additionally, in a scenario where the owner or operator of the building also owns other similar buildings, such as a chain of Walmart grocery stores, the agreement may involve exclusive or shared use of multiple different buildings as sites for fiber POP nodes 2910. As another possibility, the fiber PoP site could be some other building or structure, such as a cell tower or a residential or commercial building that is tall enough to provide good line-of-sight to surrounding areas.

As shown in FIG. 29, fiber PoP 2910 may include one or more antenna masts that each carry wireless communication equipment (e.g., one or more millimeter-wave radios and antennas and perhaps other supporting equipment such as routers, switches, power and/or battery units, mounts, etc.) for establishing one or more PoP-to-seed wireless links 2914 with one or more seed nodes of example communication system 2900. For example, FIG. 29 shows that fiber PoP 2910 may include three antenna masts 2911, each of which may carry wireless communication equipment (e.g., multiple millimeter-wave radios and antennas) that is configured to establish three separate PoP-to-seed wireless links 2914 with three seed nodes 2920. As noted above, in one implementation, each PoP-to-seed wireless link 2914 may take the form of a millimeter-wave ptp or ptmp link having very high capacity (e.g., a bandwidth ranging from 20 gigabits per second to 100 gigabits per second bi-directionally), but it should be understood that these wireless links could take other forms well. Further, it should be understood that fiber PoP 2910 shown in FIG. 29 is merely an illustrative example and that the number of antenna masts 2911 included in a fiber PoP node and/or the number of wireless links established by each antenna mast of a fiber PoP node may vary.

Turning to the seed nodes, each seed node 2920 of example communication system 2900 may be hosted at a site that may take the form of detached single-family home or residential unit, a non-detached residential building such as an MDU, a commercial building such as SMBs, or some other private property or infrastructure, where wireless communication equipment for establishing wireless links with other nodes of the wireless mesh network can be deployed at the site (e.g., on the rooftop of the building). In this respect, in addition to serving as an infrastructure node of the wireless mesh network, each seed node 2920 may deliver a mesh-based service such as high-speed internet to individuals that are located (e.g., reside or work) at the site of each seed node 2920.

Further, each seed node 2920 of example communication system 2900 may be installed with wireless communication equipment (e.g., millimeter-wave radios and antennas and perhaps other supporting equipment such as routers, switches, power and/or battery units, mounts, etc.) that enables the seed node 2920 to establish one or more wireless links with one or more other nodes of the wireless mesh network. For instance, a given seed node 2920 may be installed with wireless communication equipment for establishing a PoP-to-seed wireless link 2914 with at least one fiber PoP node 2910 and a respective seed-to-anchor wireless link 2924 with each of one or more anchor nodes 2930. Additionally, although not shown, a given seed node 2920 could also be installed with wireless communication equipment for establishing a seed-to-seed wireless link with a peer seed node 2920. As noted above, in one implementation, each PoP-to-seed wireless link 2914, seed-to-anchor wireless link 2924, and seed-to-seed wireless link (if present) may take the form of a millimeter-wave ptp or ptmp link having very high capacity (e.g., a bandwidth ranging from 20 gigabits per second to 100 gigabits per second bi-directionally), but it should be understood that these wireless links could take other forms well.

Turning to the anchor nodes, as with the seed nodes, each anchor node 2930 of example communication system 2900 may be hosted at a site that may take the form of detached single-family home or residential unit, a non-detached residential building such as an MDU, a commercial building such as SMBs, or some other private property or infrastructure, where wireless communication equipment for establishing wireless links with other nodes of the wireless mesh network can be deployed at the site (e.g., on the rooftop of the building). In this respect, in addition to serving as an infrastructure node of the wireless mesh network, each anchor node 2930 may deliver a mesh-based service such as high-speed internet to individuals that are located (e.g., reside or work) at the site of each anchor node 2930.

Further, each anchor node 2930 of example communication system 2900 may be installed with wireless communication equipment (e.g., millimeter-wave radios and antennas and perhaps other supporting equipment such as routers, switches, power and/or battery units, mounts, etc.) that enables the anchor node 2930 to establish one or more wireless links with one or more other nodes of the wireless mesh network. For instance, depending on its positioning within the wireless mesh network, a given anchor node 2930 may be installed with wireless communication equipment for establishing any one or more of (1) a seed-to-anchor wireless link 2924 with a seed node 2920 (or perhaps multiple such links), (2) an anchor-to-anchor wireless link 2934 with a peer anchor node 2930 (or perhaps multiple such links), and/or (3) an anchor-to-client wireless link 2944 with one or more client nodes 2940 (or perhaps multiple such links). A few representative examples of the possible configurations of an anchor node 2930 are illustrated in FIG. 29—some anchor nodes 2930 have a seed-to-anchor wireless link 2924 with a seed node 2920 as well as anchor-to-anchor wireless links 2934 with multiple peer anchor nodes 2930, other anchor nodes 2930 have anchor-to-anchor wireless links 2934 with multiple peer anchor nodes 2930 (but are not connected to any seed node 2920 or client node 2940), and then one anchor node 2930 closer to the edge has anchor-to-anchor wireless links 2934 with multiple peer anchor nodes 2930 as well as anchor-to-client wireless link 2944 with two client nodes 2940. Many other configurations of an anchor node 2930 are possible as well. As noted above, in one implementation, each seed-to-anchor wireless link 2924, anchor-to-anchor wireless link 2934, and anchor-to-client wireless link 2944 may take the form of a millimeter-wave ptp or ptmp link having very high capacity (e.g., a bandwidth ranging from 20 gigabits per second to 100 gigabits per second bi-directionally), but it should be understood that these wireless links could take other forms well.

Turning lastly to the client nodes, each client node 2940 of example communication system 2900 may comprise equipment (e.g., a millimeter-wave radio and associated antenna) for connecting to an infrastructure node of the wireless mesh network via a wireless link so as to enable to client node 2940 to send data to and/or receive data from the wireless mesh network. For example, as shown in FIG. 29, client nodes 2940 may each be connected to a given anchor node 2930 of the wireless mesh network via an anchor-to-client wireless link 2944, which may comprise whichever anchor node 2930 is physically closest to client nodes 2940 (among other possibilities). As noted above, in one implementation, each anchor-to-client wireless link 2944 may take the form of a millimeter-wave ptp or ptmp link having very high capacity (e.g., a bandwidth ranging from 20 gigabits per second to 100 gigabits per second bi-directionally), but it should be understood that these wireless links could take other forms well.

In practice, client nodes 2940 may take any of various forms, examples of which may include fixed-location CPE and mobile computing devices or systems, among other possibilities. Further, in practice, client nodes 2940 may be owned by, operated by, or otherwise associated with individuals or organizations that are considered to be end users (or sometimes referred to as customers) of a service that is delivered by the wireless mesh network, such as a high-speed internet service. Further yet, it should be understood that client nodes 2940 may switch its connection to the wireless mesh network from one infrastructure node to another over the course of time (e.g., if client node 2940 is a mobile device that is changing location).

In line with the discussion above, the wireless communication equipment for establishing the wireless links of the wireless mesh network may take any of various forms. As one possibility, such wireless communication equipment may include an independent ptp/ptmp radio module for each wireless ptp or ptmp link that is established at a given node. As another possibility, such wireless communication equipment may include a central unit (e.g., an NPU) that is configured to control one or more ptp/ptmp radio modules that each generates a respective ptp or ptmp link. As yet another possibility, such wireless communication equipment may include a single or multiple massive MIMO (multiple input multiple out) radio along with RF chains and two-dimensional antenna arrays that may simultaneously generate and operate dedicated ptmp or coordinated ptmp links to connect to other nodes of the wireless mesh network. The wireless communication equipment for establishing the wireless links of the wireless mesh network may take other various forms as well.

In line with the discussion above, each different type of wireless link 2914, 2924, 2934, 2944 within the wireless mesh network of FIG. 29 could be either a wireless ptp link or a wireless ptmp link. However, in practice, these different types of wireless links have different respective advantages and disadvantages and may thus be better suited for use in different segments of the wireless mesh network.

For instance, millimeter-wave ptp links generally have a better interference profile than millimeter-wave ptmp links, and in most cases, millimeter-wave ptp links are unlikely to cause interference with one another even if such millimeter-wave ptp links do not have an extremely-narrow beamwidth (e.g., a 3 dB-beamwidth of up to 10 degrees or perhaps more). The primary exception to this would be a scenario where a ptp receiver has established a ptp link with a corresponding ptp transmitter but is also pointed towards the boresight (or closer to) of another ptp transmitter that is not intended to establish a ptp link with the ptp receiver. However, this scenario is unlikely and can be easily mitigated by changing the position of the impacted ptp receiver and its corresponding. However, because millimeter-wave ptp links have a narrower beamwidth, they are better suited for establishing connections between nodes that have predefined, fixed locations and are expected to require minimal or no coordination after deployment of the wireless mesh network, such as Fiber PoP, seed, and anchor nodes. On the other hand, because millimeter-wave ptmp links have a wider beamwidth (e.g., a beamwidth ranging from 120 degrees to 180 degrees), they are better suited for establishing connections with nodes that do not have predefined locations and may require coordination for frequency planning, interference mitigation, or the like after deployment of the wireless mesh network, such as client nodes that may be added after deployment of the wireless network and/or may not have a fixed location (e.g., mobile client devices). In this respect, the coordination that may be required may involve intra-link coordination between multiple devices that are communicating over the same ptmp link and inter-link coordination between multiple ptmp links operating on the same frequency.

In order to leverage these differing characteristics of ptp and ptmp links, in one particular implementation, the wireless mesh network disclosed herein may be designed such that each of the PoP-to-seed wireless links 2914, seed-to-anchor wireless links 2924, seed-to-seed wireless links (if present), and anchor-to-anchor wireless links 2934 is a wireless ptp link, while each wireless link between an infrastructure node and a client node (such as anchor-to-client wireless link 2944) is a wireless ptmp link originated by the infrastructure node. In this respect, the wireless mesh network may be considered to have two different "layers" (or "segments") of wireless links: (1) a first layer comprising the wireless ptp links that interconnect the fiber PoP, seed, and anchor nodes together, which may be preferred to as a "ptp layer," and (2) a second layer comprising the wireless ptmp links that connect the infrastructure nodes of the wireless mesh network to the client nodes, which may be preferred to as a "ptmp layer."

As discussed above, a distributed edge computing platform may also be overlaid onto the underlying wireless mesh network of FIG. 29 by installing certain nodes with equipment (e.g., an edge computing system) that enables such nodes to additionally operate as part of the distributed edge computing platform.

For instance, as shown in FIG. 29, Fiber POP node 2910 of example communication system 2900 may be installed with an edge computing system 2912 comprising hardware (e.g., a processor, data storage, a communication interface, etc.) and associated software for performing functions related to any of various types of edge computing applications, perhaps along with other supporting equipment (e.g., routers, switches, power and/or battery units, cooling units, etc.). In one implementation, edge computing system 2912 that is installed at Fiber POP node 2910 may be designed to have a very high level of processing power that exceeds the processing power of edge computing systems installed at any of the lower tiers of nodes within example communication system 2900, such as the seed and anchor nodes. For example, edge computing system 2912 may comprise multiple racks of high-powered, multi-core servers (perhaps along with associated power and cooling units) that are configured to run multiple tasks simultaneously and may be viewed as a "mini cloud" computing platform. However, edge computing system 2912 may take other forms as well.

Further, as shown in FIG. 29, each seed node 2920 of example communication system 2900 may be installed with a respective edge computing system 2922 comprising hardware (e.g., a processor, data storage, a communication interface, etc.) and associated software for performing functions related to any of various types of edge computing applications, perhaps along with other supporting equipment (e.g., routers, switches, power and/or battery units, cooling units, etc.). In one implementation, edge computing systems 2922 that are installed at seed nodes 2920 may be designed to have a high level of processing power that is not at the level of edge computing system 2912, but exceeds the processing power of edge computing systems installed at any of the lower tiers of nodes within example communication system 2900, such as the anchor nodes. For instance, each edge computing system 2922 may comprise a lesser number of servers (e.g., a few servers or perhaps as little as one server) that generally impose less power and cooling demands (e.g., less than 100 watts of power) than edge computing system 2912, and may also occupy a smaller physical footprint and/or have a lower cost. Additionally, in practice, edge computing systems 2922 may be designed to operate in harsher physical environments (e.g., environments with a greater extent of dust, debris, vibrations, etc. and/or a wider range of operating temperature). However, edge computing systems 2922 may take other forms as well.

While edge computing systems 2922 are generally designed to have a lower level of processing power than edge computing system 2912, it should be understood that edge computing systems 2922 will generally be closer to the location where processing and storage may be needed for an edge computing application than edge computing system 2912, and may thus provide superior response time relative to edge computing system 2912.

Further yet, as shown in FIG. 29, each respective anchor node 2930 of example communication system 2900 (or at least a subset thereof) may be installed with a respective edge computing system 2932 comprising hardware (e.g., a processor, data storage, a communication interface, etc.) and associated software for performing functions related to any of various types of edge computing applications, perhaps along with other supporting equipment (e.g., routers, switches, power and/or battery units, cooling units, etc.). In one implementation, edge computing systems 2932 that are installed at anchor nodes 2930 may be designed to have a level of processing power that is not at the level of either edge computing systems 2922 or edge computing system 2912, but may still be capable of performing processing for edge computing applications. For instance, each edge computing system 2932 may comprise a lesser number of servers than edge computing system 2922 (e.g., a single server), and may also occupy a smaller physical footprint and/or have a lower cost. Additionally, as with edge computing systems 2922, edge computing systems 2932 may be designed to operate in harsher physical environments (e.g., environments with a greater extent of dust, debris, vibrations, etc. and/or a wider range of operating temperature). However, edge computing systems 2932 may take other forms as well—including but not limited to the possibility that edge computing system 2932 may have a level of processing power that is relatively similar to edge computing systems 2922.

While edge computing systems 2932 are generally designed to have a lower level of processing power than edge computing systems 2922 and edge computing system 2912, it should be understood that edge computing systems 2932 will generally be closer to the location where processing and storage may be needed for an edge computing application than edge computing systems 2922 and edge computing system 2912, and may thus provide superior response time relative to edge computing systems 2922 and edge computing system 2912.

In accordance with the disclosed architecture, the edge computing systems installed at the different tiers of nodes in example communication system 2900 may then be configured to communicate with one another via the wireless links described above, which may take the form of millimeter-wave ptp and/or ptmp links that have high capacity (e.g., a bandwidth ranging from 20 gigabits per second to 100 gigabits per second bi-directionally) and low latency (e.g., less than 1 millisecond for ptp links and less than 4 milliseconds for ptmp links).

In addition to having the capability to connect to the wireless mesh network and access mesh-based services delivered via the wireless mesh network, certain client nodes 2940 of example communication system 2900 may then be programmed with the capability to operate as endpoints for one or more edge computing applications (or may provide a direct or indirect connection to such a client device), examples of which may include AV applications, industrial automation and/or robotics applications, augmented/virtual reality applications, and video monitoring and/or processing applications, among other possibilities. In this respect, certain client nodes 2940 may be installed with software associated with an edge computing application and may function to generate and/or consume data for the edge computing application that is processed and/or stored by the distributed edge computing platform disclosed herein.

In line with the discussion above, the edge computing systems installed at the different tiers of nodes in example communication system 2900 may also function to coordinate with one another to arbitrate the utilization of edge computing resources within the platform (e.g., processing and memory resources). For instance, when a given edge computing system 2932 installed at a given anchor node 2930 receives a request to process data for an edge computing application, the given edge computing system 2932 may evaluate and balance factors such as (1) the available processing power at the anchor node 2930 as compared to other nodes of the distributed edge computing platform (e.g., seed nodes 2920 and fiber PoP node 2910) and (2) the expected latency involved in offloading the processing to one or more other nodes in the distributed edge computing platform (e.g., seed nodes 2920 and fiber PoP node 2910), among other possibilities. Based on its evaluation, the given edge computing system 2932 may then determine an appropriate plan for processing the data for the edge computing application (e.g., a plan that is expected to yield the quickest response time), and if that plan involves processing at one or more other nodes within the distributed edge computing platform, the given edge computing system 2932 may in turn coordinate with the edge computing system at each of the one or more other nodes in order to cause the processing to be carried out. In this way, the edge computing platform disclosed herein may be able to provide improved response times for edge computing applications relative to existing edge computing platforms.

In some implementations, the edge computing systems may also be configured to store copies of digital content (or perhaps other types of data) that is not considered to be "local" to the edge computing systems, including but not limited to digital content that is local to other edge computing systems in the platform. This provides content redundancy in the edge computing platform. Hence, when an end user of the edge computing platform requests digital content, then this mechanism allows the request to be fulfilled in a variety of different ways, including a request processed by a local node and/or remote node based on various criteria including but not limited to latency, network congestion, etc. of the application making the request.

Figure 30:
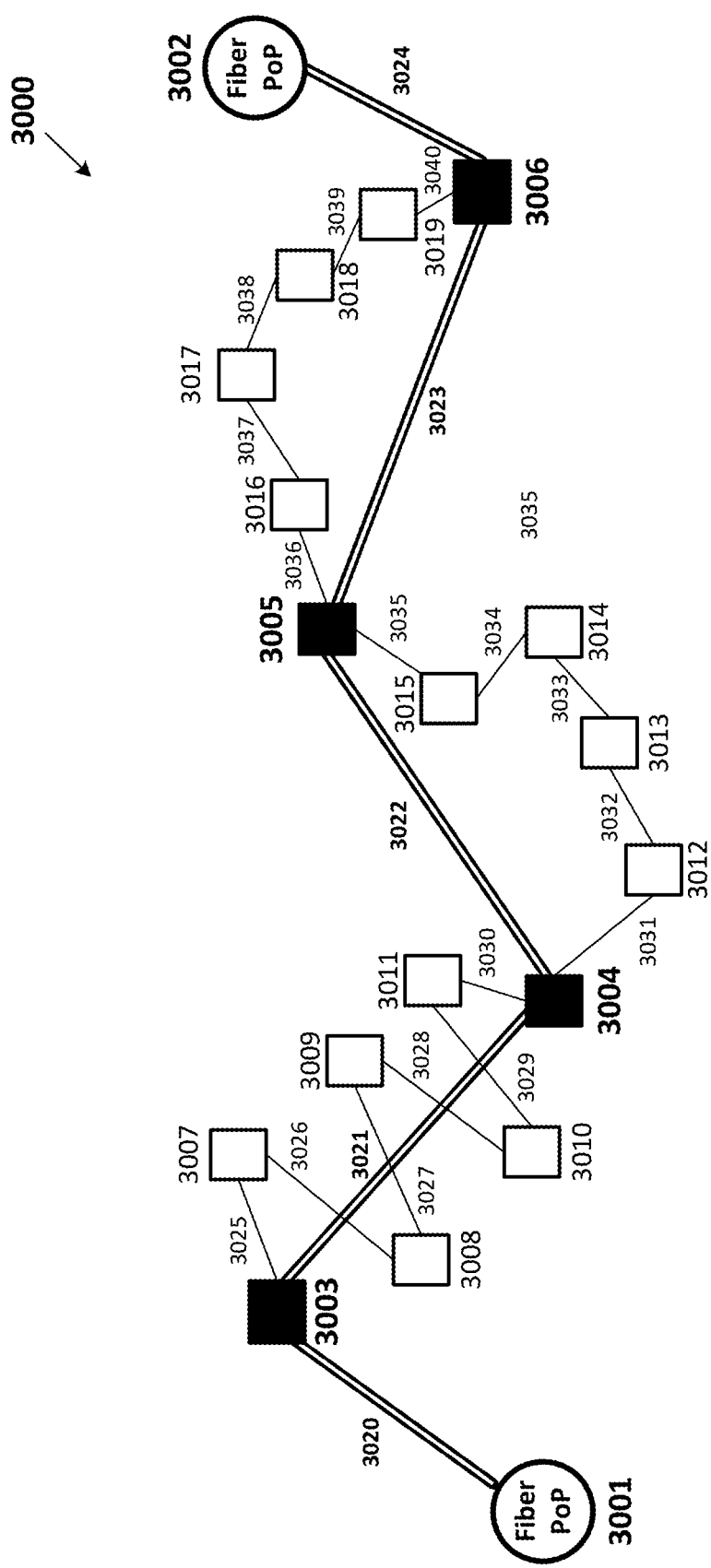
FIG. 30 depicts an example of a communication system that is based on a wireless mesh network comprising short-hop and long-hop links, in accordance with the present disclosure.

Referring to FIG. 30, a further example of a data communication system 3000 capable of providing multigigabit internet speeds through a mesh network of wireless ptp and ptmp links is illustrated. Communication system 3000 in FIG. 30 includes Tower/fiber access points (e.g., fiber PoPs) 3001 and 3002.

Tower/fiber access points 3001 and 3002 can be co-located or can be located at different physical locations. Tower/fiber access points 3001 and 3002 have access to high bandwidth dark fiber capable of providing up to several hundred gigabits/second of data throughput. Tower/fiber access points 3001 and 3002 may provide backhaul connectivity between a core network/data center (not shown in the figure for the sake of simplicity) and a seed home of the communication network described below. Tower/Fiber access points 3001 and 3002 may also host hardware equipment that establishes wireless point-to-point connectivity with communication nodes 3003 and 3006 respectively. Specifically, fiber PoP 3001 is connected to wireless communication node 3003 via the long-hop link 3020 that is capable of operating on high bandwidth (multiple gigahertz) signals operating at very high frequency (e.g., 6 Ghz-100 Ghz, such as 28 Ghz, V band, E band, etc.). Similarly, fiber PoP 3002 is connected to wireless communication node 3006 via the long-hop link 3024 that is capable of operating on high bandwidth (multiple gigahertz) signals operating at very high frequency (e.g., 6 Ghz-100 Ghz, such as 28 Ghz, V band, E band, etc.).

In addition, wireless communication node 3003 is connected to wireless communication node 3004 via long-hop link 3021, wireless communication node 3004 is connected to wireless communication node 3005 via long-hop link 3022, and finally wireless communication node 3005 is connected to wireless communication node 3006 via long-hop link 3023 as shown in FIG. 30.

The long-hop links 3020, 3021, 3022, 3023 and 3024 may generally be longer in length compared to short-hop links. For example, in one embodiment, long-hop links can be 500~600 meters in length. In a different embodiment, long-hop links can be shorter or longer than 500~600 meters.

Communication system 3000 also comprises a number of short-hop links as shown in FIG. 30. Specifically, wireless communication node 3003 is connected with wireless communication node 3007 via the short-hop link 3025, wireless communication node 3007 is connected with wireless communication node 3008 via short-hop link 3026, wireless communication node 3008 is connected with wireless communication node 3009 via short-hop link 3027, wireless communication node 3009 is connected with wireless communication node 3010 via short-hop link 3028, wireless communication node 3010 is connected with wireless communication node 3011 via short-hop link 3029, and wireless communication node 3011 is connected with wireless communication node 3004 via short-hop link 3030 to close the zig-zag path of short-hop links that originates from wireless communication node 3003 and ends at wireless communication node 3004. Similarly, FIG. 30 shows that wireless communication node 3004 is connected with wireless communication node 3012 via short-hop link 3031, wireless communication node 3012 is connected with wireless communication node 3013 via short-hop link 3032, wireless communication node 3013 is connected with wireless communication node 3014 via short-hop link 3033, wireless communication node 3014 is connected with wireless communication node 3015 via short-hop link 3034, and wireless communication node 3015 is connected with wireless communication node 3005 via short-hop link 3035 to close the path of short-hop links that originates from wireless communication node 3004 and ends at wireless communication node 3005.

Likewise, FIG. 30 shows that wireless communication node 3005 is connected with wireless communication node 3016 via short-hop link 3036, wireless communication node 3016 is connected with wireless communication node 3017 via short-hop link 3037, wireless communication node 3017 is connected with wireless communication node 3018 via short-hop link 3038, wireless communication node 3018 is connected with wireless communication node 3019 via short-hop link 3039, and wireless communication node 3019 is connected with wireless communication node 3006 via short-hop link 3040 to close the path of short-hop links that originate from wireless communication node 3005 and end at wireless communication node 3006. In this respect, the short-hop links that connect wireless communication node 3003 to wireless communication node 3004 includes intermediary wireless communication nodes 3007-3011 and 6 short-hop links 3025-3030. Similarly, short-hop links that connect wireless communication node 3004 to 3005 and 3005 to 3006 each comprise 4 intermediary wireless communications nodes and 5 short-hop links.

However, it should be understood that communication system 3000 can have any number of intermediary nodes in the path of short-hop links that connect two wireless communication nodes that are already connected directly to each other via a long-hop link.

In accordance with the present disclosure, the use of long-hop links in combination with short-hop links may greatly reduce the maximum number of hops the data packets need to pass in order to transport packets between an end user and a fiber PoP. For example, consider an end user associated with wireless communication node 3013. In the absence of long-hop links 3021, 3022 and 3023, data packets that originate from an end-user connected with wireless communication node 3013 would pass through a large number of intermediary wireless communication nodes or hops. For instance, in the event where a given packet needs to be transmitted between fiber PoP 3001 and wireless communication node 3013, the given packet would go through 8 intermediary nodes including 3012, 3004, 3011, 3010, 3009, 3008, 3007, and 3003 with no long-hop links in the mesh network. However, as shown in FIG. 30, in the presence of long-hop links, a given packet would only go through 3 nodes including 3012, 3004 and 3003, as wireless communication nodes 3003 and 3004 are directly connected via long-hop link 3021. This greatly reduces the latency or packet delay as latency increases linearly with the increasing number of intermediary nodes.

The above example shows how an end-user associated with wireless communication node 3013 can benefit from the presence of long-hop links for improving the latency or packet delay. However, in general a large number of wireless communication nodes especially the ones that are indirectly connected to wireless communication nodes with long-hop links can also benefit with improved network latency or packet delay in such a wireless mesh network design. In addition, the presence of long-hop links improves the reliability of the network by increasing the number of available wireless mesh network paths between the source and the destination. For example, the end user associated with wireless communication node 3013 can take (a) a path consisting of intermediary nodes 3012←→3004←→3003←→3001, (b) a path consisting of intermediary nodes 3012←→3004←→3011←→3010←→3009←→3008←→3007←→3003←→3001, (c) a path consisting of intermediary nodes 3014←→3015←→3005←→3006←→3002, and/or (d) a path consisting of intermediary nodes 3014←→3015←→3005←→3016←→3017←→3018←→3019←→3006←→3002 to connect to the core network. These alternative paths increase reliability of the overall network. For example, in the event that short-hop link 3025 fails, option (b) described above for the end user of wireless communication node 3013 may fail, but other options including options (a), (c), and (d) may be available to transfer packets or traffic between wireless communication node 3013 and the core network.

Bi-directional communication links 3020 to 3040 shown in FIG. 30 can use various different multiple access schemes for transmission and reception including but not limited to FDMA, TDMA, SC-FDMA, SC-TDMA, CDMA, OFDMA, and/or NOMA as described in various generations of communication technologies including 1G, 2G, 3G, 4G, 5G, 6G etc. Further, in at least some embodiments, bi-directional communication links 3020 to 3040 may each comprise a millimeter-wave link. Further yet, bi-directional communication links 3020 to 3040 formed by the pairs of communication nodes from the set including 3001 to 3019 may be capable of data information transfer via a variety of digital transmission schemes including but not limited to AM, PM, PAM/QAM, UWB pulse modulation (e.g., pico-second pulses), etc.

In FIG. 30, two Tower/fiber access points (PoP) 3001 & 3002, 5 long-hop bi-directional links 3020-3024 and 16 bi-directional point to point short-hop links 3025-3040 are shown to illustrate an example of a communication system.

However, it should be understood that communication system 3000 can include a different number of Tower/fiber nodes (PoP), long-hop links, and/or short-hop links depending on the specific layout of a particular instantiation of the communication system deployed in the field. A given communication system may also contain other nodes such as network switches/routers, etc., that are omitted here for the sake of simplicity.

Figure 31:
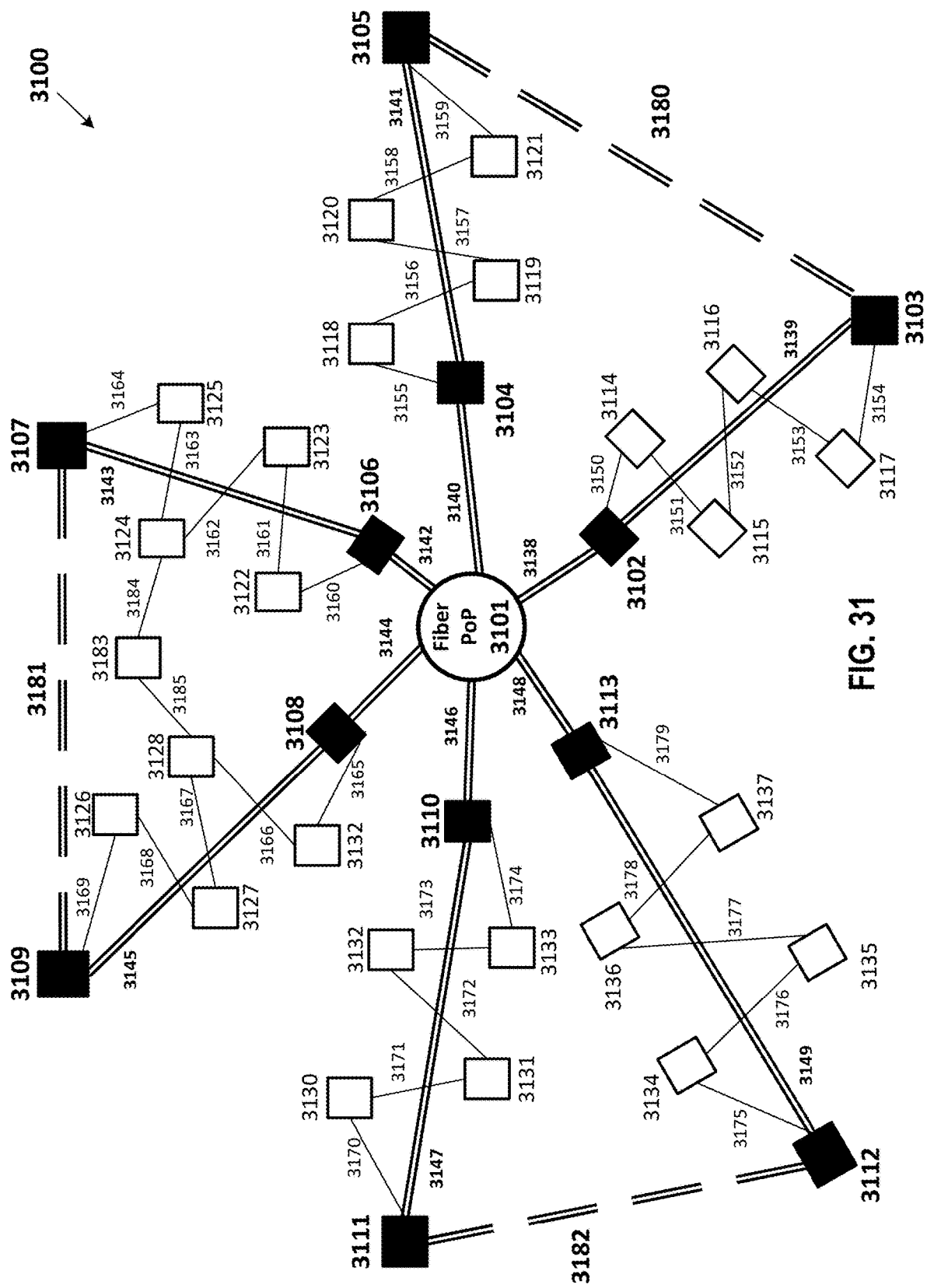
FIG. 31 depicts another example of a communication system that is based on a wireless mesh network comprising short-hop and long-hop links, in accordance with the present disclosure.

Referring to FIG. 31, yet another example of a communication system 3100 based on a wireless mesh network design comprising long-hop links and short-hops link of the type described above is shown. Specifically, FIG. 31 shows a fiber PoP node 3101 and a number of segments of long-hop links originating from the fiber PoP 3101 in the shape of wheel spokes along with wireless communication nodes interconnected via short-hop links. For example, long-hop links 3142 and 3143 that connect node 3101 to 3106 and 3106 to 3107 respectively form a segment of long-hop links ($1^{st}$ spoke). Similarly, long-hop links 3144 and 3145 that connect node 3101 to 3108 and 3108 to 3109 respectively form another segment of long-hop links ($2^{nd}$ spoke). Likewise, long-hop links 3146 and 3147 that connect node 3101 to 3110 and 3110 to 3111 respectively form another segment of long-hop links (3rd spoke). In the same manner, long-hop links 3148 and 3149 that connect node 3101 to 3113 and 3113 to 3112 respectively form another segment of long-hop links (4th spoke). Similarly, long-hop links 3138 and 3139 that connect node 3101 to 3102 and 3102 to 3103 respectively form another segment of long-hop links ($5^{th}$ spoke). Further, long-hop links 3140 and 3141 that connect node 3101 to 3104 and 3104 to 3105 respectively form another segment of long-hop links ($6^{th}$ spoke).

The different spokes that are formed from segments of long-hop links are also interconnected via long-hop links. For example, the $1^{st}$ spoke and the $2^{nd}$ spoke are connected via long-hop link 3181. Similarly, the $3^{rd}$ and $4^{th}$ spokes are connected via long-hop link 3182 and the $5^{th}$ and $6^{th}$ spokes are interconnected via long-hop link 3180.

FIG. 31 shows 6 segments of long-hop links or spokes originating from fiber PoP 311. However, it should be understood that the disclosed wireless mesh network layout can have any number of spokes, which may depend on the specific terrain of the network, density of homes (potential node locations) and/or line-of-sight profile.

In addition, network layout in FIG. 31 shows a number of wireless communication nodes connected to each other and connected via long-hop links through short-hop links. For example, wireless communication node 3102 is connected to wireless communication node 3114 via short-hop link 3150, wireless communication node 3114 is connected to wireless communication node 3115 via short-hop link 3151, wireless communication node 3115 is connected to wireless communication node 3116 via short-hop link 3152, wireless communication node 3116 is connected to wireless communication node 3117 via short-hop link 3153, and wireless communication node 3117 is connected to wireless communication node 3103 via short-hop link 3154 to form a segment of short-hop links that connects the wireless communication node 3102 and 3103, thereby providing an alternative path between nodes 3102 and 3103.

As another example, wireless communication node 3104 is connected to wireless communication node 3118 via short-hop link 3155, wireless communication node 3118 is connected to wireless communication node 3119 via short-hop link 3156, wireless communication node 3119 is connected to wireless communication node 3120 via short-hop link 3157, wireless communication node 3120 is connected to wireless communication node 3121 via short-hop link 3158, and finally wireless communication node 3121 is connected to wireless communication node 3105 via short-hop link 3159 to form a segment of short-hop links that connects the wireless communication node 3104 and 3105, thereby providing an alternative path between nodes 3104 and 3105.

As yet another example, wireless communication node 3106 is connected to wireless communication node 3122 via short-hop link 3160, wireless communication node 3122 is connected to wireless communication node 3123 via short-hop link 3161, wireless communication node 3123 is connected to wireless communication node 3124 via short-hop link 3162, wireless communication node 3124 is connected to wireless communication node 3125 via short-hop link 3163, and wireless communication node 3125 is connected to wireless communication node 3107 via short-hop link 3164 to form a segment of short-hop links that connects the wireless communication node 3106 and 3107, thereby providing an alternative path between nodes 3106 and 3107.

As a further example, short-hop links ranging from 3165 to 3179 connect a number of wireless communication nodes to each other. Other examples are possible as well.

Nodes belonging to different spokes or segments of long-hop links can also be interconnected via short-hop links. For instance, node 3124 and node 3128 are associated with two different spokes or segments of long-hop links. However, both 3124 and 3128 are connected to another wireless communication node 3183 via short-hop links 3184 and 3185 respectively, thereby creating a path along wireless mesh network that can connect nodes associated with different spokes via short-hop links in addition to long-hop links 3180, 3181 and 3182 described above.

In addition, it is also possible to connect any adjacent spokes via direct long-hop links. For example, although not shown in FIG. 31, it is also possible to connect wireless communication node 3111 and wireless communication node 3109 via a long-hop link in the presence of line-of-sight path between 3111 and 3109.

Similar to FIG. 30, it can be seen that a wireless mesh network design comprising long-hop links and short-hop links may greatly reduce the maximum number of hops a data packet needs to pass through before reaching its destination. In addition, in line with the discussion above, long-hop links may increase the reliability of network by providing alternative paths in an event where the original path of traffic flow breaks due to failure of a link or multiple links.

Figure 32:
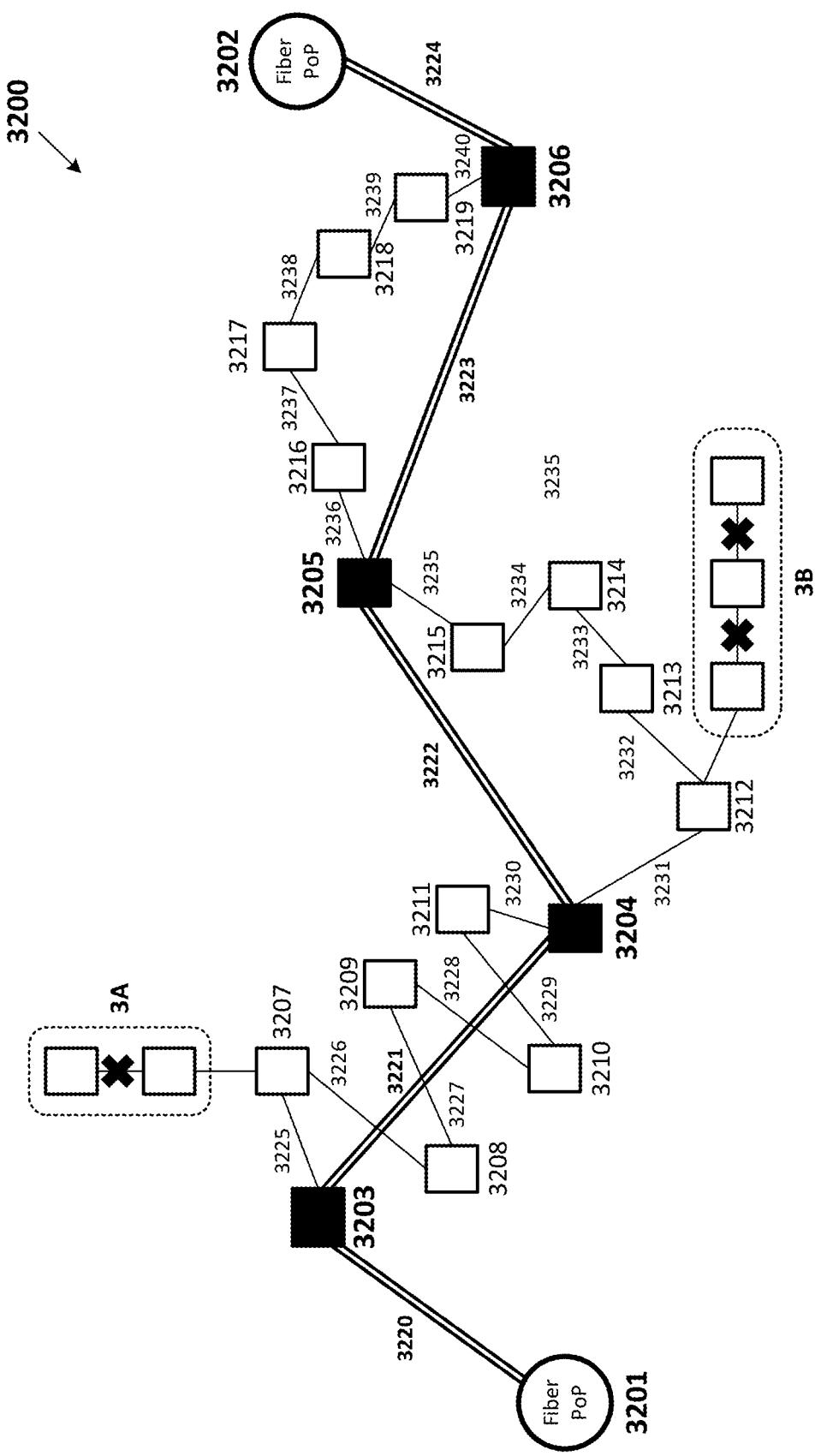
FIG. 32 depicts yet another example of a communication system that is based on a wireless mesh network comprising short-hop and long-hop links, in accordance with the present disclosure.

Referring now to FIG. 32, another example of a communication system 3200 based on a wireless mesh network design is depicted where adjacent short-hop links are constrained to not form a straight line in order to avoid mutual interference from adjacent wireless communication nodes. For example, consider a segment labeled "3A" comprising two nodes that are above wireless communication node 3207. In segment 3A, a short-hop link that connects the two nodes above communication node 3207 cannot be allowed as it would cause interference to node 3207 given that their signal propagation paths overlap. Similarly, with respect to a segment labeled "3B" comprising 3 nodes that are on the right of node 3212, two nodes to the right of node 3212 cannot be allowed as their two short-hop links would create interference for node 3212 given that their signal propagation paths overlap. In general, nodes that are connected via short-hop links in such a manner where a segment of short-hop links form a straight line cannot be allowed in order to avoid interference among adjacent nodes connected via short-hop links.

Figure 33A:
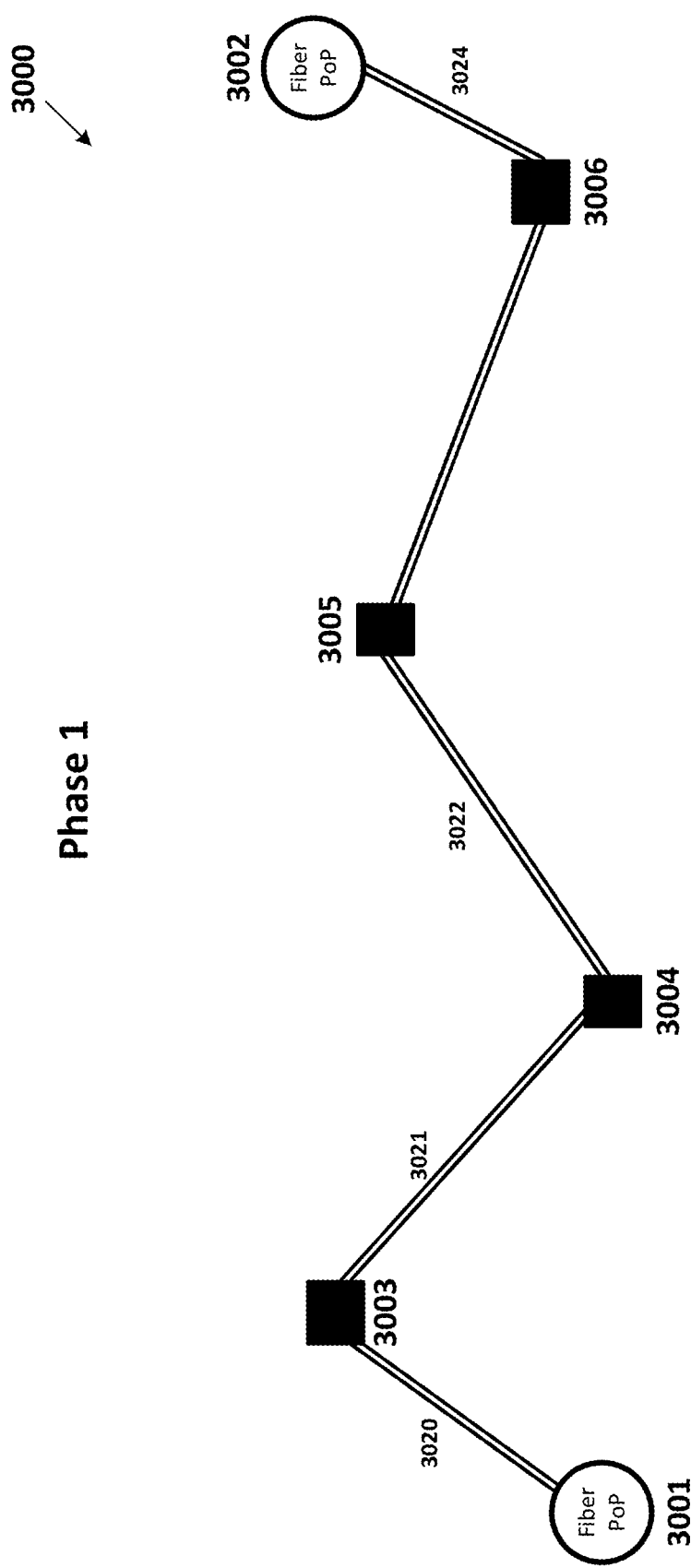
FIG. 33A depicts a first phase of an approach for building a communication system that is based on a wireless mesh network comprising short-hop and long-hop links, in accordance with the present disclosure.
Figure 33B:
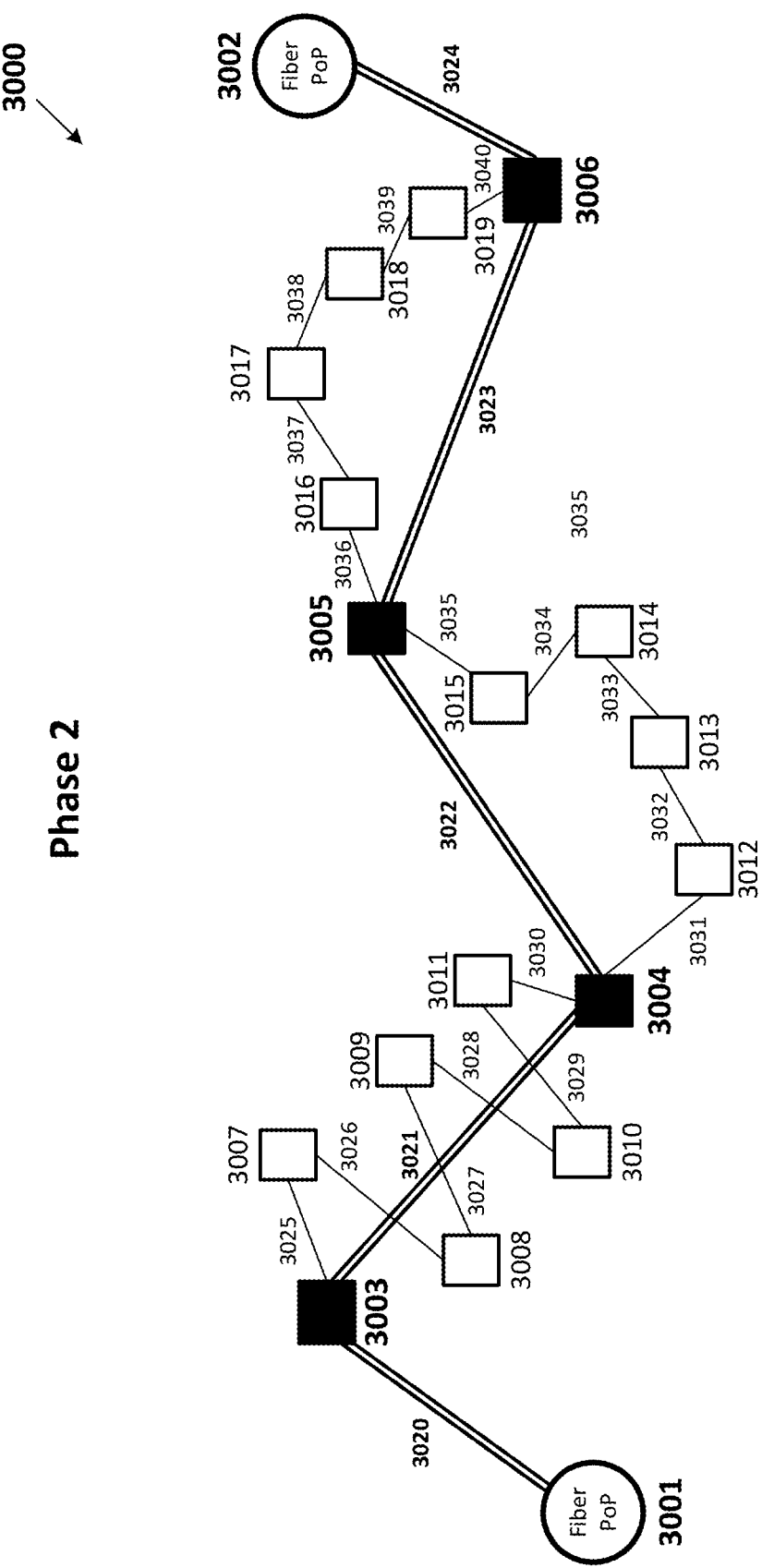
FIG. 33B depicts a second phase of an approach for building a communication system that is based on a wireless mesh network comprising short-hop and long-hop links, in accordance with the present disclosure.

In one embodiment, a wireless mesh network of any of the types disclosed herein can be built in phases. For example, an approach for building the wireless mesh network of example communication system 3000 of FIG. 30 is illustrated in FIGS. 33A-B. As shown in FIG. 33A, phase 1 of building communication system 3000 may involve deploying the long-hop links within communication system 3000. This allows quick access and coverage to large areas with a small number of nodes.

As shown in FIG. 33B, phase 2 of building communication system 3000 may then comprise deploying the short-hop links within communication system 3000 that serve to provide connectivity to a large number of end users that are spread across a large region with the help of long-hop links that are deployed in phase 1. In this respect, availability of the long-hop links in phase 2 allows easy design of the short-hop links as segments of short-hop links can be terminated at any close-by node that is connected via a long-hop link to another node or fiber PoP.

Figure 34:
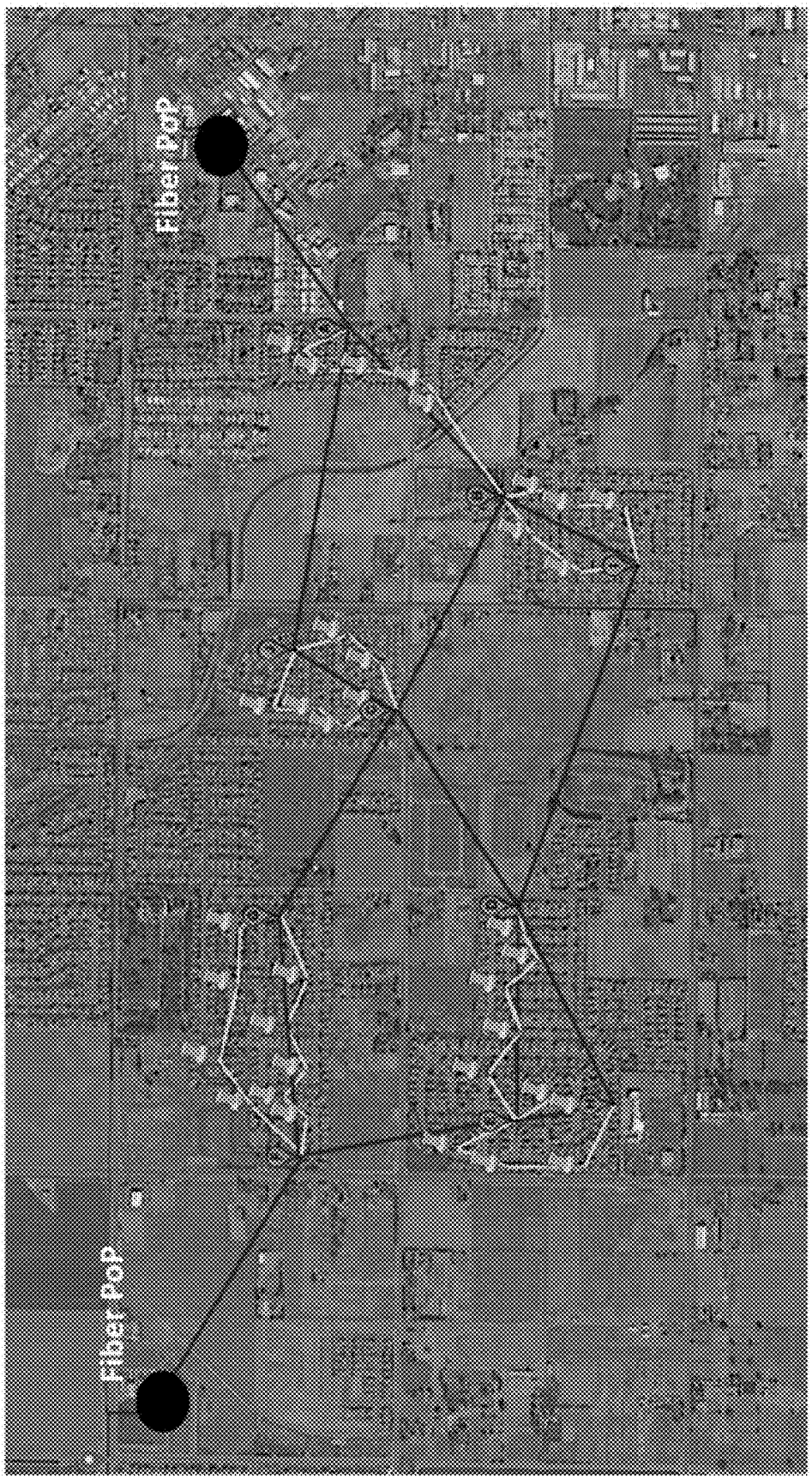
FIG. 34 shows a real-world depiction of a wireless mesh network that has been built using certain of the techniques and design principles disclosed herein.

FIG. 34 shows a real-world depiction of a wireless mesh network that has been built using certain of the techniques and design principles disclosed herein. Black links in FIG. 34 represents long-hop links described in the context of FIGS. 30-33B and white links represent short-hop links that provide connectivity to end users. As shown, long-hop links help connect a wireless mesh network to two fiber PoPs shown in black circles. It can be easily seen that use of long-hop links greatly reduces the maximum number of hops a data packet is required to pass through in order to reach from source to destination, thereby improving the latency and packet delay of the network. Long-hop links also improve the overall network reliability by providing alternate paths for traffic flow in case the original path of a wireless mesh network fails for reasons previously described above.

Also disclosed herein is a new type of wireless communication module that may function to relay signals between nodes within any of the wireless mesh network architectures disclosed herein. This new type of wireless communication module, which may be referred to herein as a "mesh relay module," may include one or more receiver front ends that each comprise a phased antenna array capable of receiver-side beam forming, one or more transmitter front ends that each comprise a phased antenna array capable of transmitter-side beam forming, a communication interface, and circuitry that is configured to control and interconnect the receiver and transmitter front ends, among other possible components. Further, in operation, a mesh relay module may serve to provide an indirect communication path between nodes within the wireless mesh network, which may be useful in a scenario where a direct communication path between the two nodes has experienced an interruption or failure.

Figure 35:
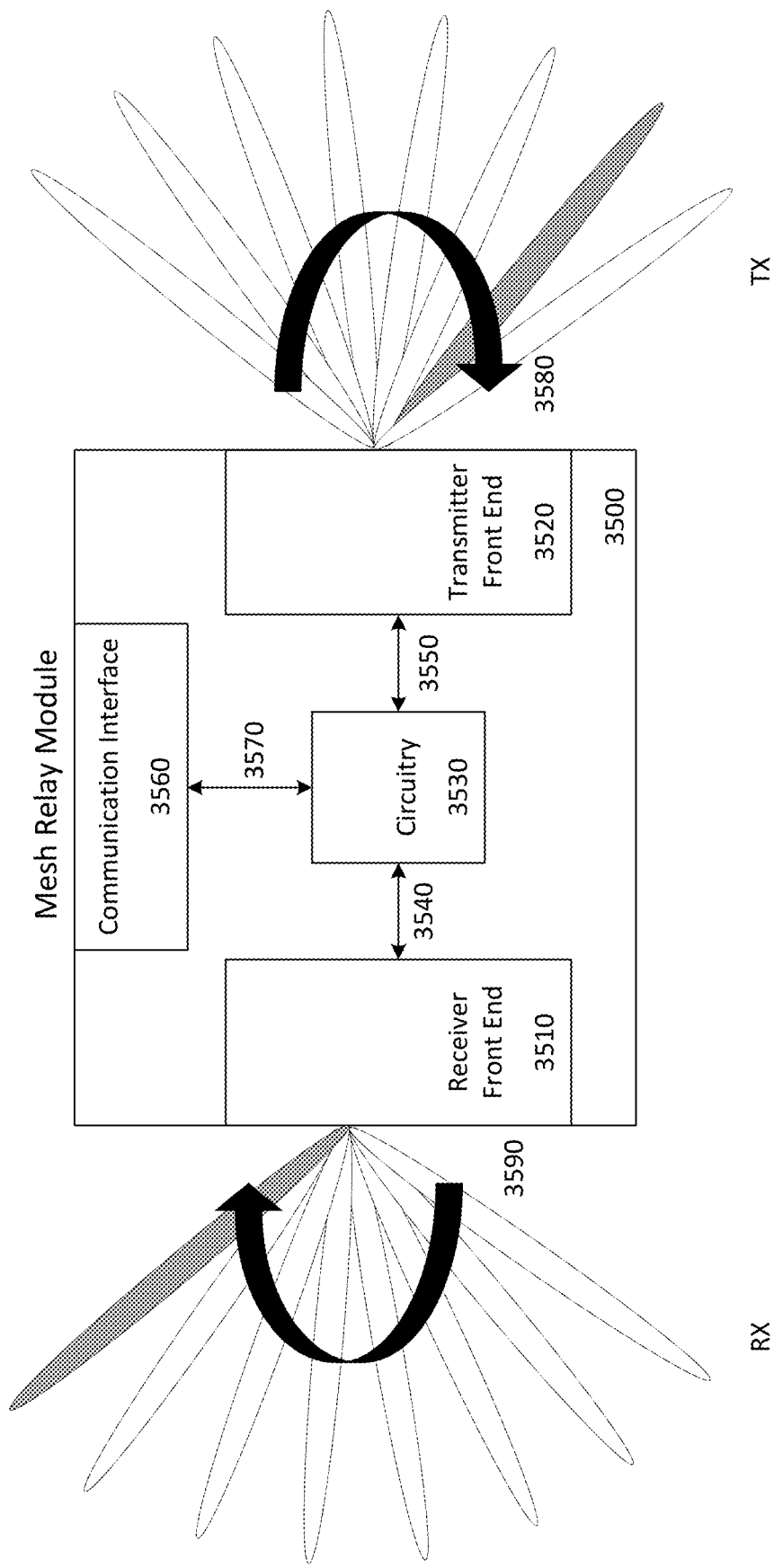
FIG. 35 depicts one possible example of a mesh relay module for relaying signals between nodes within a wireless mesh network, in accordance with the present disclosure.

FIG. 35 shows one example of such a mesh relay module 3500. As shown, mesh relay module 3500 may include a receiver front end 3510, a transmitter front end 3520, circuitry 3530 that is coupled to receiver front end 3510 and transmitter front end 3520, and a communication interface 3560 for communicating with other wireless communication equipment that is external to mesh relay module 3500, among other possible components.

Mesh relay module 3500 is configured to receive radio signals via receiver front end 3510, which may comprise a phased antenna array capable of receiver-side beam forming by applying various techniques associated with antenna gains and phases of the phased antenna array elements to make the phased antenna array receive signals only in a particular direction (or a particular set of directions) with high gain and block signals from other directions. For example, as shown in FIG. 35, out of 8 possible beams that receiver front end 3510 can form covering a total angle of 3590 in the receive direction, receiver front end 3510 is shown to be performing receiver-side beam forming by configuring phase antenna array elements and circuitry in such a way that only top beam (shown in gray) is activated thereby enabling receiver front end 3510 of relay mesh module 3500 to receive only in the direction of top beam.

Although FIG. 35 shows 8 possible receiver-side beams pointed in different directions, it should be understood that receiver front end 3510 may be capable of generating any number of possible receiver-side beams in various different directions and that a total coverage angle 3590 of the narrow receiver side beams generated by receiver front end 3510 can be anywhere between 0~1 degree to 360 degrees.

While mesh relay module 3500 is shown as having a single receiver front end 3510, it should be understood that mesh relay module 3500 could also be configured to include multiple receiver front ends 3510. For instance, in some implementations, mesh relay module 3500 could be designed to perform two-way relay functionality between two nodes of a wireless mesh network, in which case mesh relay module 3500 may include a first receiver front end 3510 that is configured to receive signals from one of the two nodes and a second receiver front end 3510 that is configured to receive signals from the other one of the two nodes. Other implementations are possible as well.

Further, mesh relay module 3500 is configured to transmit radio signals via transmitter front end 3520, which may comprise a phased antenna array capable of transmitter-side beam forming by applying various techniques associated with antenna gains and phases of the phased antenna array elements to make the phased antenna array transmit signals only in a particular direction (or a particular set of directions) with high gain and block signal transmission in all other directions. For example, as shown in FIG. 35, out of 8 possible transmit beams that transmitter front end 3520 can form covering a total angle of 3580 in the transmit direction, transmit front end 3520 is shown to be performing transmit side beam forming by configuring phase antenna array elements and circuitry in such a way that only the beam second from the bottom (shown in gray) is activated thereby enabling transmitter front end 3520 of relay mesh module 3500 to transmit only in the direction of second from bottom beam.

Although FIG. 35 shows 8 transmitter side beams pointed in different directions, it should be understood that transmitter front end 3520 may be capable of generating any number of possible transmit-side beams in various different directions and that a total coverage angle 3580 of the narrow transmit side beams generated by transmitter front end 3520 can be anywhere between 0~1 degree to 360 degrees.

While mesh relay module 3500 is shown as having a single transmitter front end 3520, it should be understood that mesh relay module 3500 could also be configured to include multiple transmitter front ends 3520. For instance, as noted above, mesh relay module 3500 could be designed to perform two-way relay functionality between two nodes of a wireless mesh network, in which case mesh relay module 3500 may include a first transmitter front end 3520 that is configured to transmit signals to one of the two nodes and a second transmitter front end 3520 that is configured to transmit signals from the other one of the two nodes. Other implementations are possible as well.

Further yet, mesh relay module 3500 may include a communication interface 3560 that facilitates communication with other wireless communication equipment that is external to mesh relay module 3500, such as wireless communication equipment that is collocated at the same wireless mesh network node as mesh relay module 3500 and/or wireless communication equipment installed at other wireless mesh network nodes that are remote from mesh relay module 3500. Communication interface 3560 may take any suitable form for facilitating wired and/or wireless communication with other wireless communication equipment installed at a node of a mesh network, examples of which may include an Ethernet interface, a serial bus interface (e.g., Firewire, USB 2.0, etc.), and/or a chipset and antenna adapted to facilitate any of various types of wireless communication (e.g., cellular communication according to 2G protocols, 3G protocols, etc.), among other possibilities. Additionally, in some implementations, communication interface 3560 could include multiple communication interfaces of different types (e.g., both a wired interface for communicating with other equipment that is collocated with mesh relay module 3500 at the same wireless mesh network node and a cellular interface for communicating with the wireless communication equipment of some other wireless mesh network node). Other configurations are possible as well.

As shown in FIG. 35, receiver front end 3510 may be coupled to circuitry 3530 via a wired connection 3540, transmitter front end 3520 may be coupled to circuitry 3530 via a wired connection 3550, and communication interface 3560 may be coupled to circuitry 3530 via a wired connection 3570. However, while FIG. 35 shows these as separate components from circuitry 3530, it should be understood that certain components of mesh relay module 3500 may be integrated in whole or in part with circuitry 3530. For instance, as one possibility, communication interface 3560 could be integrated in whole or in part with circuitry 3530. Other configurations and implementations of mesh relay module 3500 are possible as well.

Circuitry 3530 may take various forms and be configured to perform various functions related to controlling receiver front end 3510 and/or transmitter front end 3520 and facilitating the interaction between receiver front end 3510 and transmitter front end 3520.

As one possibility, circuitry 3530 may be configured to detect that a communication related to the operation of mesh relay module 3500 has been received via communication interface 3560 and then in turn communicate with receiver front end 3510 and/or transmitter front end 3520 to facilitate that operation. For example, circuitry 3530 may be configured to detect that an instruction for mesh relay module 3500 to begin relaying signals between two particular nodes in a wireless mesh network has been received via communication interface 3560—which may include information that enables circuitry 3530 to determine the appropriate receive-side and transmit-side beams to utilize for the relay—and then responsively (i) provide receiver front end 3510 with an instruction and associated information that enables receiver front end 3510 to receive signals in a particular direction that corresponds to the location of the first node for which relay functionality is needed, and (ii) provide transmitter front end 3520 with an instruction and associated information that enables transmitter front end 3520 to transmit signals in a particular direction that corresponds to the location of the second node for which relay functionality is needed. In this respect, the information that enables circuitry 3530 to determine the appropriate receive-side and transmit-side beams to utilize for the relay may take various forms, examples of which may include the location of the two nodes for which relay functionality is needed, the direction/angle of the two nodes relative to the location of mesh relay module 3500, an identifier of the particular receive-side and transmit-side beams that are to be utilized, and/or an indication of the beam width to utilize for the receive-side and transmit-side beams, among other possibilities. Likewise, the information that is provided to each front end make various forms, examples of which may include phase and gain information for the front end's antenna array elements and/or information indicating the particular beam that is to be utilized by the front end for the relay.

In practice, the circuitry component that is responsible for performing this functionality may take any of various forms, examples of which may include a microcontroller and/or a switch, among other possibilities.

The foregoing functionality provides mesh relay module 3500 with the capability to dynamically adjust the direction of its receive-side and transmit-side beams to adapt to changes in the wireless mesh network that give rise to the need for relay functionality, such as failures of direct wireless links (e.g., millimeter-wave ptp links) between certain nodes in the wireless mesh network. In this respect, a single mesh relay module 3500 may be capable of serving as a relay for multiple different pairs of nodes in a wireless mesh network as needed, which may reduce the number of mesh relay modules that need to be deployed in the wireless mesh network. However, it should be understood that, in an alternate implementation, mesh relay module 3500 could be designed such that its receive-side and transmit-side beams have predefined, fixed directions that cannot be dynamically adjusted after deployment of mesh relay module 3500, which may eliminate the need for communication interface 3560 and/or the circuitry component that provides the front ends with instructions and/or information to control their beam directions (although these components may still be included for other purposes).

Circuitry 3530 may be configured to engage in other forms of communication with the receiver and transmitter front ends as well, including but not limited to other communications for controlling the configuration and/or operation of the receiver and transmitter front ends (either based on communication received via communication interface 3560 or otherwise).

As another possibility, circuitry 3530 may be configured to provide an internal interface between receiver front end 3510 and transmitter front end 3520 that serves to transfer signals received by receiver front end 3510 to transmitter front end 3520 for transmission. In this respect, in one implementation, circuitry 3530 may be configured to transfer signals from receiver front end 3510 to transmitter front end 3520 without employing baseband processing, in which case mesh relay module 3500 may act as a "passive relay" (sometimes also referred to as a "passive reflector"). In such an implementation, the circuitry component that is responsible for transferring signals from receiver front end 3510 to transmitter front end 3520 may take the form of a transmission line such as a waveguide, among other possibilities. Alternatively, in another implementation, circuitry 3530 could be configured to transfer the signals from receiver front end 3510 to transmitter front end 3520 by utilizing baseband processing techniques such as signal conditioning, signal amplification, analog baseband transmission (down conversion and up conversion), ADC, and/or DAC, in which case mesh relay module 3500 may act as an "active relay." In such an implementation, the circuitry component that is responsible for transferring signals from receiver front end 3510 to transmitter front end 3520 may take the form of a baseband processor unit or the like, among other possibilities.

Circuitry 3530 may take various other forms as well, including but not limited to the possibility that circuitry 3530 may perform various other functions and/or may include various other components.

Although not shown in FIG. 35, mesh relay module 3500 may also include or be connectable to a power source. For instance, in one implementation, mesh relay module 3500 may include a battery or a solar panel that serves as an embedded power source for the components of mesh relay module 3500 that require power (e.g., certain components of circuitry 3530, communication interface 3560, etc.). In another implementation, mesh relay module 3500 may include an interface for connecting to an external power source, which could be the same power source that powers other wireless communication equipment at a wireless mesh network node or a separate power source. Other configurations are possible as well.

However, while mesh relay module 3500 may require a power source, it should be understood that the design of mesh relay module 3500 may enable it to operate with a relatively low level of power—particularly in the embodiment where mesh relay module 3500 acts as a passive reflector that transfers signals between the front ends without the use of baseband processing. Indeed, in such an embodiment, mesh relay module 3500 may be capable of operating for long periods of time (e.g., years) off an embedded battery or a solar panel, which may provide advantages over an active relay that requires a higher level of power to operate.

In practice, mesh relay module 3500 may installed at any site or location that may be suitable for providing relay functionality between nodes in a wireless mesh network, and in at least some implementations, mesh relay module 3500 may be installed at a site or location that itself serves as a node in the wireless mesh network (e.g., a site installed with wireless communication equipment for establishing ptp and/or ptmp links within the wireless mesh network). A site or location installed with mesh relay module 3500 may be referred to herein as a "mesh relay node," and may function to receive signals from a first other mesh network node and then transmit (or "relay") those received signals received from the first other mesh network node to a second other mesh network node. Additionally, in line with the discussion above, a site could be installed with a mesh relay module 3500 that enables the site to serve as a "two-way mesh relay node" that has the capability of both signal reception from and transmission to a first other mesh network node along with the capability of both signal reception from and transmission to a second other mesh network node. To facilitate the two-way relay functionality, mesh relay module 3500 may include two receiver front ends 3510 and two transmitter front ends 3520 that can be controlled by circuitry 3530 in a similar manner to that described above, although other implementations for providing two-way relay functionality are possible as well—including but not limited to the possibility of installing two separate mesh relay modules 3500 at the site that is to provide the two-way relay functionality.

While FIG. 35 shows one example of a mesh relay module designed in accordance with the present disclosure, it should also be understood that various components can be added to or removed from example mesh relay node 3500. For instance, mesh relay node 3500 may include any of various other components that facilitate active or passive mesh relay functionality. Moreover, the receiver and transmit front ends of mesh relay module 3500 could be isolated from self-interference in some manner. Other variations of mesh relay node 3500 are possible as well.

Figure 36:
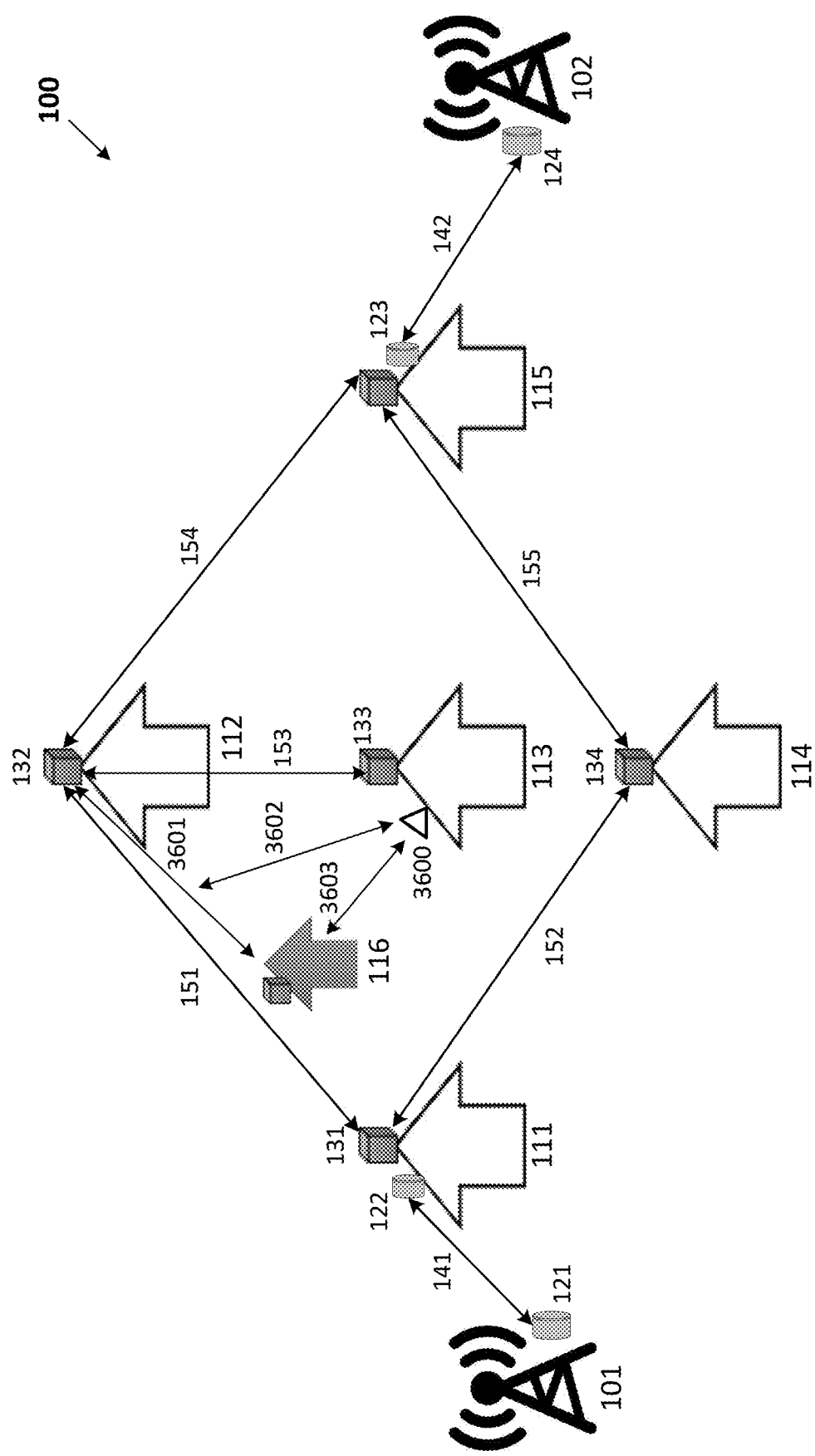
FIG. 36 depicts an example of a communication system based on a wireless mesh network where one node in the wireless mesh network has been installed with a mesh relay module, in accordance with the present disclosure.

Turning now to FIG. 36, one possible example of how a mesh relay module may be utilized within a communication system based on the wireless mesh network technologies disclosed herein is illustrated. In particular, FIG. 36 shows a modified version of the example communication system that was shown and discussed above with reference to FIG. 1, where a new wireless mesh network node 116 has been added to the example communication system 100 and wireless mesh network node 113 has been installed with a mesh relay module 3600 of a type similar to that described above with reference to FIG. 35 (in addition to the other wireless communication equipment 133 described above that works with wireless communication equipment 132 at wireless mesh network node 112 to establish wireless communication link 153).

As shown in FIG. 36, wireless mesh network node 116 is configured to communicate with wireless mesh network node 112 via wireless bi-directional communication link 3601, which may be similar in nature to the wireless bi-directional communication link 153 between wireless mesh network nodes 112 and 113 (among other wireless bi-directional communication links established in communication system 100). However, if wireless bi-directional communication link 3601 between wireless mesh network nodes 112 and 116 fails for some reason (e.g., due to LOS issues or signal degradation), mesh relay module 3600 installed at wireless mesh network node 113 may be configured to receive signals transmitted from wireless mesh network node 112 that are intended for wireless mesh network node 116 and then relay those received signals to wireless mesh network node 116.

For instance, in at least one implementation, mesh relay module 3600 installed at wireless mesh network node 113 may function to (i) determine that signals are to be relayed between wireless mesh network node 112 and wireless mesh network node 116, (ii) adjust its receiver front end to receive signals from the direction of mesh network node 112 that are intended for mesh network node 116 via wireless signal path 3602, and (iii) adjust its transmitter front end to transmit (or "relay") the received signals in the direction of mesh network node 116 via wireless signal path 3603. In this way, wireless mesh network node 116 can receive wireless signals from wireless mesh network node 112 indirectly via mesh relay module 3600 installed at wireless mesh network node 113.

In practice, mesh relay module 3600 may determine that signals are to be relayed between wireless mesh network node 112 and wireless mesh network node 116 in various manners. As one possibility, communication system 100 may include at least one central entity that is configured to maintain information about the configuration and status of wireless mesh network (e.g., the location of the nodes, the type of equipment at the nodes, the status of the links, etc.), which could either be one of the nodes within the wireless mesh network or some other entity, and when link 3601 between wireless mesh network nodes 112 and 116 fails, one or more of the nodes in the wireless mesh network may notify the central entity of this failure. For example, in a scenario where one of the seed nodes (e.g., node 111 or 115) is configured to serve as the central entity, wireless mesh network node 112 may be configured to notify the seed node about the failure of link 3601. In turn, the central entity may (i) determine that there is a mesh relay module 3600 installed at wireless mesh network node 113 that can provide an indirect communication path between wireless mesh network nodes 112 and 116 and then (ii) transmit an instruction for mesh relay module 3600 to begin relaying signals between wireless mesh network nodes 112 and 116, which may traverse any of various possible communication paths between the central entity and mesh relay module 3600. As one example to illustrate, if the central entity is seed node 111, the instruction may traverse a communication path that includes wireless link 151 between wireless mesh network nodes 111 and 112, wireless link 153 between wireless mesh network nodes 112 and 113, and then a wired link between wireless communication equipment 133 and mesh relay module 3600 (which are collocated at wireless mesh network node 113). However, the instruction can traverse various other communication paths as well—including but not limited to the possibility that the final hop of the communication path may comprise a wireless link (e.g., a 2G or 3G cellular link) between non-collocated wireless communication equipment (e.g., wireless communication equipment 132 at wireless mesh network node 112) and mesh relay module 3600 as opposed to a wired link between collocated wireless communication equipment 133 and mesh relay module 3600.

In line with the discussion above, the instruction sent from the central entity to mesh relay module 3600 may also include information that enables mesh relay module 3600 to determine the appropriate receive-side and transmit-side beams to utilize for the relay, examples of which may include the location of the two nodes for which relay functionality is needed, the direction/angle of the two nodes relative to the location of mesh relay module 3500, an identifier of the particular receive-side and transmit-side beams that are to be utilized, and/or an indication of the beam width to utilize for the receive-side and transmit-side beams, among other possibilities.

In this respect, mesh relay module 3600 may determine that signals are to be relayed between wireless mesh network node 112 and wireless mesh network node 116 based on its receipt of such an instruction to relay signals between wireless mesh network node 112 and wireless mesh network node 116 via a communication interface of mesh relay module 3600, which may take a form similar to communication interface 3560 described above with reference to FIG. 35. However, mesh relay module 3600 could determine that signals are to be relayed between wireless mesh network node 112 and wireless mesh network node 116 in other manners as well.

After determining that signals are to be relayed between wireless mesh network node 112 and wireless mesh network node 116, mesh relay module 3600 may then determine the appropriate receive-side beam and transmit-side beam to activate in order to facilitate this relay functionality and then translate that information into information that is to be provided to the receiver and transmitter front ends in order to enable those front ends to adjust their beams. For instance, mesh relay module 3600 (and in particular, circuitry within mesh relay module 3600 that is similar to circuitry 3530 described above with reference to FIG. 35) may function to determine the appropriate receive-side and transmit-side beams to utilize for the relay based on information included in the instruction received from the central entity (e.g., location and/or direction/angle information for wireless mesh network nodes 112 and 116), and may then translate that information into (i) phase and gain information for the receive-side antenna array elements that is to be provided to the receiver front end and (ii) phase and gain information for the transmit-side antenna array elements that is to be provided to the transmitter front end. In turn, mesh relay module 3600 may provide that information to its receiver and transmitter front ends, which may cause receiver front end to adjust itself to receive signals from the direction of mesh network node 112 and cause transmitter front end to adjust itself to transmit (or "relay") received signals intended for wireless mesh network node 116 in the direction of wireless mesh network node 116.

In at least some embodiments, mesh relay module 3600 installed at wireless mesh network node 113 may additionally include a second receiver front end and second transmitter front end, and in such embodiments, mesh relay module 3600 may additionally function to (i) adjust its second receiver front end to receive signals from wireless mesh network node 116 via wireless signal path 3603 and (ii) adjust its second transmitter front end to transmit signals in the direction of wireless mesh network node 112 via wireless signal path 3602. In this way, wireless mesh network node 116 can also transmit wireless signals to mesh network node 112 indirectly via mesh relay module 3600 installed at wireless mesh network node 113.

In practice, when establishing the indirect signal path between wireless mesh network node 112 and wireless mesh network node 116, mesh relay module 3600 can either (i) operate on a same channel and frequency that is utilized by the other wireless communication equipment for establishing the wireless links within the wireless mesh network (e.g., wireless communication equipment 131, 132, etc.) or (ii) operate on a different channel and/or frequency than what is utilized by the other wireless communication equipment for establishing the wireless links within the wireless mesh network (e.g., wireless communication equipment 131, 132, etc.).

While FIG. 36 shows one intermediary mesh relay module 3600 between wireless mesh network node 112 and wireless mesh network node 116, it should also be understood that any number of intermediary mesh relay nodes can be used to establish the indirect communication path between wireless mesh network node 112 and wireless mesh network node 116 when the need arises (e.g., when direct link 3601 fails). For instance, although not shown, a second mesh relay module could be installed at another site that is physically located between wireless communication node 113 where mesh relay module 3600 is installed and either wireless mesh network node 112 or wireless mesh network node 116, and that second mesh relay module could work together with mesh relay module 3600 to establish the indirect communication path between wireless mesh network node 112 and wireless mesh network node 116.

To illustrate with an example, mesh relay module 3600 installed at wireless mesh network node 113 could be configured to have its receive-side beam pointed in the direction of one of wireless mesh network nodes 112 or 116 and its transmit-side beam pointed in the direction of a second mesh relay module installed at another site (not shown), while the second mesh relay module could be configured to have its receive-side beam pointed in the direction of mesh relay module 3600 and its transmit-side beam pointed in the direction of the other of wireless mesh network nodes 112 or 116. Or alternatively, a second mesh relay module installed at another site (not shown) could be configured to have its receive-side beam pointed in the direction of one of wireless mesh network nodes 112 or 116 and its transmit-side beam pointed in the direction of mesh relay module 3600 installed at wireless mesh network node 113, while mesh relay module 3600 could be configured to have its receive-side beam pointed in the direction of the second mesh relay module and its transmit-side beam pointed in the direction of the other of wireless mesh network nodes 112 or 116. Many other examples are possible as well, including but not limited to the possibility that the relay path may include more than two mesh relay modules.

Further, while FIG. 36 shows a mesh relay module 3600 being used to aid the communication between wireless mesh network node 112 and wireless mesh network node 116, it should be understood that a mesh relay module 3600 may be used to aid the communication between any pair of wireless mesh network nodes within a wireless mesh network, including pairs of wireless mesh network nodes in same tier of the wireless mesh network (e.g., anchor-to-anchor node communication) and pairs of wireless mesh network nodes in different tiers of the wireless mesh network (e.g., PoP-to-seed or seed-to-anchor node communication).

CONCLUSION

Example embodiments of the disclosed innovations have been described above. At noted above, it should be understood that the figures are provided for the purpose of illustration and description only and that various components (e.g., modules) illustrated in the figures above can be added, removed, and/or rearranged into different configurations, or utilized as a basis for modifying and/or designing other configurations for carrying out the example operations disclosed herein. In this respect, those skilled in the art will understand that changes and modifications may be made to the embodiments described above without departing from the true scope and spirit of the present invention, which will be defined by the claims.

Further, to the extent that examples described herein involve operations performed or initiated by actors, such as humans, operators, users or other entities, this is for purposes of example and explanation only. Claims should not be construed as requiring action by such actors unless explicitly recited in claim language.

The invention claimed is:

1. A mesh relay module for relaying signals between nodes in a wireless mesh network including (i) a first node comprising a first set of wireless mesh equipment installed at a first building and (ii) a second node comprising a second set of wireless mesh equipment installed at a second building, the mesh relay module comprising:
a receiver front end comprising a receiver-side phased antenna array for receiving signals in any of a first plurality of beam directions;
a transmitter front end comprising a transmitter-side phased antenna array for transmitting signals in any of a second plurality of beam directions;
a communication interface for facilitating communication with other wireless communication equipment;
circuitry that is configured to control the respective beam directions of the receiver front end and the transmitter front end by:
receiving an instruction to relay signals between the first node comprising the first set of wireless mesh equipment installed at the first building and the second node comprising the second set of wireless mesh equipment installed at the second building, wherein the first and second nodes were configured to exchange mesh access traffic with one another via a wireless point-to-point (ptp) or point-to-multipoint (ptmp) link established between the first and second nodes, and wherein the received instruction indicates (i) a first location of the first node and (ii) a second location of the second node, and
based on the received instruction, (i) controlling the receiver front end to have a first particular beam direction of the first plurality of beam directions that corresponds to the first location of the first node, and (ii) controlling the transmitter front end to have a second particular beam direction of the second plurality of beam directions that corresponds to the second location of the second node; and
a waveguide that is configured to transfer signals between the receiver front end and the transmitter front end.

2. The mesh relay module of claim 1, wherein the waveguide is configured to transfer signals between the receiver front end and the transmitter front end without using baseband processing.

3. The mesh relay module of claim 1, wherein the circuitry comprises a microcontroller.

4. The mesh relay module of claim 1, wherein the circuitry is configured to (i) control the receiver front end to have the first particular beam direction of the first plurality of beam directions that corresponds to the first location of the first node by providing the receiver front end with first information that enables the receiver front end to adjust its respective beam direction for receiving signals to the first particular beam direction and (ii) control the transmitter front end to have the second particular beam direction of the second plurality of beam directions that corresponds to the second location of the second node by providing the transmitter front end with second information that enables the transmitter front end to adjust its respective beam direction for transmitting signals to the second particular beam direction.

5. The mesh relay module of claim 4, wherein the first information comprises gain and phase information for the receiver-side phased antenna array and the second information comprises gain and phase information for the transmitter-side phased antenna array.

6. The mesh relay module of claim 4, wherein the first information and the second information are determined by the circuitry based on information received via the communication interface that indicates (i) the first location of the first node, and (ii) the second location of the second node.

7. The mesh relay module of claim 1, wherein the receiver front end and the transmitter front end comprise a first pair of front ends for relaying signals from the first node of the wireless mesh network to the second node of the wireless mesh network, and wherein the mesh relay module further comprises a second pair of front ends for relaying signals from the second node of the wireless mesh network to the first node of the wireless mesh network, the second pair of front ends comprising:
a second receiver front end comprising a second receiver-side phased antenna array for receiving signals in any of a third plurality of beam directions; and
a second transmitter front end comprising a second transmitter-side phased antenna array for transmitting signals in any of a fourth plurality of beam directions;
wherein the circuitry is further configured to: (i) control the second receiver front end to have a third particular beam direction of the third plurality of beam directions that corresponds to the second location of the second node, and (ii) control the second transmitter front end to have a fourth particular beam direction of the fourth plurality of beam directions that corresponds to the first location of the first node, and wherein the waveguide is further configured to transfer signals between second receiver front end and second transmitter front end.

8. The mesh relay module of claim 1:

wherein the mesh relay module is installed at a third node of the wireless mesh network, and wherein, after a failure of the wireless ptp or ptmp link between the first and second nodes is detected, the mesh relay module installed at the third node functions to (i) receive signals from the first particular beam direction of the first plurality of beam directions that corresponds to the first location of the first node via the receiver front end and (ii) transmit received signals in the second particular beam direction of the second plurality of beam directions that corresponds to the second location of the second node via the transmitter front end.

9. The mesh relay module of claim 8, wherein the instruction to relay signals between the first node comprising the first set of wireless mesh equipment installed at the first building and the second node comprising the second set of wireless mesh equipment installed at the second building comprises:

an instruction to relay signals between the first node and the second node of the wireless mesh network that is sent by a central entity for the wireless mesh network after (i) determining that the wireless ptp or ptmp link between the first and second nodes has failed, and (ii) determining that the mesh relay module installed at the third node is capable of relaying signals between the first node and the second node of the wireless mesh network.

10. The mesh relay module of claim 8, wherein the instruction to relay signals between the first node comprising the first set of wireless mesh equipment installed at the first building and the second node comprising the second set of wireless mesh equipment installed at the second building comprises:

an instruction to relay signals between the first node and the second node of the wireless mesh network that is sent by wireless mesh equipment installed at the third node of the wireless mesh network after (i) determining that the wireless ptp or ptmp link between the first and second nodes has failed, and (ii) determining that the mesh relay module installed at the third node is capable of relaying signals between the first node and the second node of the wireless mesh network.

\* \* \* \* \*